(12) United States Patent
Choi et al.

(10) Patent No.: US 9,165,518 B2
(45) Date of Patent: Oct. 20, 2015

(54) DISPLAY DEVICE AND DRIVING METHOD THEREOF

(75) Inventors: Yong-Jun Choi, Asan-si (KR); Jae-Won Jeong, Seoul (KR); Jae-Suk Choi, Uijeongbu-si (KR); Seung-Ho Baek, Asan-si (KR); Joo Seok Yeom, Seoul (KR); Young-Su Han, Incheon (KR); Myeong-Su Kim, Cheonan-si (KR); Yun-Jae Kim, Seoul (KR); Jin-Soo Kim, Yongin-si (KR); Seung Hwan Moon, Asan-si (KR); Po-Yun Park, Seoul (KR); Jae Wan Park, Seoul (KR); Kwan-Young Oh, Hwaseong-si (KR); Min Joo Lee, Seoul (KR); Jung Hwan Cho, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 209 days.

(21) Appl. No.: 13/569,107

(22) Filed: Aug. 7, 2012

(65) Prior Publication Data
US 2013/0038621 A1    Feb. 14, 2013

(30) Foreign Application Priority Data

| Aug. 8, 2011 | (KR) | 10-2011-0078796 |
| Oct. 26, 2011 | (KR) | 10-2011-0109915 |
| Nov. 4, 2011 | (KR) | 10-2011-0114750 |
| Nov. 28, 2011 | (KR) | 10-2011-0125169 |
| Feb. 21, 2012 | (KR) | 10-2012-0017618 |
| May 15, 2012 | (KR) | 10-2012-0051496 |

(51) Int. Cl.
*G09G 3/36* (2006.01)
*G09G 3/20* (2006.01)

(52) U.S. Cl.
CPC .......... *G09G 3/3648* (2013.01); *G09G 3/2092* (2013.01); *G09G 2320/0247* (2013.01); *G09G 2320/103* (2013.01); *G09G 2340/0435* (2013.01); *G09G 2360/18* (2013.01)

(58) Field of Classification Search
CPC ............... G09G 2320/062; G09G 2320/0646; G09G 2320/103; G09G 2330/021; G09G 2320/0633; G09G 2360/18; G09G 3/3611
USPC ............ 345/87–102, 204–214, 520, 545, 589
See application file for complete search history.

(56) References Cited

U.S. PATENT DOCUMENTS

| 6,005,542 A | 12/1999 | Yoon |
| 7,102,604 B2 | 9/2006 | Hong |

(Continued)

FOREIGN PATENT DOCUMENTS

| CN | 101188105 | 5/2008 |
| EP | 0838801 A1 | 4/1998 |

(Continued)

*Primary Examiner* — Hong Zhou
(74) *Attorney, Agent, or Firm* — Innovation Counsel LLP

(57) ABSTRACT

The present invention provides a display device with reduced power consumption and that reduces changes in luminance, and perceptibility of flicker, and a driving method thereof. A display device according to an exemplary embodiment comprises: a display panel configured to display a still image and a motion picture; a signal controller configured to control signals for driving the display panel; and a graphics processing unit configured to transmit input image data to the signal controller, wherein the signal controller comprises a frame memory configured to store the input image data, and the display panel is driven at a first frequency when the motion picture is displayed and the display panel is driven at a second frequency that is lower than the first frequency when the still image is displayed.

27 Claims, 39 Drawing Sheets

(56) References Cited

U.S. PATENT DOCUMENTS

| | | |
|---|---|---|
| 7,112,996 B2 | 9/2006 | Lee |
| 7,362,295 B2 | 4/2008 | Park et al. |
| 7,489,295 B2 | 2/2009 | Honbo |
| 7,545,354 B2 | 6/2009 | Ha et al. |
| 7,545,654 B2 | 6/2009 | Berghegger |
| 7,580,032 B2 | 8/2009 | Jung et al. |
| 7,612,505 B2 | 11/2009 | Min et al. |
| 7,724,218 B2 | 5/2010 | Kim et al. |
| 7,907,106 B2 | 3/2011 | Shin et al. |
| 8,692,823 B2 | 4/2014 | Toyotaka et al. |
| 2001/0024187 A1 | 9/2001 | Sato et al. |
| 2002/0067332 A1* | 6/2002 | Hirakata et al. .............. 345/102 |
| 2003/0030607 A1 | 2/2003 | Kitagawa et al. |
| 2004/0169627 A1 | 9/2004 | Hong |
| 2004/0179002 A1* | 9/2004 | Park et al. ..................... 345/204 |
| 2005/0068289 A1* | 3/2005 | Diefenbaugh et al. ........ 345/102 |
| 2005/0219196 A1 | 10/2005 | Lee |
| 2005/0253798 A1 | 11/2005 | Hiyama et al. |
| 2006/0038771 A1 | 2/2006 | Hirakata et al. |
| 2007/0091204 A1 | 4/2007 | Koshimizu et al. |
| 2007/0103424 A1* | 5/2007 | Huang .......................... 345/102 |
| 2007/0132683 A1 | 6/2007 | Kong |
| 2007/0139427 A1 | 6/2007 | Sahashi |
| 2007/0176883 A1 | 8/2007 | Hsu et al. |
| 2008/0079701 A1 | 4/2008 | Shin et al. |
| 2008/0084379 A1 | 4/2008 | Takahashi et al. |
| 2008/0100553 A1 | 5/2008 | Shen et al. |
| 2008/0117223 A1 | 5/2008 | Mayer et al. |
| 2008/0224983 A1 | 9/2008 | Lee et al. |
| 2009/0096769 A1* | 4/2009 | Kim et al. ..................... 345/204 |
| 2009/0167659 A1 | 7/2009 | Kim et al. |
| 2009/0244112 A1 | 10/2009 | Jung et al. |
| 2010/0165145 A1 | 7/2010 | Kuroki |
| 2010/0201677 A1 | 8/2010 | Takei et al. |
| 2010/0238193 A1 | 9/2010 | Neal et al. |
| 2010/0302265 A1 | 12/2010 | Sumi |
| 2011/0025910 A1 | 2/2011 | Furukawa et al. |
| 2011/0148826 A1 | 6/2011 | Koyama et al. |
| 2011/0157253 A1 | 6/2011 | Yamazaki et al. |
| 2011/0227955 A1 | 9/2011 | Lee et al. |
| 2012/0268446 A1 | 10/2012 | Yamauchi |
| 2012/0320004 A1 | 12/2012 | Kitakado |
| 2013/0027379 A1 | 1/2013 | Lee et al. |

FOREIGN PATENT DOCUMENTS

| | | |
|---|---|---|
| JP | 06-267660 A | 9/1994 |
| JP | 06-333695 A | 12/1994 |
| JP | 07-191298 A | 7/1995 |
| JP | 09-101506 A | 4/1997 |
| JP | 10-111490 A | 4/1998 |
| JP | 2001-013930 A | 1/2001 |
| JP | 2004-061782 A | 2/2004 |
| JP | 2005-091385 A | 4/2005 |
| JP | 2005-234032 A | 9/2005 |
| JP | 3718832 | 9/2005 |
| JP | 2006-073199 A | 3/2006 |
| JP | 2006-091242 A | 4/2006 |
| JP | 2006-228312 A | 8/2006 |
| JP | 2007-039759 A | 2/2007 |
| JP | 2007-267038 A | 10/2007 |
| JP | 2008-098710 A | 4/2008 |
| JP | 2009-069373 A | 4/2009 |
| JP | 2009-075580 A | 4/2009 |
| JP | 2010-066725 A | 3/2010 |
| JP | 4469788 | 3/2010 |
| JP | 4586052 | 9/2010 |
| JP | 2010-273259 A | 12/2010 |
| KR | 10-0840331 | 8/2002 |
| KR | 10-2002-0072504 A | 9/2002 |
| KR | 10-0374375 | 2/2003 |
| KR | 10-0400595 | 9/2003 |
| KR | 10-0480815 | 3/2005 |
| KR | 10-2006-0058421 A | 5/2006 |
| KR | 10-2006-0066424 A | 6/2006 |
| KR | 10-2007-0039759 A | 4/2007 |
| KR | 10-2007-0066013 A | 6/2007 |
| KR | 10-2007-0076078 A | 7/2007 |
| KR | 10-0767868 | 10/2007 |
| KR | 10-0770543 | 10/2007 |
| KR | 10-2008-0002427 A | 1/2008 |
| KR | 10-2008-0035333 A | 4/2008 |
| KR | 10-0834119 | 5/2008 |
| KR | 10-0848953 | 7/2008 |
| KR | 10-2010-0131671 A | 12/2010 |
| KR | 10-2011-0070178 A | 6/2011 |
| KR | 10-2013-0012381 A | 7/2011 |

* cited by examiner

DISPLAY DEVICE AND DRIVING METHOD THEREOF

CROSS-REFERENCE TO RELATED APPLICATION

This application claims priority to and the benefit of Korean Patent Application No. 10-2011-0078796 filed in the Korean Intellectual Property Office on Aug. 8, 2011, Korean Patent Application No. 10-2011-0109915 filed in the Korean Intellectual Property Office on Oct. 26, 2011, Korean Patent Application No. 10-2011-0114750 filed in the Korean Intellectual Property Office on Nov. 4, 2011, Korean Patent Application No. 10-2011-0125169 filed in the Korean Intellectual Property Office on Nov. 28, 2011, Korean Patent Application No. 10-2012-0017618 filed in the Korean Intellectual Property Office on Feb. 21, 2011, and Korean Patent Application No. 10-2012-0051496 filed in the Korean Intellectual Property Office on May 15, 2012, the entire contents of which are incorporated herein by reference.

BACKGROUND OF THE INVENTION (a) Field of the Invention

The present invention relates to a display device and a driving method thereof. More particularly, the present invention relates to a display device with reduced power consumption and that prevents deterioration of visibility, changes in luminance, and perceptibility of flicker, and a driving method thereof.

(b) Description of the Related Art

Currently, display devices are required for devices such as computer monitors, televisions, mobile phones, and the like, which are widely used. The various types of display devices include cathode ray tube display devices, liquid crystal displays, plasma display devices, and the like.

A display device includes a graphics processing unit (GPU), a display panel, and a signal controller. The graphics processing unit transmits image data of a screen to be displayed on the display panel to the signal controller. The signal controller then generates a control signal for driving the display panel to transmit the control signal together with the image data to the display panel, thereby driving the display device.

Images displayed on the display panel are broadly classified into still images and motion pictures. The display panel is capable of displaying several frames per second, and if the image data included in the frames are identical, a still image is displayed. Conversely, if the image data included in the frames are different, a motion picture is displayed.

In this case, because the signal controller receives the same image data from the graphics processing unit for every frame regardless of whether the display panel displays a motion picture or a still image, power consumption increases.

Recently, many methods for reducing power consumption of display devices have been researched. Among these, is a method in which a frame memory is added to the signal controller, and the image data of the still image is stored in a frame memory. The storage image data is provided to the display panel while displaying the still image. The method is called a pixel self-refresh (PSR) mode. Because the image data does not need to be received from the graphics processing unit while displaying the still image, the graphics processing unit may be deactivated to reduce power consumption.

When being driven in the PSR mode, however, the addition of the frame memory introduces a problem of increased power consumption.

The above information disclosed in this Background section is only for enhancement of understanding of the background and therefore it may contain information that does not form the prior art that is already known to a person of ordinary skill in the art.

SUMMARY OF THE INVENTION

A display device with reduced power consumption and that prevents deterioration of visibility, and a driving method thereof, are provided.

A display device that prevents a luminance change while reducing the power consumption, and a driving method thereof are also provided.

Also, a display device that reduces perceptibility of flicker while simultaneously reducing the power consumption, and a driving method thereof, are provided.

Also, a display device that prevents an increase of flicker due to an increase of a leakage current while reducing the power consumption, and a driving method thereof, are provided.

A display device comprises: a display panel configured to display a still image and a motion picture; a signal controller configured to control signals for driving the display panel; and a graphics processing unit configured to transmit input image data to the signal controller, wherein the signal controller comprises a frame memory configured to store the input image data, and the display panel is driven at a first frequency when the motion picture is displayed and is driven at a second frequency that is lower than the first frequency when the still image is displayed.

The graphics processing unit may transmit a still image start signal and a still image end signal to the signal controller.

The signal controller may store the input image data in the frame memory, may output storage image data stored in the frame memory to the display panel at the second frequency, and may inactivate the transmission of the input image data when the still image start signal is applied.

The signal controller may activate the transmission of the input image data and output the input image data to the display panel at the first frequency when the still image end signal is applied.

A length of a vertical blank period when the display panel is driven at the second frequency may be longer than a length of the vertical blank period when the display panel is driven at the first frequency.

The display panel may be driven at a frequency that is higher than the second frequency and lower than the first frequency for an S1 frame after the still image start signal is applied.

The length of the vertical blank period may be gradually increased for the S1 frame.

The display panel may be driven at a frequency that is higher than the second frequency and lower than the first frequency for an S2 frame after the still image end signal is applied.

The length of the vertical blank period may be gradually decreased for the S2 frame.

The display panel may comprise: a substrate; a gate line and a data line formed on the substrate; a switching element connected to the gate line and the data line; and a pixel electrode connected to the switching element, and wherein the gate line may be applied with a gate signal comprising a gate-on voltage and a gate-off voltage.

A clock frequency of the gate signal when the display panel is driven at the second frequency may be lower than the clock frequency of the gate signal when the display panel is driven at the first frequency.

A length of a vertical blank period when the display panel is driven at the second frequency may be longer than a length of the vertical blank period when the display panel is driven at the first frequency.

The display panel may be driven with the second frequency until a frame applied with the still image end signal is ended.

The display panel may comprise: a gate line and a data line; a gate driver configured to drive a gate line; and a data driver configured to drive a data line, and the signal controller may transmit an STV signal and a CPV signal to the gate driver.

The signal controller may transmit the STV signal to the gate driver at a start position of one frame except for a position where the second frequency is changed into the first frequency.

The signal controller may be controlled for the widths of the CPV signal when the display panel is driven with the first frequency and the second frequency to be the same.

The signal controller may be controlled for the width of the CPV signal to have the same width as a clock signal of p times when the display panel is driven with a first frequency, and for the width of the CPV signal to have the same width as a clock signal of q times less than p times when the display panel is driven with the second frequency.

The signal controller may gamma-correct the input image data when the display panel is driven with the second frequency and may transmit the gamma-corrected image data to the display panel.

The signal controller may further comprise a frame counting unit configured to count the number of still image sequential frames inputted before the still image end signal is applied after the still image start signal is applied, and configured to count the number of motion picture sequential frames inputted until the still image start signal is applied after the still image end signal is applied.

The signal controller may store the input image data in the frame memory and activate the transmission of the input image data when the number of the still image sequential frames is equal to or more than x. The signal controller may further activate the transmission of the input image data when the number of the motion picture sequential frames is equal to or more than y.

The signal controller may output the storage image data stored in the frame memory to the display panel at the first frequency when the number of the still image sequential frames is equal to or more than x, and output the input image data to the display panel at the second frequency when the number of the motion picture sequential frames is equal to or more than y.

The display device may further comprise a light source unit configured to irradiate light to the display panel, and a light source driver configured to control signals to drive the light source unit.

The light source driver may drive the light source unit at a first ratio when the display panel is driven at the first frequency, and drive the light source unit at a second ratio when the display panel is driven at the second frequency.

The second ratio may be lower than the first ratio when the display panel is a normally black mode, and the second ratio may be higher than the first ratio when the display panel is a normally white mode.

The signal controller may further comprise a signal receiving unit configured to transmit the input image data from the graphics processing unit, and a driving frequency selecting unit configured to select the first frequency when the still image is displayed and configured to select the second frequency when the motion picture is displayed.

The light source driver may comprise a driving frequency receiving unit configured to receive a driving frequency of the display panel from the signal controller, a light source unit driving ratio selecting unit configured to determine a driving ratio of the light source unit according to the driving frequency, and a light source driving signal generator configured to generate a signal for driving the light source according to the driving ratio of the light source unit.

The light source driver may constantly maintain a driving ratio of the light source unit when the display panel is driven with the first frequency, and may periodically change the driving ratio of the light source unit when the display panel is driven with the second frequency.

The display panel may be a normally black mode, and the light source driver may drive the light source unit with the first ratio when the display panel is driven with the first frequency, and may drive the light source unit with the first ratio and a ratio that is sequentially decreased from the first ratio when the display panel is driven with the second frequency.

The display panel may comprise a gate line and a data line, a gate driver configured to drive a gate line, and a data driver configured to drive a data line, and the signal controller may transmit an STV signal to the gate driver at a start position of every frame.

The light source driver may drive the light source unit with the first ratio as a position where the STV signal is transmitted when the display panel is driven with the second frequency, and may drive the light source unit with a ratio that is sequentially decreased from the first ratio before a next STV signal is transmitted.

A transmission cycle of the STV signal when the display panel is driven with the first frequency may be the same as a change cycle of a driving ratio of the light source unit when the display panel is driven with the second frequency.

The display panel may be a normally white mode, and the light source driver may drive the light source unit with the first ratio when the display panel is driven with the first frequency, and may drive the light source unit with the first ratio and a ratio that is sequentially increased from the first ratio when the display panel is driven with the second frequency.

The display panel may comprise: a substrate; a gate line, a data line, and a storage electrode line formed on the substrate; a first switching element connected to the gate line and the data line; and a storage capacitor connected to the first switching element and the storage electrode line, wherein when the display panel i driven with the first frequency, a common voltage input to the storage electrode line has a constant value, and when the display panel is driven with the second frequency, the common voltage may have a value that is changed according to time.

The display panel may further comprise: a second switching element and a third switching element formed between the storage electrode line and the storage capacitor; and a storage electrode control line formed on the substrate, wherein each of the second switching element and the third switching element comprises a control terminal, an input terminal, and an output terminal, the input terminals of the second switching element and the third switching element are connected to the storage electrode line, the output terminals of the second switching element and the third switching element are connected to the storage capacitor, the control terminal of the second switching element is connected to the gate line, and the control terminal of the third switching element is connected to the storage electrode control line.

When the display panel is driven at the second frequency, the common voltage may have a first voltage in at first time and have a second voltage that is higher than the first voltage at a second time.

One frame may comprise an effective period in which the image data is transmitted and a vertical blank period in which the image data is not transmitted, the first period may be the effective period, and the second period may be the vertical blank period.

The control voltage input to the storage electrode control line may have a gate-off voltage in the first period and a gate-on voltage in the second period.

When the display panel is driven with the second frequency, the common voltage may have a third voltage that is higher than the second voltage in the third period.

One frame may comprise an effective period in which the image data is transmitted and a vertical blank period in which the image data is not transmitted, the first period may be the effective period, the second period may be a portion of the vertical blank period, and the third period may be a remaining portion of the vertical blank period.

When the display panel is driven with the second frequency, the common voltage may have the first voltage in the first period and may swing with the first voltage and the second voltage that is higher than the first voltage in the second period.

The common voltage may be gradually changed with a value between the first voltage and the second voltage when the first voltage is changed into the second voltage.

The display device may further comprise a gate driver configured to drive the gate line and a data driver configured to drive the data line, and the signal controller may comprise a calculator configured to calculate a representative value of storage image data stored in the frame memory, a line memory configured to store the representative value, and a kick-back corrector configured to generate auxiliary image data by correcting the representative value according to a kick-back voltage. The data driver may apply an auxiliary voltage corresponding to the auxiliary image data to the data lines in a vertical blank range at the time of displaying the still image.

A plurality of data lines may be provided, and the calculator may calculate a representative value of the storage image data for each data line.

The representative value may be an average gray value of the storage image data.

The representative value may be an average gray value of upper t bits of the storage image data.

The representative value may be a middle value of a maximum gray value and a minimum gray value of the storage image data.

The auxiliary image data may be generated by Ga=Gr−dG (Ga: a gray value of the auxiliary image data, Gr: the representative value, dG: a kick-back correction gray value depending on the representative value).

The kick-back correction gray value may be a value stored in a look-up table or calculated by a function.

When the kick-back correction gray value is a value calculated by a function, the function may be generated by linear interpolation by using a kick-back correction gray value at a minimum gray, a kick-back correction gray value at a maximum gray, and a gray value when the magnitude of the kick-back correction gray value is a maximum.

The display panel may comprise: gate lines and data lines; a switching element of which a control terminal is connected to the gate line and an input terminal is connected to the data line; and a pixel electrode connected to an output terminal of the switching element, wherein a gate signal comprising gate-on voltage and gate-off voltage may be applied to the gate line, and the gate-off voltage when the display panel is driven at the second frequency may have the following range: Va−0.2|Va|≤Voff2≤Va+0.2|Va| (Voff2: the gate-off voltage when the display panel is driven at the second frequency, Va: voltage of the control terminal of the switching element when leakage current flowing between the input terminal and the output terminal of the switching element when the positive pixel voltage is applied to the pixel electrode and leakage current flowing between the input terminal and the output terminal of the switching element when the negative pixel voltage is applied to the pixel electrode are the same).

The gate-off voltage when the display panel is driven at the second frequency may have the following range: Va−0.1|Va|≤Voff2≤Va+0.1|Va| (Voff2: the gate-off voltage when the display panel is driven at the second frequency, Va: voltage of the control terminal of the switching element when leakage current flowing between the input terminal and the output terminal of the switching element when the positive pixel voltage is supplied to the pixel electrode and leakage current flowing between the input terminal and the output terminal of the switching element when the negative pixel voltage is supplied to the pixel electrode are the same).

The gate-off voltage when the display panel is driven at the first frequency may have the following range: Va−0.2|Va|≤Voff1≤Va+0.2|Va| (Voff1: the gate-off voltage when the display panel is driven at the first frequency, Va: voltage of the control terminal of the switching element when leakage current flowing between the input terminal and the output terminal of the switching element when the positive pixel voltage is applied to the pixel electrode and leakage current flowing between the input terminal and the output terminal of the switching element when the negative pixel voltage is applied to the pixel electrode are the same).

The gate-off voltage when the display panel is driven at the first frequency may have the following range: Va−0.1|Va|≤Voff1≤Va+0.1|Va| (Voff1: the gate-off voltage when the display panel is driven at the first frequency, Va: voltage of the control terminal of the switching element when leakage current flowing between the input terminal and the output terminal of the switching element when the positive pixel voltage is applied to the pixel electrode and leakage current flowing between the input terminal and the output terminal of the switching element when the negative pixel voltage is applied to the pixel electrode are the same).

The gate-off voltage when the display panel is driven at the first frequency may be the same as the gate-off voltage when the display panel is driven at the second frequency.

The gate-off voltage when the display panel is driven at the first frequency may be lower than the gate-off voltage when the display panel is driven at the second frequency.

The display device may further comprise a gate driver configured to drive the gate line and a data driver configured to drive the data line, wherein the signal controller may store the input image data in the frame memory, apply storage image data stored in the frame memory to the data driver, and inactivate the transmission of the input image data, when the still image start signal is applied.

The transmission of the input image data may be activated and the input image data may be applied to the data driver when the still image end signal is applied.

The gate driver may be attached at one side of the display panel.

The gate driver may be mounted in the display panel together with the gate line, the data line, and the switching element.

In another aspect, a method for driving a display device comprising a display panel displaying a moving picture and a still image, and a signal controller controlling signals to drive the display panel comprises: transmitting input image data and driving a display panel with a first frequency; applying a still image start signal; changing a driving frequency of the display panel into a second frequency that is lower than the first frequency; applying a still image end signal; and changing a driving frequency of the display panel into the first frequency.

The input image data may be stored in the frame memory, the transmission of the input image data may be inactivated, and storage image data stored in the frame memory may be outputted to the display panel at the second frequency, when the still image start signal is applied.

The transmission of the input image data may be activated and the input image data may be outputted to the display panel at the first frequency, when the still image end signal is applied.

A length of a vertical blank period when the display panel is driven at the second frequency may be longer than a length of the vertical blank period when the display panel is driven at the first frequency.

The display panel may be driven with a frequency that is higher than the second frequency and is lower than the first frequency during an S1 frame after the still image start signal is applied.

A length of the vertical blank period may be gradually increased during the S1 frame.

The display panel may be driven with a frequency that is higher than the second frequency and is lower than the first frequency during an S2 frame after the still image end signal is applied.

A length of the vertical blank period may be gradually decreased during the S2 frame.

The display panel may comprise: a substrate; a gate line and a data line formed on the substrate; a switching element connected to the gate line and the data line; and a pixel electrode connected to the switching element, wherein the gate line is applied with a gate signal comprising a gate-on voltage and a gate-off voltage.

A clock frequency of the gate signal when the display panel is driven at the second frequency may be lower than the clock frequency of the gate signal when the display panel is driven at the first frequency.

A length of a vertical blank period when the display panel is driven at the second frequency may be longer than a length of the vertical blank period when the display panel is driven at the first frequency.

The display panel may be driven with the second frequency until the frame applied with the still image end signal ends, and the driving frequency of the display panel may be changed into the first frequency in a frame after the still image end signal is applied.

The display panel may comprise a gate line and a data line, a gate driver configured to drive the gate line, and a data driver configured to drive the data line, wherein the signal controller may transmit an STV signal and a CPV signal to the gate driver.

The signal controller may transmit the STV signal to the gate driver at the start position of every frame except for a position where the second frequency is changed into the first frequency.

The signal controller may be controlled for the width of the CPV signal to be the same when the display panel is driven with the first frequency and the second frequency.

The signal controller may be controlled for the width of the CPV signal to have the same width as the clock signal of p times when the display panel is driven with the first frequency, and for the width of the CPV signal to have the same width as the clock signal of q times less than p times when the display panel is driven with the second frequency.

The signal controller may gamma-correct image data when the display panel is driven with the second frequency, and may transmit the gamma-corrected image data to the display panel.

The method may further comprise: counting the number of still image sequential frames inputted before the still image end signal is applied after the still image start signal is applied; and counting the number of motion picture sequential frames inputted until the still image start signal is applied after the still image end signal is applied.

The signal controller may store the input image data in the frame memory and may inactivate the transmission of the input image data when the number of the still image sequential frames is equal to or more than x, and may activate the transmission of the input image data when the number of the motion picture sequential frames is equal to or more than y.

The signal controller may output the storage image data stored in the frame memory to the display panel at the second frequency when the number of the still image sequential frames is equal to or more than x, and may output the input image data to the display panel at the first frequency when the number of the motion picture sequential frames is equal to or more than y.

When the display panel is driven at the first frequency, the light source unit may be driven at the first ratio, and when the display panel is driven at the second frequency, the light source unit may be driven at the second ratio.

When the display panel is a normally black mode, the second ratio may have a lower value than the first ratio, and when the display panel is a normally white mode, the second ratio may have a higher value than the first ratio.

The driving ratio of the light source unit according to the driving frequency of the display panel may be selected by using a look-up table or a function.

The conversion of the driving frequency of the display panel and the driving ratio of the light source unit may be performed in a vertical blank period.

When the display panel is driven with the first frequency, a driving ratio of the light source unit may be constantly maintained, and when the display panel is driven with the second frequency, the driving ratio of the light source unit may be periodically changed.

The display panel may be a normally black mode, when the display panel is driven with the first frequency, the light source unit may be driven with the first ratio, and when the display panel is driven with the second frequency, the light source unit may be driven with the first ratio and a ratio that is sequentially decreased from the first ratio.

The display panel may comprise a gate line and a data line, the display device may further comprise a gate driver configured to drive the gate line and a data driver configured to drive the data line, and the signal controller may transmit an STV signal to the gate driver at the start position every frame.

When the display panel is driven with the second frequency, the light source unit may be driven with the first ratio at a position transmitting the STV signal, and the light source unit may be driven with a ratio that is sequentially decreased from the first ratio before transmission of a next STV signal.

A transmission cycle of the STV signal when the display panel is driven with the first frequency may be the same as a change cycle of the driving ratio of the light source unit when the display panel is driven with the second frequency.

The display panel may be a normally white mode, when the display panel is driven with the first frequency, the light source unit may be driven with the first ratio, and when the display panel is driven with the second frequency, the light source unit may be driven with the first ratio and a ratio that is sequentially increased from the first ratio.

When the display panel is driven with the first frequency, the signal controller may apply a common voltage having a constant value to the display panel, and when the display panel is driven with the second frequency, the signal controller may apply a common voltage having a value that is changed to the display panel.

When the display panel is driven with the second frequency, the signal controller may apply a common voltage having a first voltage in the first period and a second voltage that is higher than the first voltage in the second period.

One frame may comprise an effective period in which the image data is transmitted and a vertical blank period in which the image data is not transmitted, the first period may be the effective period, and the second period may be the vertical blank period.

When the display panel is driven with the second frequency, the signal controller may apply a common voltage having a third voltage that is higher than the second voltage in the third period to the display panel.

One frame may comprise an effective period in which the image data is transmitted and a vertical blank period in which the image data is not transmitted, the first period may be the effective period, the second period may be a portion of the vertical blank period, and the third period may be a remaining portion of the vertical blank period.

When the display panel is driven with the second frequency, the signal controller may apply a common voltage having the first voltage in the first period and swinging between the first voltage and the second voltage that is higher than the first voltage in the second period.

The common voltage may be gradually changed with a value between the first voltage and the second voltage when the first voltage is changed into the second voltage.

The method may further comprise: storing the input image data to the frame memory if the still image start signal is applied; calculating a representative value of the storage image data stored to the frame memory; correcting the representative value according to the kick-back voltage to generate and auxiliary image data; and applying the auxiliary voltage corresponding to the auxiliary image data to the data line in the vertical blank period.

The data line may be provided in plural, and the representative value of the storage image data may be calculated for each data line.

The representative value may be an average gray value of the storage image data.

The representative value may be an average gray value of upper t bits of the storage image data.

The representative value may be a middle value between a maximum gray value and a minimum gray value of the storage image data.

The auxiliary image data may be generated by $Ga=Gr-dG$ (Ga: a gray value of the auxiliary image data, Gr: the representative value, dG: a kick-back correction gray value depending on the representative value).

The kick-back correction gray value may be a value stored in a look-up table or calculated by a function.

When the kick-back correction gray value is a value calculated by the function, the function may be generated by linear interpolation by using a kick-back correction gray value at a minimum gray, a kick-back correction gray value at a maximum gray, and a gray value when the magnitude of the kick-back correction gray value is a maximum.

When the display panel is driven at the second frequency, the signal controller may apply a gate-off voltage having a range $Va-0.2|Va|\leq Voff2 \leq Va+0.2|Va|$ (Voff2: the gate-off voltage when the display panel is driven at the second frequency, Va: voltage of the control terminal of the switching element when leakage current flowing between the input terminal and the output terminal of the switching element when the positive pixel voltage is applied to the pixel electrode and leakage current flowing between the input terminal and the output terminal of the switching element when the negative pixel voltage is applied to the pixel electrode are the same) to the display panel.

When the display panel is driven at the second frequency, the signal controller may apply a gate-off voltage having a range $Va-0.1|Va|\leq Voff2 \leq Va+0.1|Va|$ (Voff2: the gate-off voltage when the display panel is driven at the second frequency, Va: voltage of the control terminal of the switching element when leakage current flowing between the input terminal and the output terminal of the switching element when the positive pixel voltage is applied to the pixel electrode and leakage current flowing between the input terminal and the output terminal of the switching element when the negative pixel voltage is applied to the pixel electrode are the same) to the display panel.

When the display panel is driven at the first frequency, the signal controller may apply a gate-off voltage having a range $Va-0.2|Va|\leq Voff1 \leq Va+0.2|Va|$ (Voff1: the gate-off voltage when the display panel is driven at the first frequency, Va: voltage of the control terminal of the switching element when leakage current flowing between the input terminal and the output terminal of the switching element when the positive pixel voltage is applied to the pixel electrode and leakage current flowing between the input terminal and the output terminal of the switching element when the negative pixel voltage is applied to the pixel electrode are the same).

When the display panel is driven at the first frequency, the signal controller applies a gate-off voltage having a range $Va-0.1|Va|\leq Voff1 \leq Va+0.1|Va|$ (Voff1: the gate-off voltage when the display panel is driven at the first frequency, Va: voltage of the control terminal of the switching element when leakage current flowing between the input terminal and the output terminal of the switching element when the positive pixel voltage is applied to the pixel electrode and leakage current flowing between the input terminal and the output terminal of the switching element when the negative pixel voltage is applied to the pixel electrode are the same).

The gate-off voltage when the display panel is driven at the first frequency may be the same as the gate-off voltage when the display panel is driven at the second frequency.

The gate-off voltage when the display panel is driven at the first frequency may be lower than the gate-off voltage when the display panel is driven at the second frequency.

In the display device and the driving method thereof according to an exemplary embodiment, the still image is displayed with a lower frequency compared with the motion picture, thereby reducing power consumption. The frequency of the still image is set lower than a predetermined value such that power consumption shows a net reduction after considering power requirements of the frame memory.

Also, the still image is further displayed at a position where the lower still image frequency is converted into the faster motion picture frequency such that no switching defect is noticeable when the frequency change occurs.

Also, although the frequency is changed, the width of the CPV signal is set to be constant or is gamma-corrected such that any visibility defect due to the frequency change may be prevented.

Also, the dimming driving for the light source unit is performed during the frequency change such that any luminance change associated with the frequency change may be prevented.

Also, when the number of the still image sequential frames is more than a predetermined number or the number of the motion picture sequential frames is more than another predetermined number, the driving frequency of the display panel is changed such that any luminance change associated with the frequency change may be prevented.

Also, when driving the display panel with the second frequency, the common voltage is changed to change the luminance, and thereby flicker is imperceptible.

Also, when driving the display panel with the second frequency, the value representing the storage image data for each data line is calculated in the vertical blank period and the auxiliary voltage corresponding to the kick-back correction value is applied to the data line such that the leakage current may be reduced, thereby reducing flicker.

Further, by setting a range of gate-off voltage based on the time when leakage current of the switching element when the positive pixel voltage is applied to the pixel electrode is the same as leakage current of the switching element when the negative pixel voltage is applied to the pixel electrode, it is possible to reduce flicker.

DETAILED DESCRIPTION OF THE EMBODIMENTS

Figure 1:
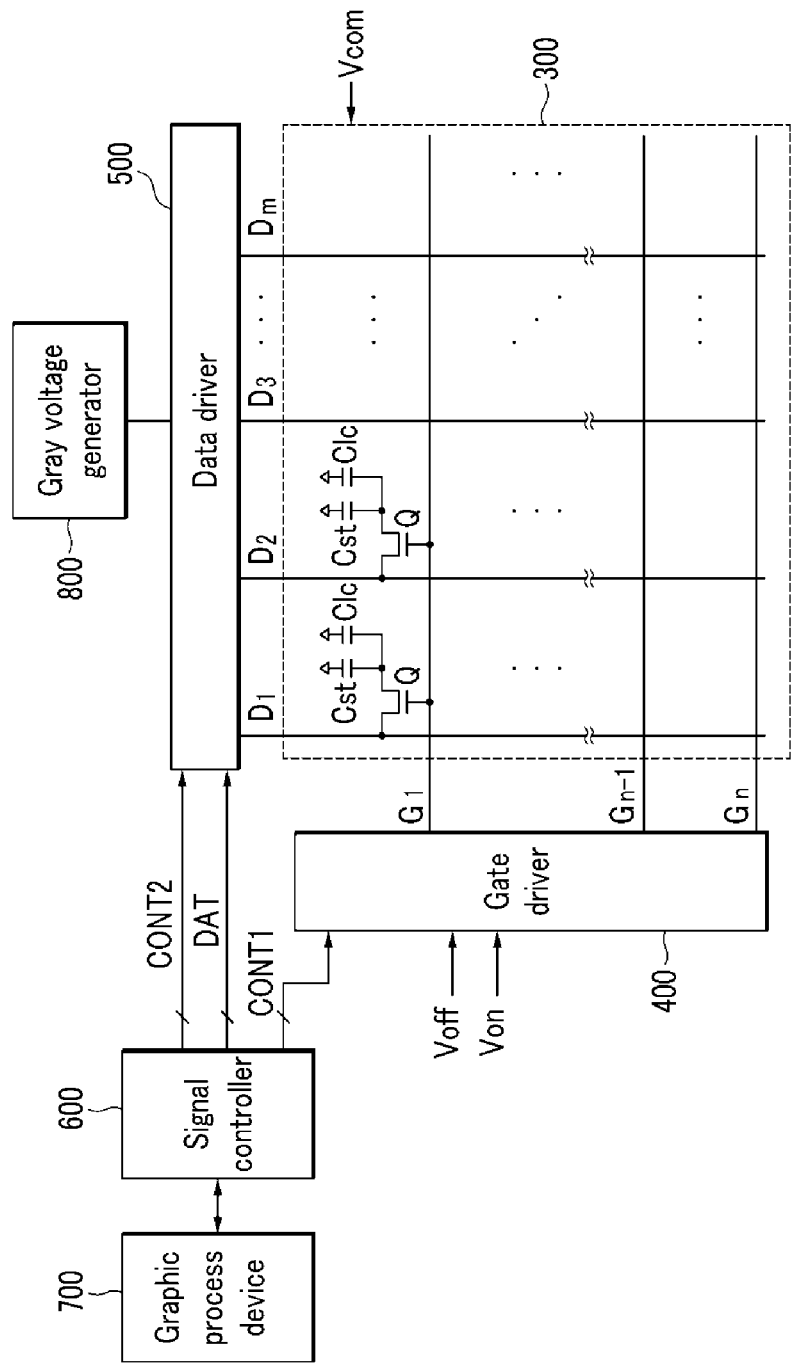
FIG. 1 is a block diagram of a display device according to a first exemplary embodiment.

The present disclosure will be described more fully hereinafter with reference to the accompanying drawings, in which exemplary embodiments are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

First, a display device according to the first exemplary embodiment will be described below with reference to the accompanying drawings.

FIG. 1 is a block diagram of a display device according to the first exemplary embodiment.

As shown in FIG. 1, the display device according to the first exemplary embodiment includes a display panel 300 displaying an image, a signal controller 600 controlling signals for driving the display panel 300, and a graphics processing unit 700 transmitting input image data to the signal controller 600.

The display panel 300 receives image data DAT from the signal controller 600 to display a still image and a motion picture. If a plurality of sequential frames have the same image data DAT, the still image is displayed, and if the plurality of sequential frames have different image data DAT, the motion picture is displayed.

The display panel 300 includes a plurality of gate lines G1-Gn and a plurality of data lines D1-Dm, the plurality of gate lines G1-Gn extend in a horizontal direction, and the plurality of data lines D1-Dm extend in a vertical direction while crossing the plurality of gate lines G1-Gn.

One of the gate lines G1-Gn and one of the data lines D1-Dm are connected with one pixel, and a switching element Q connected with one of the gate lines G1-Gn and one of the data lines D1-Dm is included in each pixel. A control terminal of the switching element Q is connected to the gate lines G1-Gn, an input terminal thereof is connected with the data lines D1-Dm, and an output terminal is connected with a liquid crystal capacitor CLC and a storage capacitor CST.

The display panel 300 of FIG. 1 is shown as a liquid crystal panel, however the display panel 300 may be one of the various types of display panels, such as, for example, an organic light emitting panel, an electrophoretic display panel, or a plasma display panel, as well as the liquid crystal panel.

The signal controller 600 processes the input image data and the control signals so as to be suitable for the operation condition of the liquid crystal panel 300 in response to the input image data received from the graphics processing unit 700 and the control signals thereof, for example, a vertical synchronization signal Vsync, a horizontal synchronization signal Hsync, a main clock signal MCLK, a data enable signal DE, and the like, and then generates and outputs a gate control signal CONT1 and a data control signal CONT2.

The gate control signal CONT1 includes a vertical synchronization start signal STV instructing an output start of a gate-on pulse (high time of a gate signal GS), a gate clock signal CPV controlling an output time of the gate-on pulse, and the like.

The data control signal CONT2 includes a horizontal synchronization start signal STH instructing an input start of the image data DAT, a load signal TP instructing application of the corresponding data voltage to the data lines D1-Dm, and the like.

The graphics processing unit 700 transmits the input image data to the signal controller 600. When the display panel 300 displays the motion picture, the graphics processing unit 700 transmits the input image data to the signal controller 600 every frame. When the display panel 300 displays the still image, because the signal controller 600 stores the input image data received from the graphics processing unit 700 to transmit the input image data to the display panel 300, the graphics processing unit 700 does not transmit the input image data to the signal controller 600. That is, when the display panel 300 displays the still image, the graphics processing unit 700 is inactivated.

The graphics processing unit 700 transmits a still image start signal to the signal controller 600 at the conversion time when the input image data displaying the motion picture is transmitted, and then the input image data displaying the still image is transmitted. Further, the graphics processing unit 700 transmits a still image end signal to the signal controller 600 at the conversion time when the input image data displaying the still image is transmitted, and then the input image data displaying the motion picture is transmitted.

The display device according to the first exemplary embodiment may further include a gate driver 400 driving the gate lines G1-Gn and a data driver 500 driving the data line D1-Dm.

The plurality of gate lines G1-Gn of the display panel 300 are connected to the gate driver 400, and the gate driver 400 alternately applies a gate-on voltage Von and a gate-off voltage Voff to the gate lines G1-Gn according to the gate control signal CONT1 applied from the signal controller 600.

The display panel 300 may be formed by two sheets of substrates which face each other and are bonded to each other, and the gate driver 400 may be formed so as to be attached to one side edge of the display panel 300. Further, the gate driver 400 may also be mounted on the display panel 300 together with the gate lines G1-Gn, the data lines D1-Dm, and the switching elements Q. That is, the gate driver 400 may be formed together in the process of forming the gate lines G1-Gn, the data lines D1-Dm, and the switching elements Q.

The plurality of data lines D1-Dm of the display panel 300 are connected to the data driver 500, and the data driver 500 receives the data control signal CONT2 and the image data DAT from the signal controller 600. The data driver 500 converts the image data DAT into a data voltage by using a gray voltage generated from a gray voltage generator 800, and transfers the converted data voltage to the data lines D1-Dm.

Next, a signal controller of the display device according to the first exemplary embodiment will be described.

Figure 2:
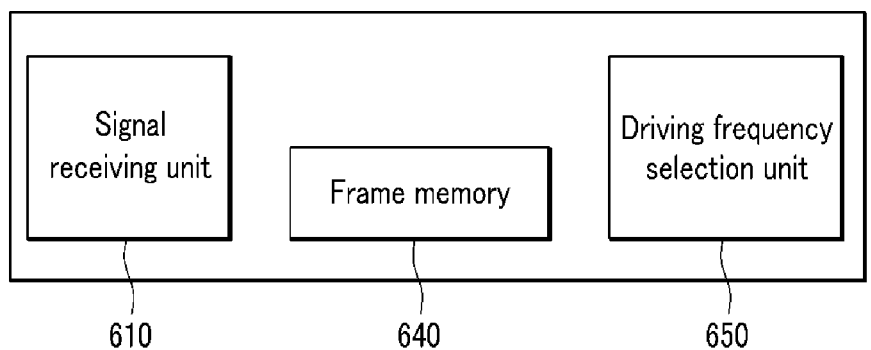
FIG. 2 is a block diagram illustrating a signal controller of the display device according to the first exemplary embodiment.

FIG. 2 is a block diagram of a signal controller of a display device according to the first exemplary embodiment.

The signal controller 600 may include a signal receiving unit 610 receiving various signals from the graphics processing unit 700, a frame memory 640 storing the input image data, and a driving frequency selecting unit 650 selecting a first frequency when the motion picture is displayed and selecting a second frequency when the still image is displayed.

The signal receiving unit 610 receives the input image data, the still image start signal, and the still image end signal from the graphics processing unit 700. Although not shown, the signal receiving unit 610 is connected with the graphics processing unit 700 through a main link and a sub-link. The signal receiving unit 610 receives the input image data from the graphic processing unit 700 through the main link. Further, the signal receiving unit 610 receives the still image start signal and the still image end signal from the graphics processing unit 700 through the sub-link and transmits a signal for notifying a driving state of the display panel 300 to the graphics processing unit 700.

The frame memory 640 receives and stores the input image data from the signal receiving unit 610. When the display panel displays the motion picture, the frame memory 640 is not used. When the display panel displays the still image, the input image data is stored in the frame memory 640, and the storage image data stored in the frame memory 640 is outputted to the display panel 300.

The driving frequency selecting unit 650 selects the first frequency when the display panel displays the motion picture and selects the second frequency when the display panel displays the still image. When the motion picture is displayed, the input image data is received from the signal receiving unit 610 to be outputted to the display panel 300 at the first frequency. When the still image is displayed, the storage image data is received from the frame memory 640 to be outputted to the display panel 300 at the second frequency.

In this case, the second frequency has a lower value than the first frequency.

For example, the first frequency may be 60 Hz, which means that 60 frames are reproduced per second and displayed on the screen. Further, the second frequency may be 10 Hz, which means that 10 frames are reproduced per second and displayed on the screen. In such case, the power consumption is decreased by ⅙ when displaying the still image as compared to the display of the moving picture. Accordingly, the frequency used when displaying the still image is set to be lower than the frequency used when displaying the moving picture by a predetermined ratio, and thereby the power consumption is decreased by more than the increase in the amount of the power consumption as a result of the addition of the frame memory.

When the motion picture is displayed, if the driving frequency is reduced, there is a problem in that the motion looks unnatural, but when the still image is displayed, because the frame having the same image data DAT is repeatedly reproduced, although the driving frequency is reduced, such a problem does not occur. However, if the frequency is decreased, the flicker is increased such that it is preferable to decrease the frequency only to the degree that the flicker does not appear.

Next, a driving method of a display device according to an exemplary embodiment will be described with reference to FIG. 1 and FIG. 3.

Figure 3:
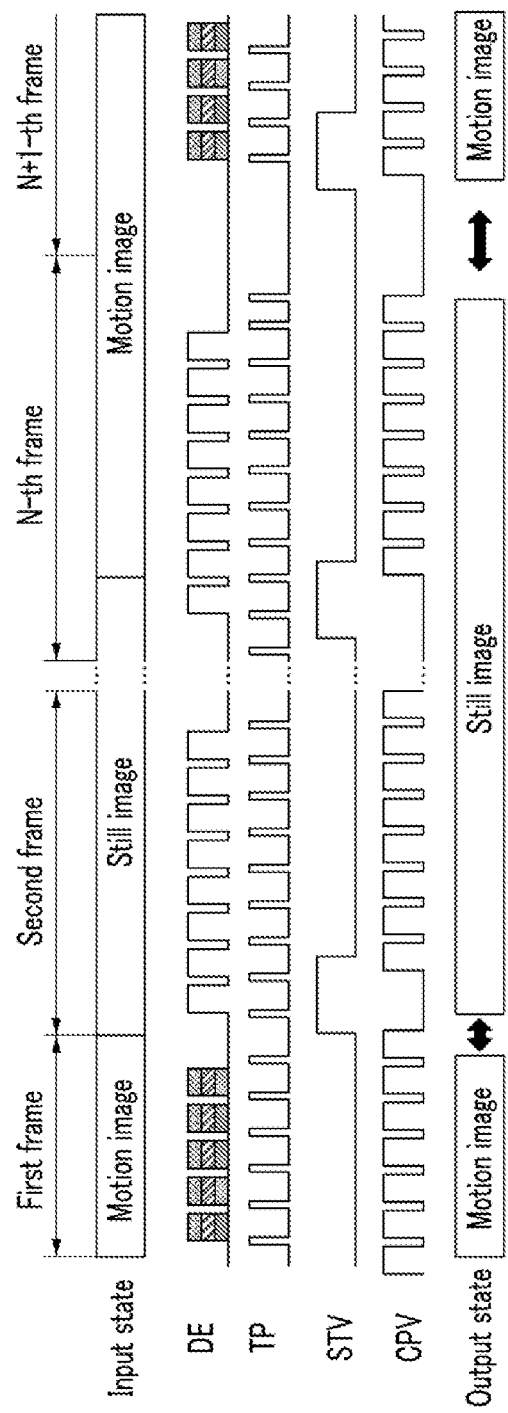
FIG. 3 is a view of control signals of a display device according to the first exemplary embodiment.

FIG. 3 is a view of control signals of a display device according to the first exemplary embodiment.

First, in the first frame as a frame displaying the moving picture, the graphics processing unit 700 transmits the image data DAT of the moving picture to the signal controller 600, and the signal controller 600 transmits the gate control signal CONT1 to the gate driver 400 and the image data DAT and the data control signal CONT2 to the data driver 500. At this time, the display panel 300 displays the moving picture with the first frequency in the first frame. For example, in the case that the first frequency is 60 Hz, the screen is displayed during 1/60 of a second in the first frame.

That is, the graphics processing unit 700 recognizes the first frame of the moving picture and supplies the image data DAT, and the display panel 300 displays the moving picture with the first frequency.

Next, in the second frame as a frame displaying the still image, the graphics processing unit 700 transmits the image data DAT of the still image to the signal controller 600 along with a still image start signal informing signal controller 600 of the start of the still image. The signal controller 600 receives the still image start signal to recognize the start of the still image and stores the image data DAT of the still image to the frame memory. Also, the signal controller 600 inactivates the graphics processing unit 700 such that the graphics processing unit 700 does not transmit the image data DAT of the still image.

The signal controller 600 transmits the image data DAT of the still image stored to the frame memory to the data driver 500. Here, the display panel 300 displays the moving picture with the second frequency in the second frame. For example, in the case that the second frequency is 40 Hz, the screen is displayed during 1/40 of a second in the second frame.

That is, in the second frame, the graphics processing unit 700 recognizes the second frame of the still image such that it is inactivated, and the display panel 300 displays the still image with the second frequency.

Although not shown, the display panel 300 displays the still image with the second frequency from the third frame to the (n−1)-th frame like it does the second frame.

Next, in the n-th frame as a frame corresponding to a position where the still image is converted into the moving picture, the graphics processing unit 700 transmits the image data DAT of the moving picture to the signal controller 600 along with a still image finish signal informing of the finish of the still image.

At this time, the display panel 300 is driven with the second frequency to the frame before the n-th frame, and the graphics processing unit 700 recognizes the display panel 300 that is driven with the first frequency, thereby the change of the frequency is generated in the middle position of the n-th frame. Also, a time delay is generated while the image data DAT of the moving picture is transmitted from the graphics processing unit 700. Accordingly, to prevent deterioration of the visibility due as a result of the time delay, the image data DAT of the still image is displayed with the second frequency until the n-th frame in which the still image finish signal is applied is finished.

That is, in spite of a period in which the moving picture must be displayed to a vertical blank period when the n-th frame is finished after the still image finish signal is applied in the middle position of the n-th frame, the display panel 300 displays the still image with the second frequency.

Next, in the (n+1)-th frame as a frame displaying the moving picture, the graphics processing unit 700 transmits the image data DAT of the moving picture to the signal controller 600, and the display panel 300 displays the moving picture with the first frequency.

Next, another method of driving the display device according to the first exemplary embodiment will be described with reference to FIG. 1 and FIG. 4.

Figure 4:
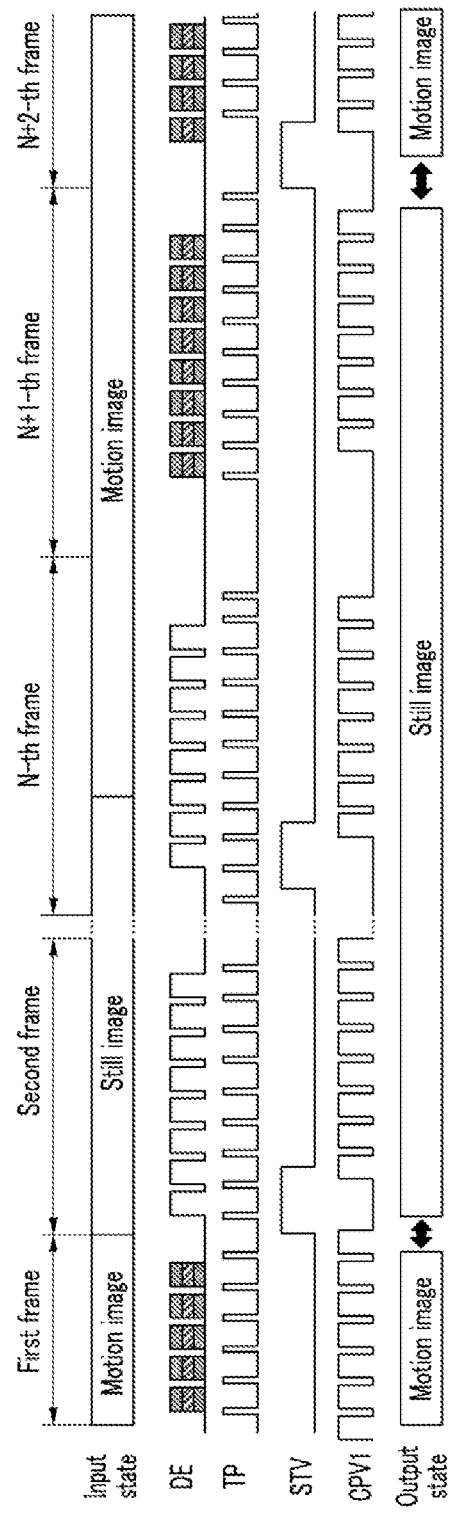
FIG. 4 is an alternative view of control signals of a display device according to the first exemplary embodiment.

FIG. 4 is a view showing control signals of a display device according to the first exemplary embodiment.

The present exemplary embodiment is similar to the above, and therefore parts that differ from the first exemplary embodiment will be described.

The driving method of the display device in the first frame, the second frame, and the n-th frame is the same as that described above.

In the (n+1)-th frame, the graphics processing unit 700 recognizes the (n+1)-th frame as the frame displaying the moving picture and transmits the signal data DAT of the moving picture to the signal controller 600.

The signal controller 600 transmits the STV signal to the gate driver 400 at the start position of each frame, and the gate driver 400 then receives the CPV signal from the signal controller 600 to turn on the switching element Q of the display panel 300. However, the signal controller 600 does not transmit the STV signal to the gate driver 400 at the start position of the (n+1)-th frame as a position where the second frequency is changed into the first frequency. Accordingly, although the CPV signal is applied to the gate driver 400 in the (n+1)-th frame, the STV signal is not applied such that the switching element Q of the display panel 300 enters a turned-off state.

That is, the switching element Q is not turned on in the (n+1)-th frame such that the pixel is not charged and is maintained as the charged voltage in the n-th frame, and thereby the display panel 300 displays the still image.

Next, in the (n+2)-th frame as a frame displaying the moving picture, the graphics processing unit 700 transmits the image data DAT of the moving picture to the signal controller 600, and the display panel 300 displays the moving picture with the first frequency.

The signal controller 600 of the display device according to the first exemplary embodiment may realize the first frequency and the second frequency by various methods.

For example, the various methods include a method of changing a clock frequency of a gate signal, a method of changing a length of a vertical blank period, a method of changing a clock frequency of a gate signal and changing a length of a vertical blank period at the same time, and the like, and will be described below with reference to FIGS. 5 to 9.

Figure 5:
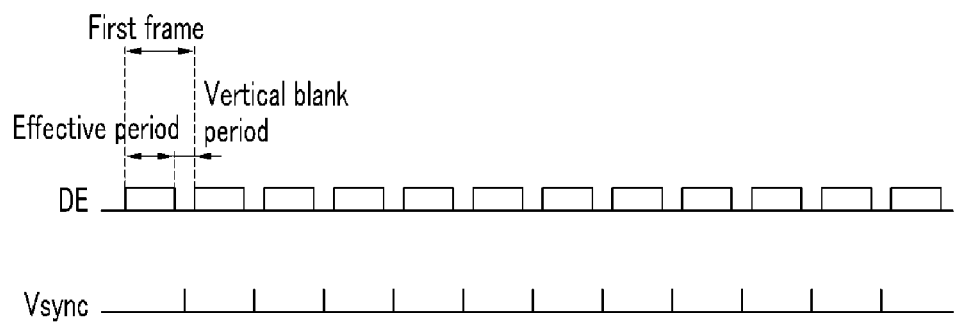
FIG. 5 is a diagram illustrating a DE signal and a Vsync signal used in a display device according to the first exemplary embodiment.
Figure 6:
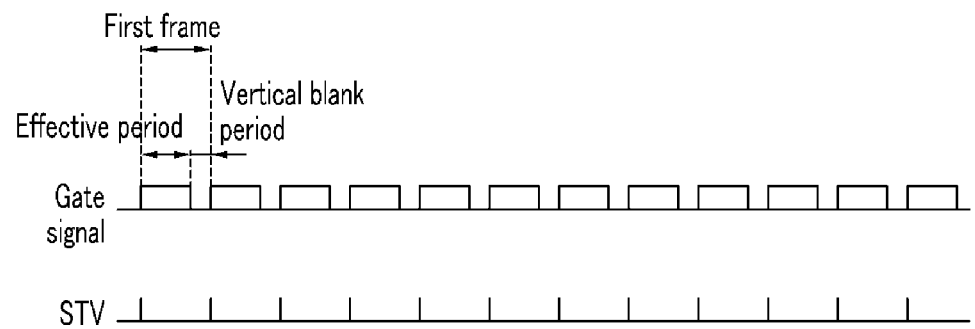
FIG. 6 is a diagram illustrating a gate signal and an STV signal when a display panel is driven at a first frequency in the display device according to the first exemplary embodiment.
Figure 7:
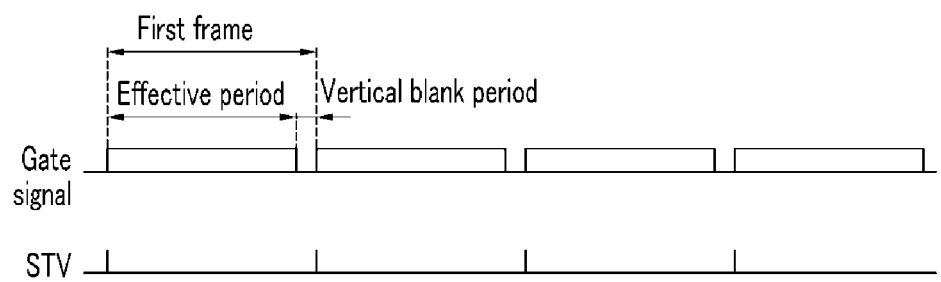
FIG. 7 to FIG. 9 are diagrams illustrating a gate signal and an STV signal when a display panel is driven at a second frequency in the display device according to the first exemplary embodiment.
Figure 8:
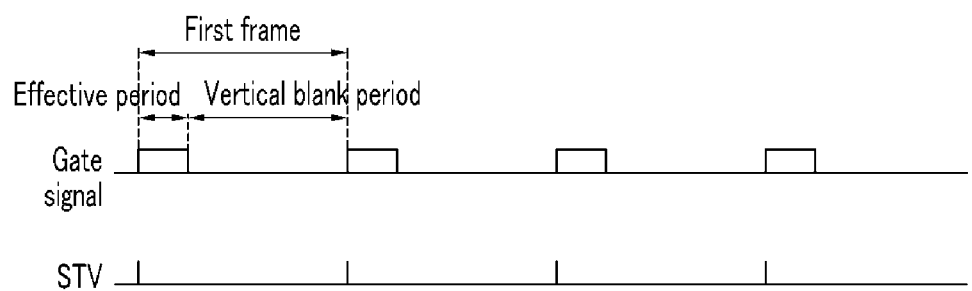
Figure 9:
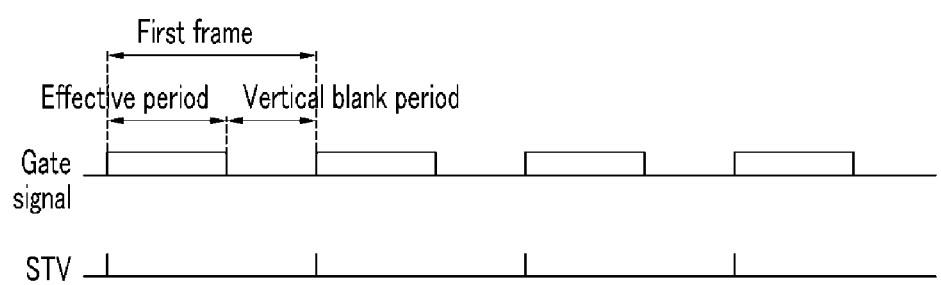

FIG. 5 is a diagram illustrating a DE signal and a Vsync signal used in the display device according to the first exemplary embodiment. FIG. 6 is a diagram illustrating a gate signal and an STV signal when a display panel is driven at a first frequency in the display device according to the first exemplary embodiment. FIGS. 7 to 9 are diagrams illustrating a gate signal and an STV signal when a display panel is driven at a second frequency in the display device according to the first exemplary embodiment.

As shown in FIG. 5, one frame is configured by an effective period in which image data is transmitted and a vertical blank period in which image data is not transmitted. Image data of two adjacent frames may be divided by the vertical blank period.

As shown in FIG. 6, when the display panel 300 is driven at the first frequency, the gate signal is supplied in the effective period so that pixel voltage corresponding to the image data may be applied. A gate-off state may be maintained in the vertical blank period.

As shown in FIG. 7, when the display panel 300 is driven at the second frequency, the length of one frame is increased as compared with the time when the display panel 300 is driven at the first frequency. For example, in the case in which the first frequency is 60 Hz and the second frequency is 20 Hz, as shown in FIG. 4, when the display panel 300 is driven at the second frequency, the length of one frame is increased by three times as compared with the frame length when the display panel 300 is driven at the first frequency. In this case, the length of the effective period when the display panel 300 is driven at the second frequency is three times or more longer than the length of the effective period when the display panel 300 is driven at the first frequency, thereby implementing the second frequency. In order to increase the length of the effective period, the clock frequency of the gate signal may be increased about three times or more. When the display panel 300 is driven at the first frequency or at the second frequency, the lengths of the vertical blank periods are not significantly different from each other.

FIG. 8 is the same as FIG. 7 in that the length of one frame when the display panel 300 is driven at the second frequency is increased three times as compared with the time when the display panel 300 is driven at the first frequency. Unlike FIG. 7, however, in FIG. 8, the length of the effective period when the display panel 300 is driven at the second frequency is almost the same as the length of the effective period when the display panel 300 is driven at the first frequency. However, the length of the vertical blank period when the display panel 300 is driven at the second frequency is increased by as much as a length corresponding to two frames when the display panel 300 is driven at the first frequency, thereby implementing the second frequency.

FIG. 9 is the same as FIGS. 7 and 8 in that the length of one frame when the display panel 300 is driven at the second frequency is increased three times as compared with the time when the display panel 300 is driven at the first frequency. Unlike FIGS. 7 and 8, however, in FIG. 9, the length of the effective period when the display panel 300 is driven at the second frequency is longer than the length of the effective period when the display panel 300 is driven at the first frequency. Simultaneously, the length of the vertical blank period when the display panel 300 is driven at the second frequency is longer than the length of the effective period when the display panel 300 is driven at the first frequency. That is, the length of the effective period when the display panel 300 is driven at the second frequency has a length corresponding to about two frames when the display panel 300 is driven at the first frequency, and the length of the vertical blank period when the display panel 300 is driven at the second frequency has a length corresponding to one frame when the display panel 300 is driven at the first frequency, thereby implementing the second frequency.

As described above, when the still image is displayed, a driving frequency of the display panel 300 is decreased, such that power consumption may be reduced.

If the still image start signal is applied, the signal controller 600 controls the signals such that the display panel 300 is driven with the second frequency. At this time, the frequency of the display panel 300 that was driven with the first frequency may be directly converted into the second frequency at the position where the still image start signal is applied. Also, after the still image start signal is applied, the display panel 300 may be driven with a frequency that is higher than the second frequency and lower than the first frequency during a frame 51. That is, after the still image start signal is applied, the display panel 300 may be converted into the second frequency after the passage of the frame 51 through a transient period during the frame S1. To realize this, during the frame 51 after the still image start signal is applied, the length of the vertical blank period may be gradually increased.

If the still image start signal is applied, the signal controller 600 controls the signals such that the display panel 300 is driven with the first frequency. The frequency of the display panel 300 that was driven with the second frequency may be directly converted into the first frequency at the time when the still image start signal is applied. Also, after the still image start signal is applied, the display panel 300 may be driven with a frequency that is higher than the second frequency and lower than the first frequency during a frame S2. That is, after the still image start signal is applied, the display panel 300 may be converted into the second frequency after the passage of the frame S2 through the transient period during the frame S2. To realize this, during the frame S1 after the still image start signal is applied, the length of the vertical blank period may be gradually decreased.

As described above, in the display device according to the first exemplary embodiment, different clock signals are used to drive the still image and the motion picture with different frequencies. Next, the width of the CPV signal according to the usage of the different clock signals of the still image and the moving picture will be described with reference to FIG. 10 and FIG. 11.

Figure 10:
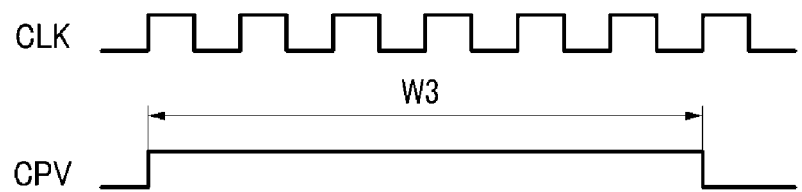
FIG. 10 is a diagram illustrating a clock signal and a CPV signal when a display panel is driven at a first frequency in the display device according to the first exemplary embodiment.
Figure 11:
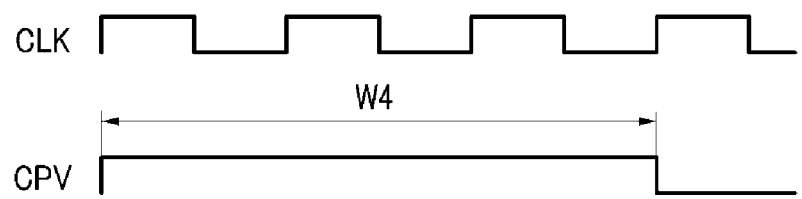
FIG. 11 is a diagram illustrating a clock signal and a CPV signal when a display panel is driven at a second frequency in the display device according to the first exemplary embodiment.

FIG. 10 is a view showing a clock signal and a CPV signal when being driven with the first frequency in a display device according to the first exemplary embodiment, and FIG. 11 is a view showing a clock signal and a CPV signal when being driven with the second frequency in a display device according to an exemplary embodiment. The clock signal is indicated by CLK, and the CPV signal is indicated by CPV.

As shown in FIG. 10, in the display device according to an exemplary embodiment, the width W3 of the CPV signal when being driven with the first frequency corresponds to six clock periods. If the CPV signal is set to have a width corresponding to the six clock periods when the display panel is driven with the second frequency, the clock signal when being driven with the first frequency is different from the clock signal when being driven with the second frequency such that the width of the CPV signal is changed.

As shown in FIG. 11, in the display device according to an exemplary embodiment, the width W4 of the CPV signal when being driven with the second frequency has a width corresponding to three clock periods. Accordingly, although the clock speed when being driven with the second frequency is later than the clock speed when being driven with the first frequency, by differentiating parameters of the widths of the CPV signals when being driven with the first frequency and the second frequency, the widths of the CPV signals may be equally maintained.

That is, for the signal controller, the width W3 of the CPV signal when the display panel is driven with the first frequency is set to have the same width as the p times clock signal (where p is a number), and the width W4 of the CPV signal when the display panel is driven with the second frequency is set up to have the same width as the q times clock signal (where q is a number), such that q is less than p. At this time, n and m may be set for the width W3 of the CPV signal when the display panel is driven with the first frequency and the width W4 of the CPV signal when being driven with the second frequency to be equal to each other.

Accordingly, the change ratio of the pixel when the display panel displays the still image is the same as the change ratio of the pixel when the display panel displays the moving picture such that any difference in visibility may be prevented.

Another method of preventing a difference in visibility between the still image and the moving picture will be described with reference to FIG. 12.

Figure 12:
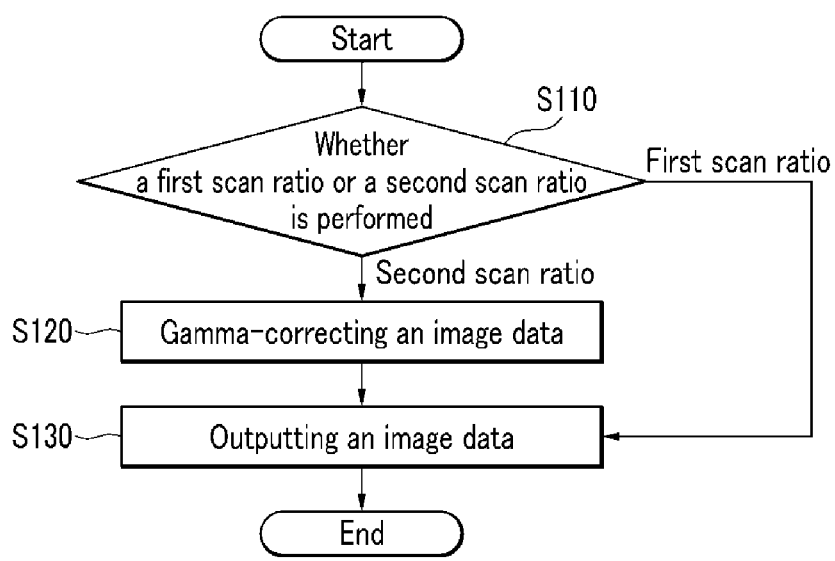
FIG. 12 is a flowchart showing a method of amending image data in a display device according to the first exemplary embodiment.

FIG. 12 is a flowchart showing a method of amending image data in a display device according to the first exemplary embodiment.

As shown in FIG. 12, the signal controller determines whether the display panel is driven with the first frequency or the second frequency in the corresponding frame (S110).

At this time, the changing ratios are different in the frames driven with the first frequency and the frames driven with the second frequency such that the images that are actually displayed are different even though the images have the same image data DAT. Accordingly, to compensate a luminance difference that is generated due to the different changing ratios of the pixel in the frames driven with the first frequency and the frames driven with the second frequency, gamma correction is used to compensates the gray characteristics (S120).

Next, the gamma-corrected image data DAT is output in the frame driven with the second frequency, and the image data DAT is output without the gamma correction in the frame driven with the first frequency (S130).

That is, the image data DAT in the frame driven with the second frequency is gamma-corrected such that any difference in visibility may be prevented even though the changing ratios of the pixel when the display panel displays the still image and the moving picture differ.

Next, a display device according to the second exemplary embodiment will be described with reference to FIG. 13 and FIG. 14.

Figure 13:
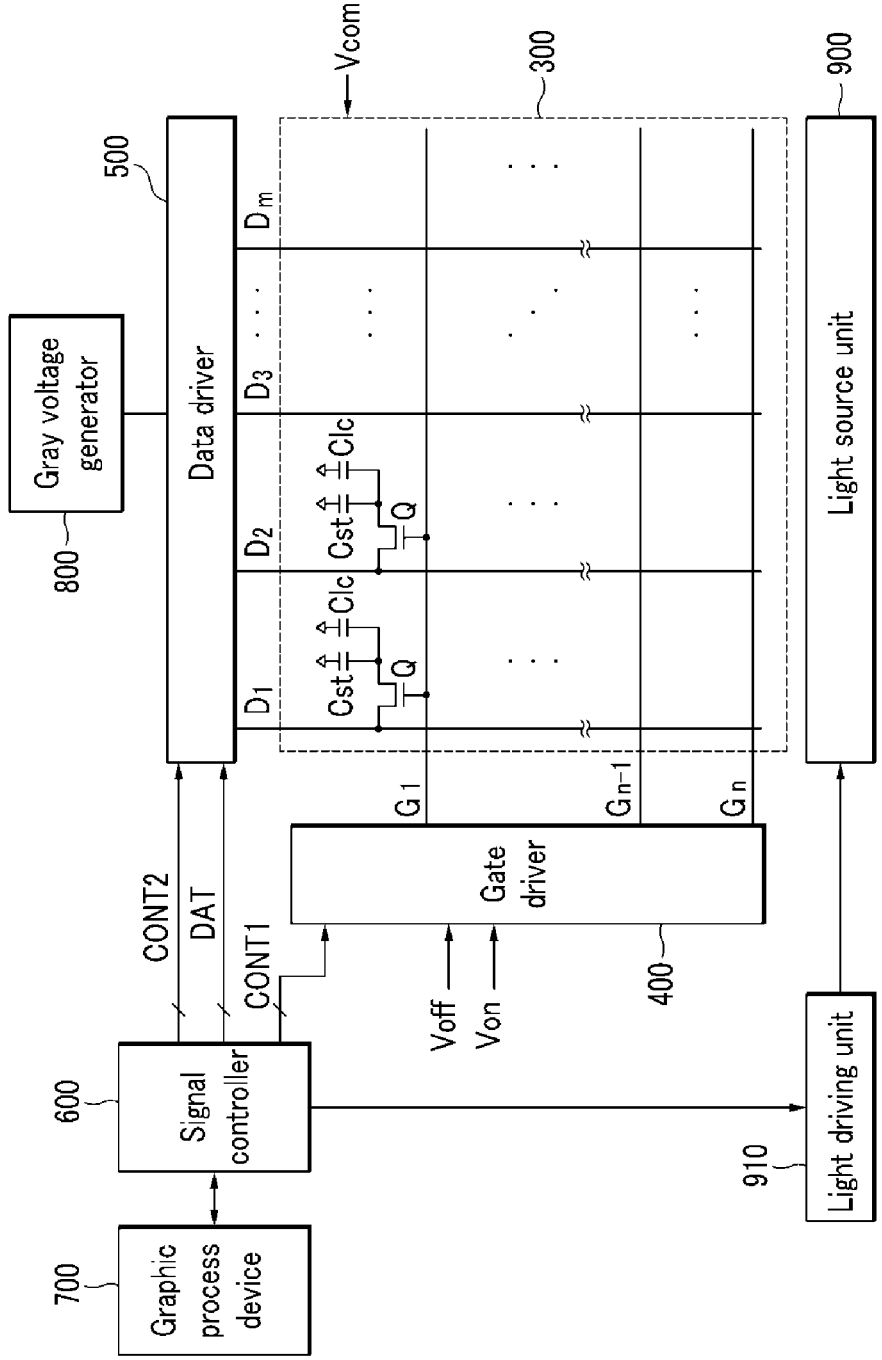
FIG. 13 is a block diagram of a display device according to the second exemplary embodiment.
Figure 14:
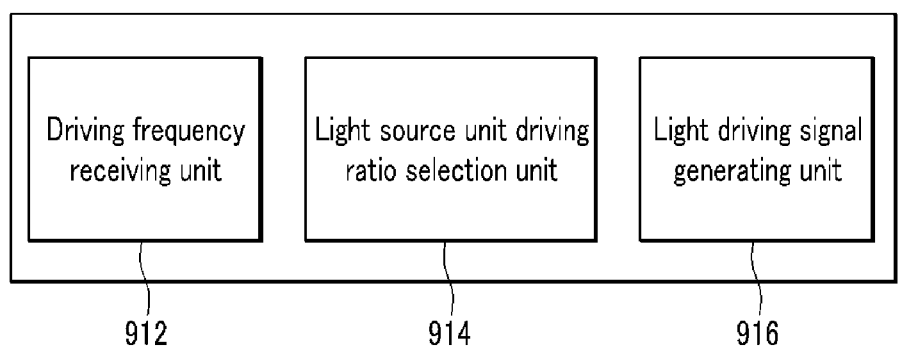
FIG. 14 is a block diagram illustrating a light source driver of the display device according to the second exemplary embodiment.

FIG. 13 is a block diagram of a display device according to the second exemplary embodiment, and FIG. 14 is a block diagram illustrating a light source driver of the display device according to the second exemplary embodiment.

Because the display device according to the second exemplary embodiment is almost the same as the display device according to the first exemplary embodiment, just the differences will be described below.

The display device according to the second exemplary embodiment may further include a light source unit 900 irradiating light to the display panel 300 and a light source driver 910 controlling signals for driving the light source unit 900, as shown in FIG. 13.

The light source unit 900 supplies the light to the inside of the display panel 300 and the supplied light is transmitted to the outside of the display panel 300 for display on a screen. The light source unit 900 may be configured by various light sources, and for example, a light emitting diode (LED), a cold cathode fluorescent lamp (CCFL), an external electrode fluorescent lamp (EEFL), and the like may be used. Further, the light source unit 900 is classified into a side (or edge) light type and a direct light type according to the layout geometry thereof.

The light source driver 910 controls dimming driving of the light source unit 900. Dimming driving is a technique for controlling the amount of light output from the light source in consideration of luminance of images, and is used to prevent a contrast ratio (CR) of an image from being reduced and also to minimize power consumption.

As shown in FIG. 14, the light source driver 910 includes a driving frequency receiving unit 912 receiving the driving frequency of the display panel 300 from the signal controller 600, a light source unit driving ratio selecting unit 914 determining a driving ratio of the light source unit 900 according to the driving frequency, and a light source driving signal generator 916 generating a signal for driving the light source 900 according to the driving ratio of the light source unit 900.

The driving frequency receiving unit 912 receives the first frequency from the signal controller 600 when the motion picture is displayed, and receives the second frequency from the signal controller 600 when the still image is displayed.

The driving ratio selecting unit 914 receives the driving frequency from the driving frequency receiving unit 912 to select the ratio for driving the light source unit. The driving ratio of the light source unit may be differently selected based on the driving frequency.

For example, the driving ratio of the light source unit 900 according to the driving frequency of the display panel 300 may be selected by using a look-up table. The driving ratio selecting unit 914 selects the driving ratio of the light source unit as a first ratio when the driving frequency is the first frequency and selects the driving ratio of the light source unit as a second ratio when the driving frequency is the second frequency, by using the look-up table as shown in Table 1. That is, when the motion picture is displayed, the light source unit is driven at the first ratio, and when the still image is displayed, the light source unit is driven at the second ratio.

TABLE 1

| Driving frequency (Hz) | Light source unit driving ratio (%) |
| --- | --- |
| First frequency | First ratio |
| Second frequency | Second ratio |

When the frequency for driving the display panel 300 is changed and reduced, a charging time of each pixel increases and a fully charged amount increases. Accordingly, luminance may be changed before and after a point in time when the frequency changes. In a normally black mode display device, the luminance increases as the fully charged amount increases. In a normally white mode display device, the luminance decreases as the fully charged amount increases.

Accordingly, when the second frequency has a lower value than the first frequency, in the normally black mode display device, the second ratio is set to a lower value than the first ratio in order to compensate the increased luminance. In this case, the power consumption may be reduced by decreasing the driving ratio of the light source unit.

On the contrary, in a normally white mode display device, the second ratio is set to a higher value than the first ratio to compensate for the decreased luminance.

As described above, the driving ratio of the light source unit 900 according to the driving frequency of the display panel 300 may be selected by using a look-up table, but the present disclosure is not limited thereto, and the driving ratio may be selected by using a function, y=f(x).

The light source driving signal generator 916 receives the driving ratio of the light source unit selected by the driving ratio selecting unit 914 to generate a signal capable of driving the light source unit at the first ratio or a signal capable of driving the light source unit at the second ratio and transmit the signals to the driver 900. In this case, the signals generated by the light source driving signal generator 916 may be various signals such as a PWM signal, a communication protocol such as I2C or the like, etc.

Hereinafter, a driving method of the display device according to the second exemplary embodiment will be described.

Figure 15:
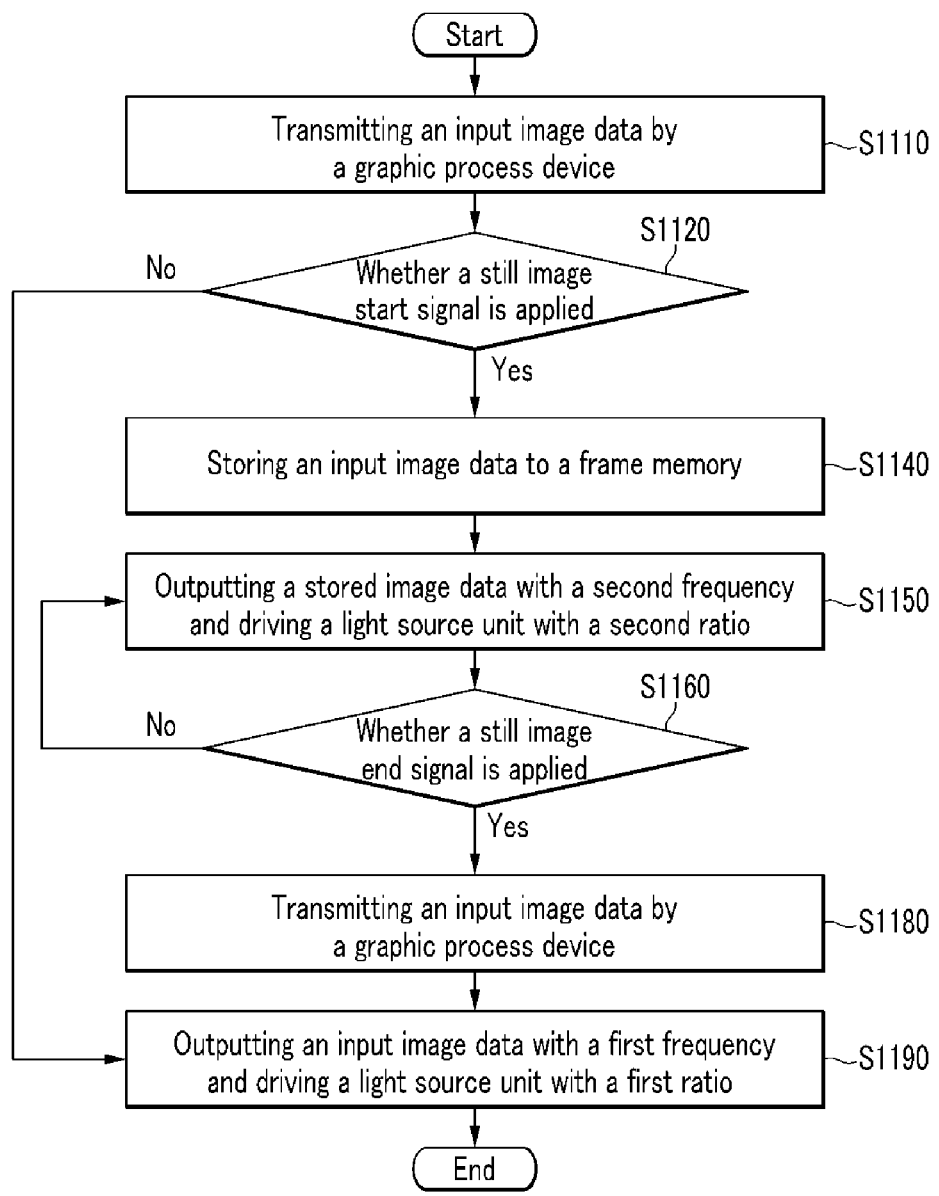
FIG. 15 is a flowchart illustrating a driving method of the display device according to the second exemplary embodiment.
Figure 16:
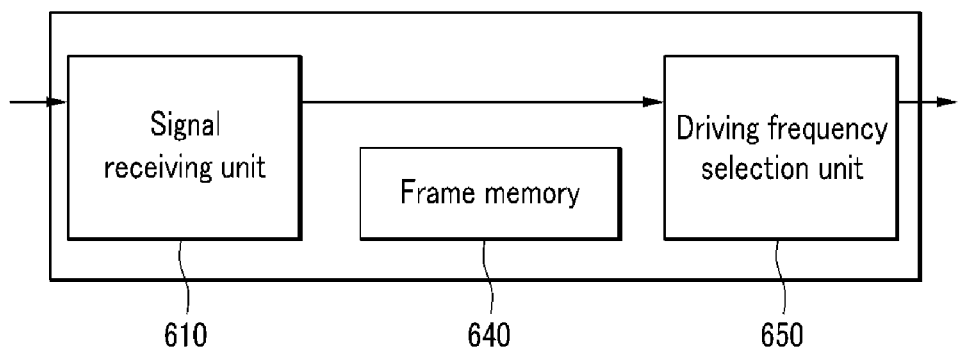
FIG. 16 to FIG. 18 are block diagrams of the signal controller illustrating the driving method of the display device according to the second exemplary embodiment for each step in sequence.
Figure 17:
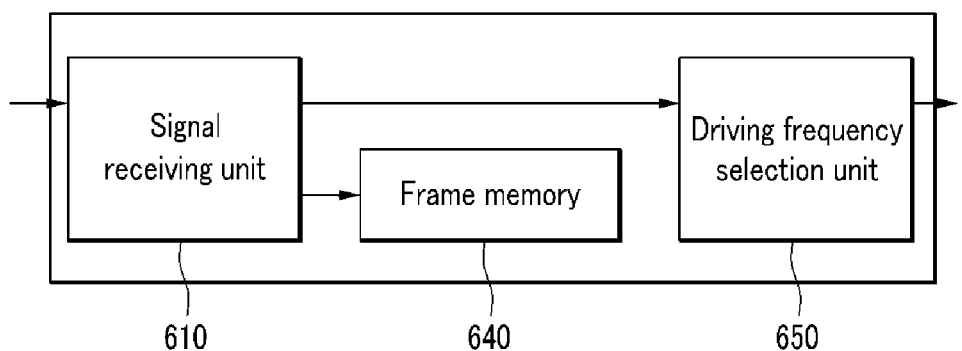
Figure 18:
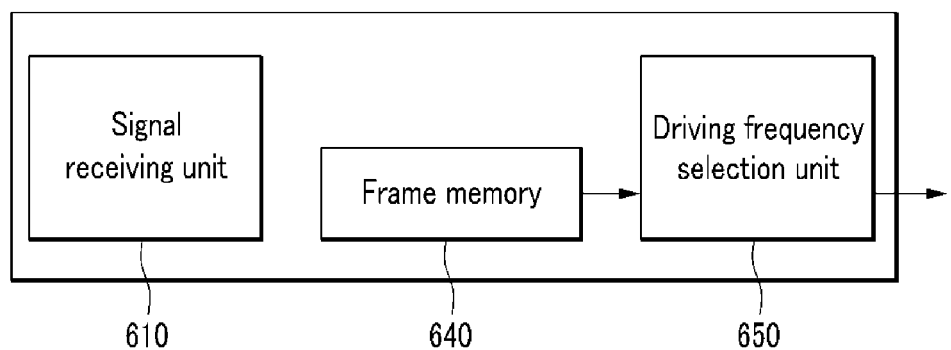
Figure 19:
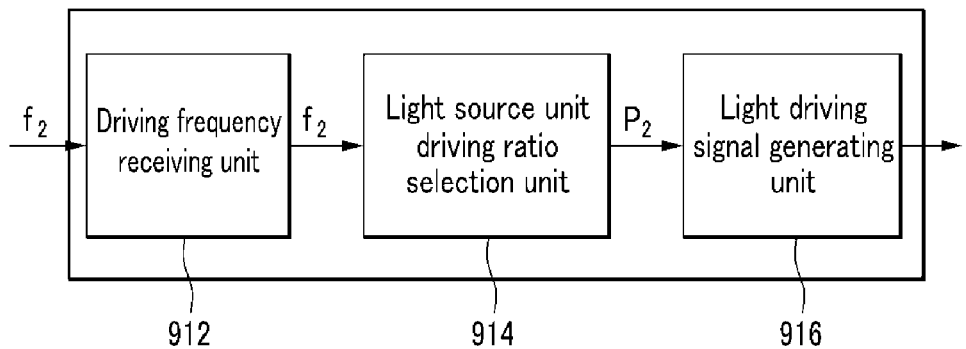
FIG. 19 and FIG. 20 are block diagrams of the light source driver illustrating the driving method of the display device according to the first exemplary embodiment for each step in sequence.
Figure 20:
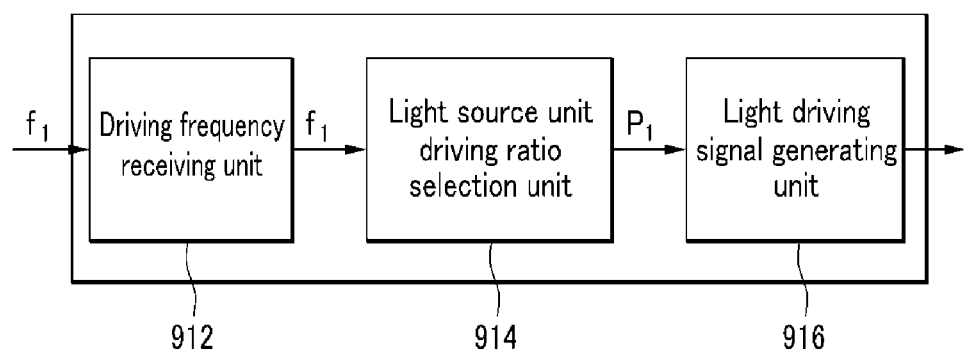

FIG. 15 is a flowchart illustrating a driving method of the display device according to the second exemplary embodiment, FIG. 16 to FIG. 18 are block diagrams of the signal controller illustrating the driving method of the display device according to the second exemplary embodiment for each step in sequence. FIG. 19 and FIG. 20 are block diagrams of the light source driver illustrating the driving method of the display device according to the first exemplary embodiment for each step in sequence.

First, as shown in FIG. 16, the graphics processing unit transmits the input image data to the signal receiving unit 610 of the signal controller 600 (S1110).

It is determined whether or not the still image start signal is applied to the signal receiving unit (S1120), and if the still image start signal is not applied, the input image data is outputted to the display panel (S1190).

If the still image start signal is applied, as shown in FIG. 17, the input image data is stored in the frame memory 640 (S1140).

Subsequently, as shown in FIG. 18, the graphics processing unit is inactivated so that the graphics processing unit does not transmit the input image data, and the storage image data stored in the frame memory 640 is output. If the still image start signal is applied, the driving frequency selecting unit 650 selects the second frequency to output the storage image data to the display panel at the second frequency (S1150). In this case, the display panel displays the still image and is driven at the second frequency.

Simultaneously, as shown in FIG. 19, in the light source driver 910, the driving frequency receiving unit 912 receives a second frequency $f_2$ as the driving frequency and the light source unit driving ratio selecting unit 914 selects a second ratio $P_2$ as the driving ratio of the light source unit.

The driving ratio of the light source unit may be differently selected according to the driving frequency. In this case, the driving ratio of the light source unit 900 according to the driving frequency of the display panel may be selected by using the look-up table or a function, y=f(x).

The light source driving signal generator 916 generates a light source driving signal that is capable of driving the light source unit at the second ratio $P_2$ to output the generated light source driving signal to the light source unit. In this case, the light source driving signal may be various signals such as a PWM signal, a communication protocol such as I2C or the like, etc.

Subsequently, it is determined whether or not the still image end signal is applied (S1160), and if the still image end signal is not applied, the storage image data is outputted at the second frequency and the light source unit is driven at the second ratio (S1150).

If the still image end signal is applied, as shown in FIG. 16, the graphics processing unit is re-activated so as to transmit the input image data (S1180).

If the still image end signal is applied, the driving frequency selecting unit 650 selects the first frequency to output the input image data to the display panel at the first frequency. In this case, the display panel displays the motion picture and is driven at the first frequency (S1190).

Simultaneously, as shown in FIG. 20, in the light source driver 910, the driving frequency receiving unit 912 receives a first frequency $f_1$ as the driving frequency and the light source unit driving ratio selecting unit 914 selects the first ratio $P_1$ as the driving ratio of the light source unit.

The light source driving signal generator 916 generates a light source driving signal that is capable of driving the light source unit at the first ratio $P_1$ to output the generated light source driving signal to the light source unit.

In the driving method of the displaying device according to the second exemplary embodiment, when the motion picture is displayed, the display panel is driven at the first frequency and the light source unit is driven at the first ratio. Further, when the still image is displayed, the display panel is driven at the second frequency and the light source unit is driven at the second ratio.

In this case, the second frequency has a lower value than the first frequency. Because the same image is displayed for every frame, the still image can be implemented even at a low driving frequency. However, a charging time of the pixel is changed according to a change in the driving frequency, and the fully charged amount is changed. As a result, a change in the luminance may be evident to a viewer's eyes.

Accordingly, the light source unit is dimming-driven, such that any change in luminance may be imperceptible. In detail, when the display panel is driven at the first frequency, the light source unit is driven at the first ratio, and when the display panel is driven at the second frequency, the light source unit is driven at the second ratio.

In a normally black mode display device, the second ratio is set to a lower value than the first ratio. In this case, the first ratio and the second ratio are set as values that are capable of compensating the luminance increasing when the still image is displayed as compared with the motion picture.

In the normally white mode display device, the second ratio is set to a higher value than the first ratio. In this case, the first ratio and the second ratio are set as values that are capable of compensating the luminance decreasing when the still image is displayed as compared with the motion picture.

When a still image changes into a motion picture, the time at which the driving frequency of the display panel changes and the time at which the driving ratio of the light source unit is changed coincide with a vertical blank period V-blank, such that any luminance change is imperceptible.

Next, a display device according to the third exemplary embodiment will be described with reference to FIG. 13, FIG. 14, and FIG. 21.

Figure 21:
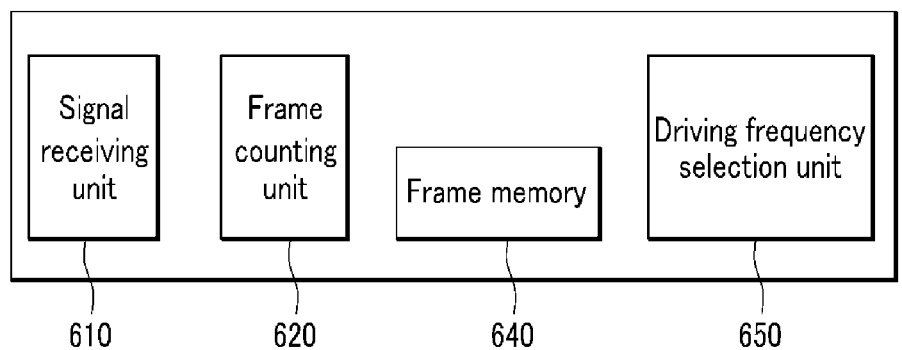
FIG. 21 is a block diagram illustrating a signal controller according to a third exemplary embodiment.

FIG. 21 is a block diagram of a signal controller according to the third exemplary embodiment. The third exemplary embodiment is the same as the display device of the second exemplary embodiment except for the signal controller, and will be described with reference to FIG. 13 and FIG. 14.

Because the display device according to the third exemplary embodiment is almost the same as the display device according to the second exemplary embodiment, just differences will be described below. One significant difference between the second exemplary embodiment and the first exemplary embodiment is that the signal controller in the second exemplary embodiment further includes a frame counting unit, and it will be described in detail.

A display device according to the third exemplary embodiment is the same as the display device according to the second exemplary embodiment in that the display device according to the second exemplary embodiment includes a display panel 300 displaying an image, a signal controller 600 controlling signals for driving the display panel 300, a graphics processing unit 700 transmitting input image data to the signal controller 600, a light source unit 900 irradiating light to the display panel 300, and a light source driver 910 controlling signals for driving the light source unit 900, all as shown in FIG. 13.

The signal controller 600 as shown in FIG. 21 may include a signal receiving unit 610 receiving various signals from the graphics processing unit 700, a frame counting unit 620 counting the number of frames, a frame memory 640 storing the input image data, and a driving frequency selecting unit 650 selecting a first frequency when displaying the motion picture and selecting a second frequency when displaying the still image.

The signal receiving unit 610 receives the input image data, the still image start signal, and the still image end signal from the graphics processing unit 700. Although not shown, the signal receiving unit 610 is connected with the graphics processing unit 700 through a main link and a sub-link. The signal receiving unit 610 receives the input image data from the graphics processing unit 700 through the main link. Further, the signal receiving unit 610 receives the still image start signal and the still image end signal from the graphics processing unit 700 through the sub-link, and transmits a signal for notifying a driving state of the display panel 300 to the graphic processing unit 700.

The frame counting unit 620 counts the number of still image sequential frames inputted before the still image end signal is applied after the still image start signal is applied, and counts the number of motion picture sequential frames inputted until the still image start signal is applied after the still image end signal is applied.

The frame counting unit 620 transmits the input image data to the frame memory 640 when the number of the still image sequential frames is equal to or more than a value x. Further, the graphics processing unit 700 is inactivated so that the graphics processing unit 700 does not transmit the input image data. On the contrary, when the number of the still image sequential frames is less than x, the input image data is not transmitted to the frame memory 640, but is transmitted to the driving frequency selecting unit 650, so that the input image data is outputted. Further, the graphics processing unit 700 is not inactivated so that the input image data is continuously transmitted.

This is so as to not convert the motion picture into the still image when the number of the still image sequential frames is less than x. When the still image is displayed for a short time and then converted into the motion picture again, an effect of reducing the power consumption is not large if the driving frequency is changed accordingly, such that the luminance change does not occur by maintaining the driving frequency. Although the light source unit is dimming-driven according to the change in the driving frequency, the luminance change may be perceptible. Accordingly, when the still image is displayed for a short time, the driving frequency of the display panel 300 and the driving ratio of the light source unit 900 are not changed but are maintained, such that the luminance change does not occur.

When the number of the motion picture sequential frames is equal to or more than a value y, the frame counting unit 620 activates the graphics processing unit 700 so that the graphics processing unit 700 transmits the input image data. On the contrary, when the number of the motion picture sequential frames is less than y, the graphics processing unit 700 is maintained in the inactivated state.

This is so as to not convert the still image into the motion picture when the number of the motion picture sequential frames is less than y. When the motion picture is displayed for a short time and then converted into the still image again, an effect of reducing the power consumption is not large if the driving frequency is accordingly changed, such that the luminance change does not occur by maintaining the driving frequency. That is, when the motion picture is displayed for a short time, the driving frequency of the display panel 300 and the driving ratio of the light source unit 900 are not changed are but maintained, such that the luminance change may not occur.

In this case, the values of x and y may be appropriately selected and set in consideration of the effect of the reduction in the power consumption and the visibility problem according to the luminance change.

The frame memory 640 receives and stores the input image data from the frame counting unit 620 when the number of the still image sequential frames is equal to or more than x.

The driving frequency selecting unit 650 selects the first frequency when the display panel 300 continuously displays the still image by x frames or more and selects the second frequency when the display panel 300 continuously displays the motion picture by y frames or more. The driving frequency selecting unit 650 outputs the storage image data stored in the frame memory 640 to the display panel 300 at the first frequency when the number of the still image sequential frames is equal to or more than x. The driving frequency selecting unit 650 outputs the input image data to the display panel 300 at the second frequency when the number of the motion picture sequential frames is equal to or more than y.

Accordingly, the light source driver 910 receives the first frequency from the signal controller 600 to drive the light source unit 900 at the first ratio when the number of the still image sequential frames is equal to or more than x. The light source driver 910 receives the second frequency from the signal controller 600 to drive the light source unit 900 at the second ratio when the number of the motion picture sequential frames is equal to or more than y.

Hereinafter, a driving method of a display device according to a third exemplary embodiment will be described below.

Figure 22:
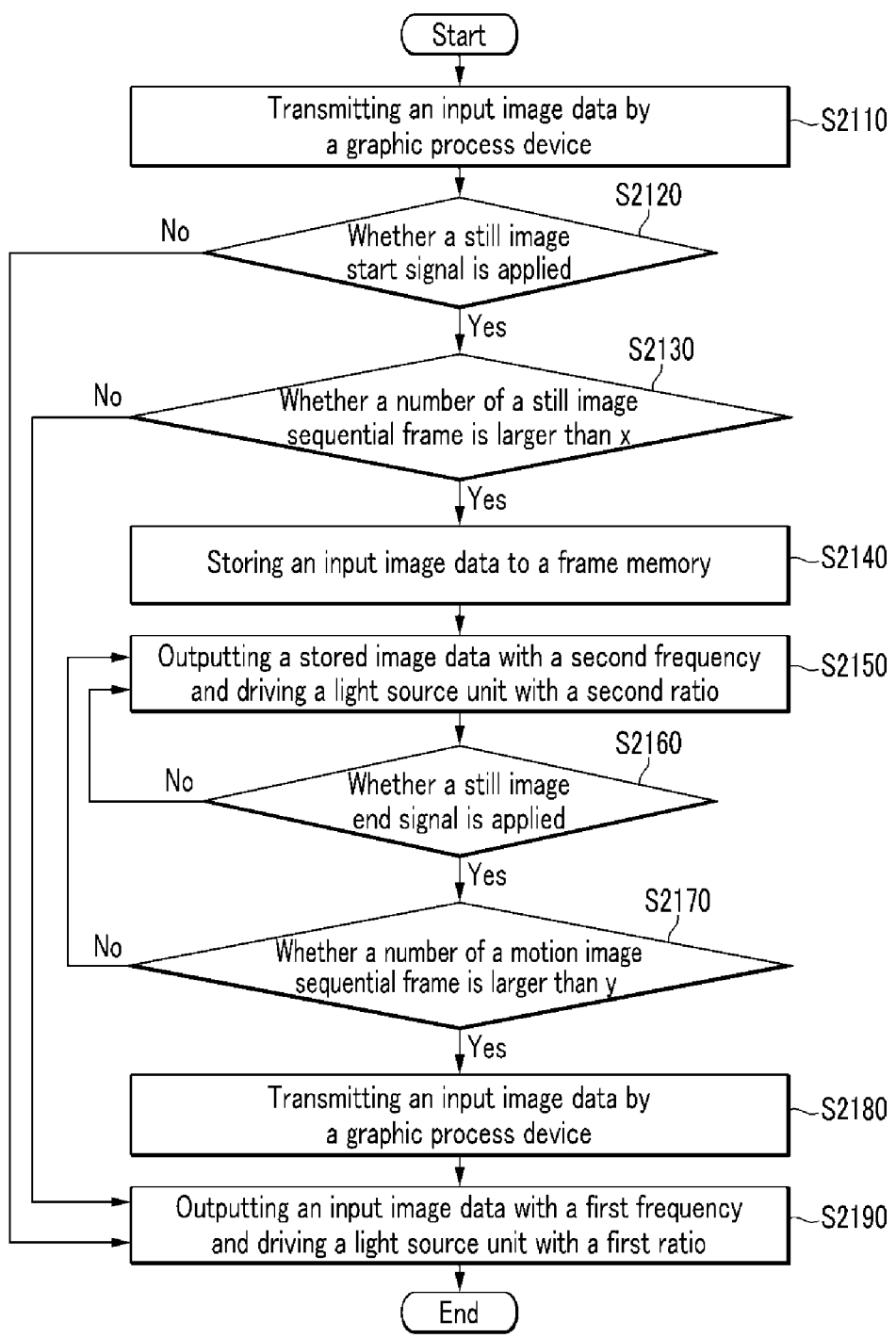
FIG. 22 is a flowchart illustrating a driving method of the display device according to the third exemplary embodiment.

FIG. 22 is a flowchart illustrating a driving method of the display device according to the third exemplary embodiment, and FIG. 23 to FIG. 26 are block diagrams of the signal controller illustrating the driving method of the display device according to the third exemplary embodiment for each step in sequence.

Because the driving method of the display device according to the third exemplary embodiment is almost the same as the driving method of the display device according to the second exemplary embodiment, just differences will be mainly described below.

Figure 23:
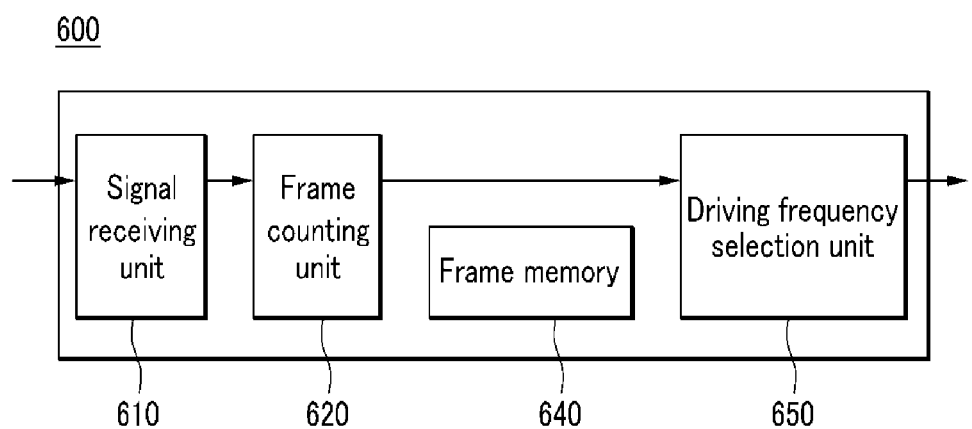
FIG. 23 to FIG. 26 are block diagrams of the signal controller illustrating the driving method of the display device according to the third exemplary embodiment for each step in sequence.

First, as shown in FIG. 23, the graphics processing unit transmits the input image data to the signal receiving unit 610 of the signal controller 600 (S2110).

It is determined whether or not the still image start signal is applied to the signal receiving unit 610 (S2120), and if the still image start signal is not applied, the input image data is output to the display panel. In this case, the display panel displays the motion picture and is driven at the second frequency (S2190).

If the still image start signal is applied, the frame counting unit 620 counts the number of the still image sequential frames input before the still image end signal is applied after the still image start signal is applied. In this case, the frame counting unit 620 determines whether or not the number of the still image sequential frames is equal to or more than x (S2130). When the number of the still image sequential frames is less than x, the input image data is outputted to the display panel like the case where the still image start signal is not applied. In this case, the display panel displays the still image and is driven at the first frequency (S2190).

Figure 24:
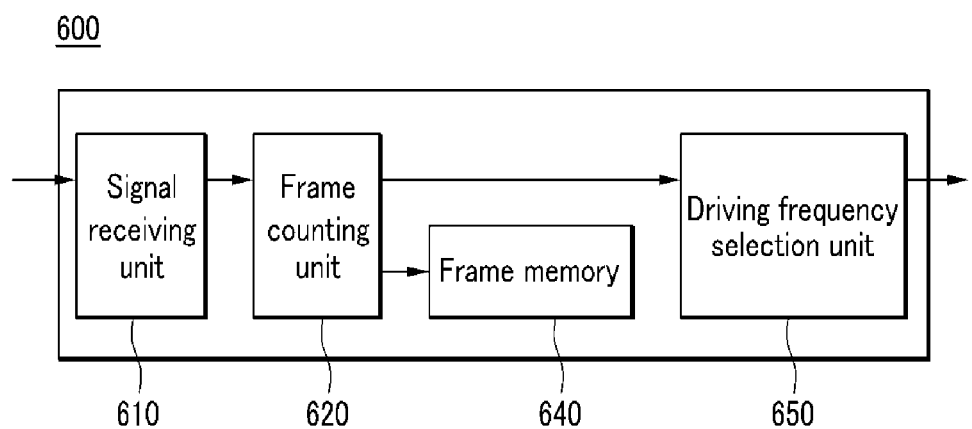

If the number of the still image sequential frames is equal to or more than x, as shown in FIG. 24, the input image data is stored in the frame memory 640 (S2140).

Figure 25:
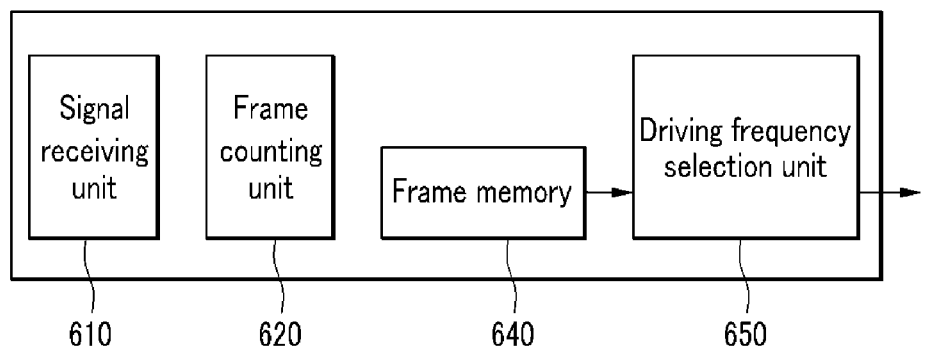

Subsequently, as shown in FIG. 25, the graphics processing unit is inactivated so that the graphics processing unit does not transmit the input image data, and the storage image data stored in the frame memory 640 is output. If the number of the still image sequential frames is equal to or more than x, the driving frequency selecting unit 650 selects the second frequency to output the storage image data to the display panel at the second frequency (S2150). In this case, the display panel displays the still image and is driven at the second frequency.

Simultaneously, the light source driver receives the second frequency as the driving frequency to drive the light source unit at the second ratio.

The driving ratio of the light source unit may be differently selected according to the driving frequency. In this case, the driving ratio of the light source unit according to the driving frequency of the display panel may be selected by using the look-up table or a function, $y=f(x)$.

Subsequently, it is determined whether or not the still image end signal is applied (S2160), and if the still image end signal is not applied, the storage image data is output at the second frequency and the light source unit is driven at the second ratio. In this case, the display panel displays the still image and is driven at the second frequency (S2150).

Figure 26:
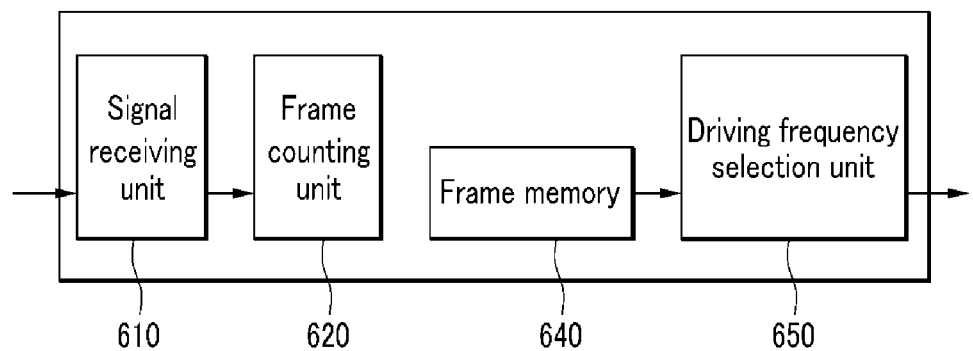

As shown in FIG. 26, if the still image end signal is applied, the frame counting unit 620 counts the number of the motion picture sequential frames input before the still image start signal is applied after the still image end signal is applied. In this case, the frame counting unit 620 determines whether or not the number of the motion picture sequential frames is equal to or more than y (S2170). If the number of the motion picture sequential frames is less than y, the storage image data is output at the first frequency and the light source unit is driven at the first ratio, like the case where the motion picture start signal is not applied (S2150).

If the still image end signal is applied but the number of the motion picture sequential frames is less than y, the graphics processing unit is activated and the input image data is transmitted to the signal receiving unit 610. However, the display panel displays the still image by outputting the storage image data and is driven at the second frequency.

If the number of the motion picture sequential frames is equal to or more than y, as shown in FIG. 12, the graphics processing unit is activated again so as to transmit the input image data (S2180).

If the number of the motion picture sequential frames is equal to or more than y, the driving frequency selecting unit 650 selects the first frequency to output the input image data to the display panel at the first frequency. In this case, the display panel displays the motion picture and is driven at the first frequency (S2190).

Simultaneously, the light source driver receives the first frequency as the driving frequency to drive the light source unit at the first ratio.

In the driving method of the display device according to the third exemplary embodiment, when the still image is continuously displayed by x frames or more, the display panel is driven at the second frequency and the light source unit is driven at the second ratio. Further, when the motion picture is continuously displayed by y frames or more, the display panel is driven at the first frequency and the light source unit is driven at the first ratio.

In this case, the second frequency has a lower value than the first frequency. Because the same image is displayed for every frame, the still image may be implemented even by a low driving frequency. However, a charging time of the pixel is changed according to a change in the driving frequency and the charged charge amount is changed. The change of the luminance according thereto may be noticeable to a viewer.

Accordingly, the light source unit is dimming-driven, such that the change in the luminance may not be noticeable to a viewer. In detail, when the display panel is driven at the second frequency, the light source unit is driven at the second ratio, and when the display panel is driven at the first frequency, the light source unit is driven at the first ratio.

Further, when the still image is not continuously displayed by x frames or more and when the motion picture is not continuously displayed by y frames or more, the driving frequency of the display panel and the driving ratio of the light source unit are not changed but are maintained, such that the luminance change does not occur.

When the still image end signal is applied but the number of the motion picture sequential frames is less than y, the display panel displays the still image by outputting the storage image data and is driven at the second frequency, but the present disclosure is not limited thereto. On the contrary, when the still image end signal is applied but the number of the motion picture sequential frames is less than y, the input image data may be outputted at the first frequency and the light source unit may be driven at the first ratio. In this case, the display panel displays the motion picture and is driven at the first frequency.

Next, a driving method of a display device according to the fourth exemplary embodiment will be described with reference to FIG. 27 to FIG. 29. A structure of the display device according to the fourth exemplary embodiment is the same as the structure of the display device according to the second exemplary embodiment, and a description thereof is omitted.

Figure 27:
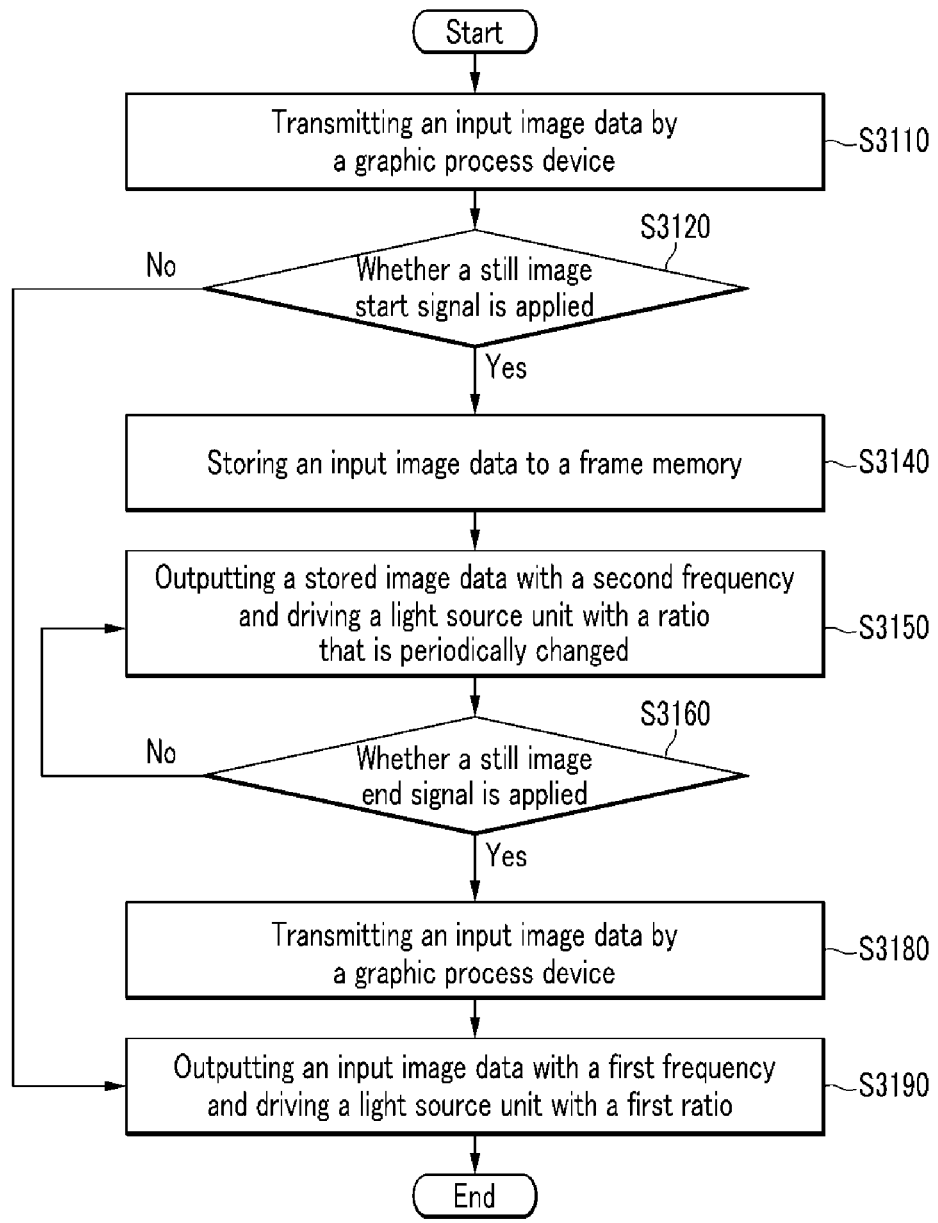
FIG. 27 is a flowchart of a driving method of a display device according to the fourth exemplary embodiment.
Figure 28:
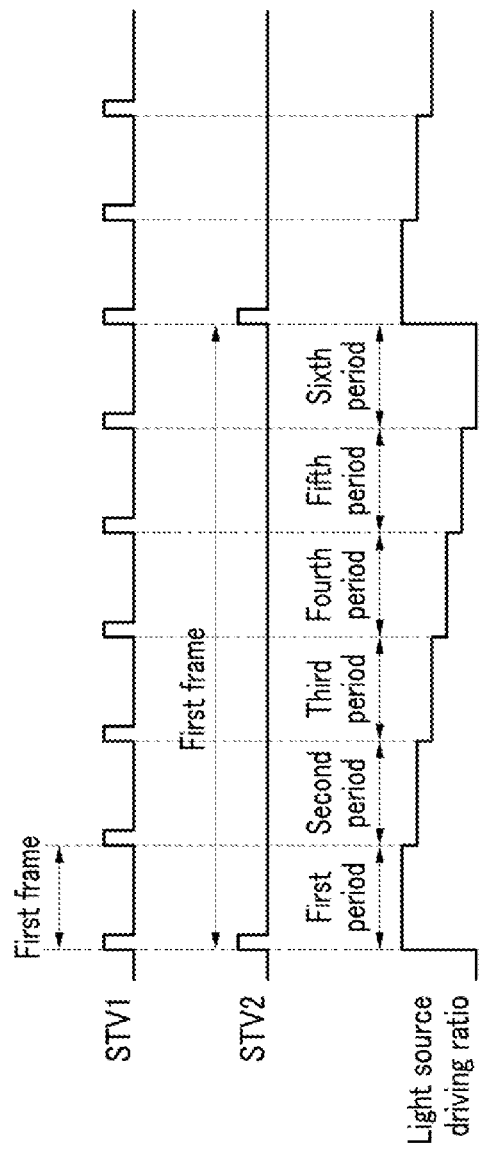
FIG. 28 and FIG. 29 are views of an STV signal and a light source unit driving ratio of a display device according to the fourth exemplary embodiment.
Figure 29:
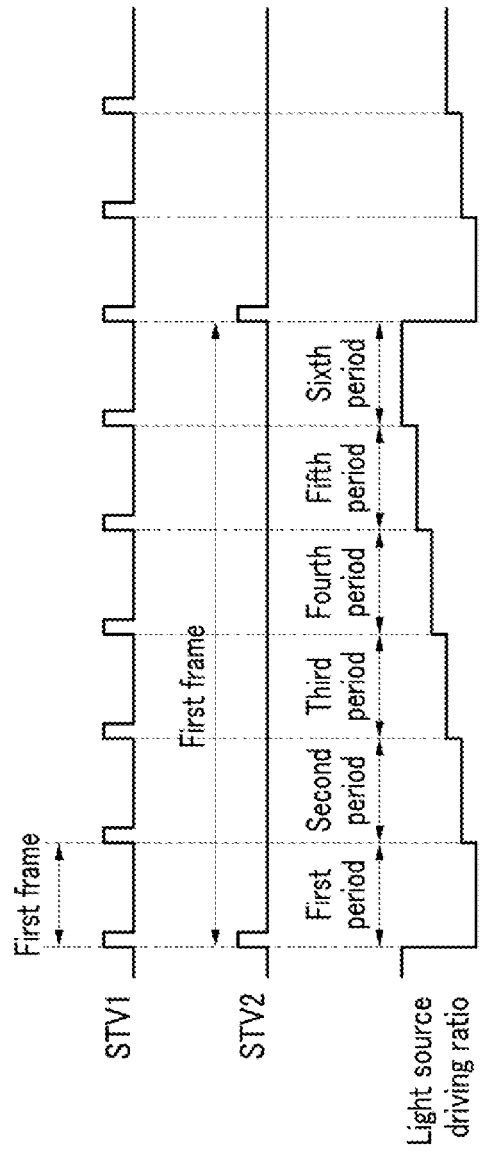

FIG. 27 is a flowchart of a driving method of a display device according to the fourth exemplary embodiment, and FIG. 28 and FIG. 29 are views of an STV signal and a light source unit driving ratio of a display device according to the fourth exemplary embodiment.

First, the graphics processing unit transmits the input image data to the signal receiving unit 610 of the signal controller 600 (S3110).

It is determined whether or not the still image start signal is applied to the signal receiving unit (S3120), and if the still image start signal is not applied, the input image data is outputted to the display panel (S3190).

If the still image start signal is applied, the input image data is stored in the frame memory 640 (S3140).

Subsequently, the graphics processing unit is inactivated so that the graphics processing unit does not transmit the input image data and the storage image data stored in the frame memory 640 is output. If the still image start signal is applied, the driving frequency selecting unit 650 selects the second frequency to output the storage image data to the display panel at the second frequency (S3150). In this case, the display panel displays the still image and is driven at the second frequency.

Simultaneously, in the light source driver 910, the driving frequency receiving unit 912 receives a second frequency $f_2$ as the driving frequency and the light source unit driving ratio selecting unit 914 selects a second ratio $P_2$ as the driving ratio of the light source unit.

Next, a periodic change of the light source unit driving ratio will be described with reference to FIG. 28.

STV1 of FIG. 28 is an STV signal when the display panel is driven with the first frequency, and STV2 is an STV signal when the display panel is driven with the second frequency.

Firstly, when the first frequency is 60 Hz and the second frequency is 10 Hz, STV2 is applied one time during a time that STV1 is applied six times. Accordingly, the luminance of the screen is frequently changed when being driven with the first frequency rather than the second frequency, and thereby the flicker is relatively imperceptible. Accordingly, in the display device according to the fourth exemplary embodiment, the light source unit driving ratio is changed with the same cycle as the application cycle of the STV1 signal when being driven with the first frequency.

First, at a position where the STV2 is applied, the light source unit driving ratio selecting unit 914 selects the first ratio with the light source unit driving ratio.

The light source driving signal generator 916 generates a light source driving signal that is capable of driving the light source unit at the first ratio P1 to output the generated light source driving signal to the light source unit. In this case, the light source driving signal may be various signals such as a PWM signal, a communication protocol such as I2C or the like, etc.

When one frame is divided into the first to the sixth periods having the same length, the light source unit is driven with the first ratio in the first period.

Next, when using the normally black mode display device, at the position where the second period is started, the light source unit driving ratio selecting unit 914 selects the second ratio that is lower than the first ratio as the light source unit driving ratio to drive the light source unit with the second ratio.

Next, at the position where the third period is started, the light source unit driving ratio selecting unit 914 selects the third ratio that is lower than the second ratio as the light source unit driving ratio to drive the light source unit with the third ratio.

Next, at the position where the fourth period is started, the light source unit driving ratio selecting unit 914 selects the fourth ratio that is lower than the third ratio as the light source unit driving ratio to drive the light source unit with the fourth ratio.

Next, at the position where the fifth period is started, the light source unit driving ratio selecting unit 914 selects the fifth ratio that is lower than the fourth ratio as the light source unit driving ratio to drive the light source unit with the fifth ratio.

Next, at the position where the sixth period is started, the light source unit driving ratio selecting unit 914 selects the sixth ratio that is lower than the fifth ratio as the light source unit driving ratio to drive the light source unit with the sixth ratio.

Next, at the position where the next period is started, the light source unit driving ratio selecting unit 914 again selects the first ratio as the light source unit driving ratio to drive the light source unit with the first ratio.

That is, the light source unit is driven with the first ratio or the ratio that is sequentially decreased from the first ratio. At the time when the STV2 signal is transmitted, the light source unit is driven with the first ratio, and before the transmission of the next STV2 signal, the light source unit is driven with the ratio that sequentially decreases in each period from the first ratio. The change cycle of the light source unit driving ratio may be set to be the same as the transmission cycle of the STV1 signal. Accordingly, although the display panel is driven with the second frequency that is lower than the first frequency, the change cycle of the luminance is increased like the driving with the first frequency such that the flicker is not noticeable by a viewer.

Subsequently, it is determined whether or not the still image end signal is applied (S3160), and if the still image end signal is not applied, the storage image data is output at the second frequency and the light source unit is driven at the ratio that is periodically changed (S3150).

If the still image end signal is applied, the graphics processing unit is again activated so as to transmit the input image data (S3180).

If the still image end signal is applied, the driving frequency selecting unit 650 selects the first frequency to output the input image data to the display panel at the first frequency. In this case, the display panel displays the motion picture and is driven at the first frequency (S3190).

Simultaneously, as shown in FIG. 20, in the light source driver 910, the driving frequency receiving unit 912 receives a first frequency as the driving frequency and the light source unit driving ratio selecting unit 914 selects the first ratio as the driving ratio of the light source unit.

The light source driving signal generator 916 generates a light source driving signal capable of driving the light source unit at the first ratio to output the generated light source driving signal to the light source unit.

In the driving method of the displaying device according to the fourth exemplary embodiment, when the motion image is displayed, the display panel is driven at the first frequency and the light source unit is driven at the first ratio. Further, when the still picture is displayed, the display panel is driven at the second frequency and the light source unit is driven at the second ratio.

In the above example, the case of using the normally black mode display device was described. The periodic change of the light source unit driving ratio of the case using the normally white mode display device will now be described with reference to FIG. 29.

At the position where the STV2 is applied, the light source unit driving ratio selecting unit 914 selects the first ratio as the light source unit driving ratio to drive the light source unit with the first ratio.

Next, at the time where the second period is started, the light source unit driving ratio selecting unit 914 selects the second ratio that is higher than the first ratio as the light source unit driving ratio to drive the light source unit with the second ratio.

Next, in the third period to the sixth period, the light source unit is driven with the ratio that is gradually increased from the second ratio.

That is, when driving the display panel with the second frequency, in the example of the normally black mode display device, the light source unit is driven with the first ratio and the ratio that is sequentially decreased from the first ratio in one frame. In contrast, in the example of the normally white mode display device, the light source unit is driven with the first ratio and the ratio that is sequentially increased from the first ratio in one frame.

Next, a display device according to the fifth exemplary embodiment will be described with reference to FIG. 30 as well as FIG. 1 and FIG. 2.

Figure 30:
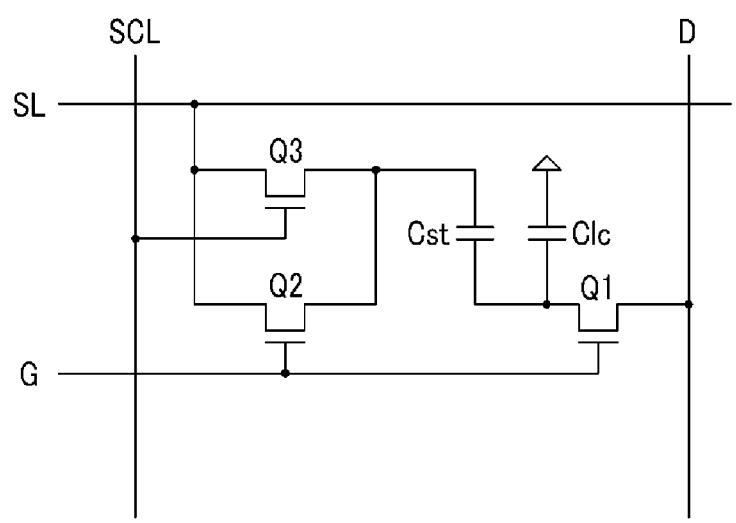
FIG. 30 is an equivalent circuit diagram for one pixel of a display device according to the fifth exemplary embodiment.

FIG. 30 is an equivalent circuit diagram of one pixel of a display device according to the fifth exemplary embodiment.

The display device according to the fifth exemplary embodiment, as shown in FIG. 1, includes the display panel 300, the signal controller 600, the graphics processing unit 700, and the signal controller 600, and as shown in FIG. 2, includes the signal receiving unit 610, the frame memory 640, and the driving frequency selecting unit 650.

The display panel 300, the signal controller 600, and the graphics processing unit 700 of the display device according to the fifth exemplary embodiment are the same as those of the first exemplary embodiment such that the detailed description is omitted.

In the display panel of the display device according to the fifth exemplary embodiment, as shown in FIG. 30, the gate line G and the data line D are crossed to define the pixel. Although not shown by omitting a layout view and a cross-sectional view, the gate line G and the data line D may be formed on a substrate and formed on different layers so as to be separated from each other. As shown in FIG. 1, the gate line G and the data line D may be in plural, but in FIG. 30, because only one pixel is shown, just one gate line G and one data line D are shown.

A switching element Q1 is formed so as to be connected with the gate line G and the data line D. The first switching element Q1 is a three-terminal element such as a thin film transistor and the like, a control terminal thereof is connected with the gate line G, an input terminal thereof is connected with the data line D, and an output terminal thereof is connected with a liquid crystal capacitor Clc and a storage capacitor Cst.

A storage electrode line SL and a storage electrode control line SCL may be further formed on the substrate, and the storage electrode line SL and the storage capacitor Cst are connected to each other by a second switching element Q2 and a third switching element Q3. That is, the second switching element Q2 and the third switching element Q3 are formed between the storage electrode line SL and the storage capacitor Cst.

The second switching element Q2 is a three-terminal element such as a thin film transistor and the like, a control terminal thereof is connected with the gate line G, an input terminal thereof is connected with the storage electrode line SL, and an output terminal thereof is connected with the storage capacitor Cst.

The third switching element Q3 is a three-terminal element such as a thin film transistor and the like, a control terminal thereof is connected with the storage electrode control line SCL, an input terminal thereof is connected with the storage electrode line SL, and an output terminal thereof is connected with the storage capacitor Cst.

Hereinafter, a voltage relationship when the still image is displayed on the display panel of the display device according to an exemplary embodiment will be described below.

Figure 31:
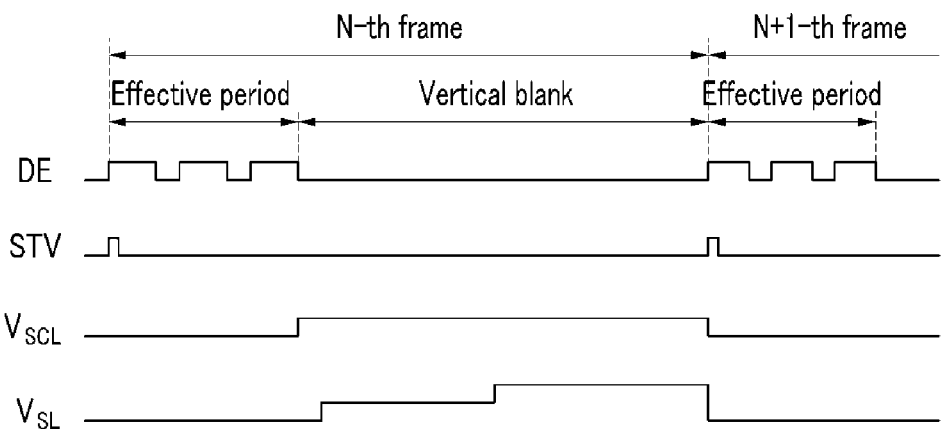
FIG. 31 is a diagram illustrating each of control signals when a still image is displayed on a display panel of a display device according to the fifth exemplary embodiment.

FIG. 31 is a diagram illustrating each of control signals when a still image is displayed on a display panel of a display device according to the fifth exemplary embodiment.

In the display device according to the fifth exemplary embodiment, when the motion picture is displayed, the display panel is driven at a first frequency, and when the still image is displayed, the display panel is driven at the second frequency that is lower than the first frequency. In this case, in order to implement the second frequency, a length of a vertical blank period may be increased as compared with the case where the display panel is driven at the first frequency.

For example, in order to change the driving frequency from 60 Hz to 10 Hz, the length of the vertical blank period between two adjacent effective periods may be changed so as to be five times that of one frame. In this case, speeds for applying a data enable signal DE in both the driving at 60 Hz and the driving at 10 Hz are the same.

When the still image is displayed by driving the display panel at the second frequency, first, if the gate-on voltage is applied to the gate line G in an effective period of the n-th frame, the first switching element Q1 and the second switching element Q2 are turned on. Next, if a data voltage is applied to the data line D, the liquid crystal capacitor Clc and the storage capacitor Cst are charged through the first switching element Q1.

In this case, one terminal of the storage capacitor Cst is connected with the first switching element Q1 to represent the data voltage and the other terminal thereof is connected with the second switching element Q2 to represent the common voltage VSL applied to the storage electrode line SL. For the n-th frame in which the data enable signal is applied, the common voltage VSL has a constant value.

After the data voltage is applied to each pixel, the gate-off voltage is applied to the gate line G and the first switching element Q1 and the second switching element Q2 are turned off. Subsequently, the vertical blank period starts and the gate-on voltage is applied to the storage electrode control line SCL. Accordingly, the third switching element Q3 connected to the storage electrode control line SCL is turned on and the common voltage is applied from the storage electrode line SL.

The common voltage $V_{SL}$ of the vertical blank period has a higher voltage than the common voltage VSL of the effective period. When the common voltage VSL of the effective period has the first voltage, after the vertical blank period starts, the common voltage VSL is changed to the second voltage that is higher than the first voltage. Thereafter, the common voltage VSL has the third voltage that is higher than the second voltage after a predetermined time elapses in the vertical blank period. The time for applying the second voltage and the time for applying the third voltage to the storage electrode line SL may be set to be the same.

The times when the common voltage VSL is changed from the first voltage to the second voltage and changed from the second voltage to the third voltage may be set so as to coincide with a time when the voltage of one terminal of the storage capacitor Cst is discharged, such that a pixel voltage may be changed from the originally applied data voltage to another voltage which is lower than the originally applied data voltage.

Subsequently, the vertical blank period ends and the gate-off voltage is applied to the storage electrode control line SCL. Accordingly, the third switching element Q3 connected to the storage electrode control line SCL is turned on.

Simultaneously, the n+1 frame starts and the gate-on voltage is applied to the gate line G. Accordingly, the first switching element Q1 and the second switching element Q2 are turned on. Subsequently, the data voltage is applied to the data line D, and the liquid crystal capacitor Clc and the storage capacitor Cst are charged. In this case, because the still image is displayed, the data voltages of the n-th frame and the (n+1)-th frame are the same.

When the (n+1)-th frame starts, the common voltage VSL applied to the storage electrode line SL drops to the first voltage again and is transferred to the other terminal of the storage capacitor Cst through the second switching element.

As described above, the common voltage VSL applied to the storage electrode line SL has a value that is changed when the display panel is driven at the second frequency. That is, the common voltage VSL has the first voltage in an effective periods of the n-th frame and the (n+1)-th frame, the second voltage that is higher than the first voltage and the third voltage higher than the second voltage sequentially in the vertical blank period between the effective periods of the n-th frame and the (n+1)-th frame. For example, the first voltage may be set to 7.5 V, the second voltage may be set to 7.6 V, and the third voltage may be set to 7.7 V.

The voltage of the other terminal of the storage capacitor Cst connected with the second switching element Q2 and the third switching element Q3 is changed according to the change of the common voltage VSL. Further, the voltage of one terminal of the storage capacitor Cst connected with the first switching element Q1 is also changed.

For example, when the voltage of one terminal of the storage capacitor Cst connected with the first switching element Q1 is 10.5 V in the n-th frame by applying the data voltage, the first switching element Q1 is turned off and the predetermined time elapses, such that the voltage drops.

When the voltage of one terminal of the storage capacitor Cst drops to about 10.4 V in the vertical blank period and the third switching element Q3 is turned on, the common voltage VSL of 7.6 V is applied to the other terminal of the storage capacitor Cst. In this case, the voltage of one terminal of the storage capacitor Cst also increases by the increase in the voltage of the other terminal of the storage capacitor Cst to be 10.5 V again.

When the predetermined time elapses and the voltage of one terminal of the storage capacitor Cst drops to about 10.4 V, the common voltage VSL applied to the other terminal of the storage capacitor Cst may increase to 7.7 V. In this case, the voltage of one terminal of the storage capacitor Cst also increases by the increase in the voltage of the other terminal of the storage capacitor Cst to be 10.5 V again.

Thereafter, when the (n+1)-th frame starts, the same data voltage as the data voltage in the n-th frame is applied to one terminal of the storage capacitor Cst.

As described above, the voltage of one terminal of the storage capacitor Cst may be changed in the vertical blank period through the change of the common voltage VSL, such that luminance is changed.

When the motion picture is displayed, the display panel is driven at a frequency that is relatively faster than when the still image is displayed, such that flicker is not noticable because a cycle of a luminance change is short. When the still image is displayed, the display panel is driven at a relatively slower frequency than when the motion picture is displayed, such that the flicker is clearly noticable. In the fifth exemplary embodiment, the luminance change is induced through the change in the common voltage VSL, such that the flicker may not be noticable like the case where the motion picture is displayed.

In the fifth exemplary embodiment, when the motion picture is displayed, since the flicker is not clearly noticable even without the induction of the luminance change, the common voltage VSL having a constant value is supplied to the storage electrode line SL.

As described above, when the still image is displayed, that is, when the display panel is driven at the second frequency, the common voltage VSL is changed from the first voltage to the second voltage and from the second voltage to the third voltage and returns to the first voltage again. However, the present disclosure is not limited thereto, and the change in the common voltage VSL may be implemented by various methods.

Figure 32:
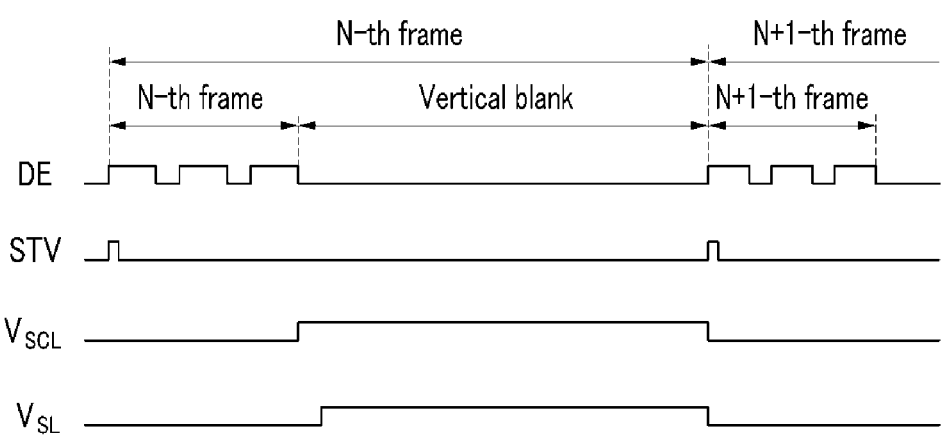
FIG. 32 is a diagram illustrating each of control signals when a still image is displayed on a display panel of a display device according to the fifth exemplary embodiment.

For example, the common voltage VSL may be changed as shown in FIG. 32.

FIG. 32 is a diagram illustrating each of control signals when a still image is displayed on a display panel of a display device according to the fifth exemplary embodiment.

When the display panel is driven at the second frequency, the common voltage VSL may have the first voltage in effective periods of the n-th frame and the (n+1)-th frame, and the second voltage that is higher than the first voltage in the vertical blank period between effective periods of the n-th frame and the (n+1)-th frame. That is, the common voltage VSL may increase from the first voltage to the second voltage and then be maintained at the second voltage, and may drop to the first voltage again when the next frame starts.

Further, unlike what is shown in FIG. 32, when the display panel is driven at the second frequency, the common voltage VSL may have the first voltage in effective periods of the n-th frame and the (n+1)-th frame, and the second voltage that is higher than the first voltage in the vertical blank period between the effective periods of the n-th frame and the (n+1)-th frame. Subsequently, after a predetermined time elapses in the vertical blank period, the common voltage VSL may have the fourth voltage that is higher than the third voltage. That is, when the common voltage VSL is changed from the first voltage to the second voltage, from the second voltage to the third voltage, and from the third voltage to the fourth voltage, and when the next frame starts, the common voltage VSL may drop to the first voltage.

When the vertical blank period is relatively short, although the number of voltage changes is set to be small, the flicker is not readily perceptible. On the contrary, when the vertical blank period is relatively long, the flicker is more readily perceptible, such that the number of voltage changes may be set to be larger.

Next, a display device according to the sixth exemplary embodiment will be described with reference to FIG. 33.

Figure 33:
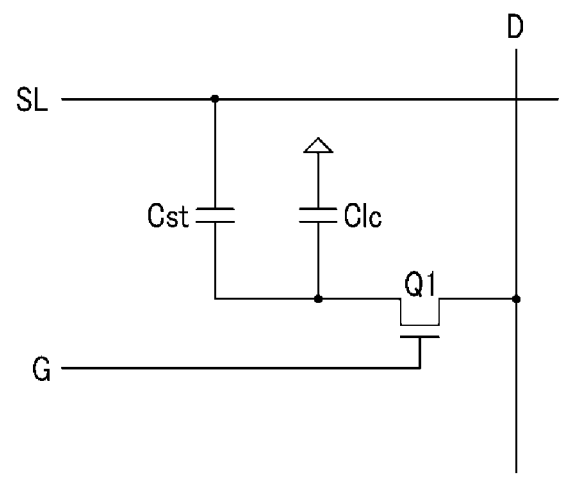
FIG. 33 is an equivalent circuit diagram for one pixel of a display device according to the sixth exemplary embodiment.

FIG. 33 is an equivalent circuit diagram of one pixel of a display device according to the sixth exemplary embodiment.

The display device according to the sixth exemplary embodiment is the same as most of the display device according to the fifth exemplary embodiment, and just differences will be described.

The display device according to the sixth exemplary embodiment does not include the second switching element, the third switching element, and the storage electrode control line, as opposed to the fifth exemplary embodiment. Also, a shape of the common voltage applied to the storage electrode line is different from the fifth exemplary embodiment.

In the display panel of the display device according to the sixth exemplary embodiment, as shown in FIG. 33, the gate line G and the data line D are crossed to define the pixel. The gate line G and the data line D may be in plural and the pixel may be in plural, but only one pixel is shown in FIG. 33.

A switching element Q1 is formed so as to connect the gate line G and the data line D. The first switching element Q1 is a three-terminal element such as a thin film transistor or the like. The control terminal thereof is connected to the gate line G, while the input terminal thereof is connected to the data line D, and an output terminal thereof is connected with a liquid crystal capacitor Clc and a storage capacitor Cst.

A storage electrode line SL may be further formed, and the storage electrode line SL and the storage capacitor Cst are connected to each other.

That is, in the fifth exemplary embodiment described above, the storage electrode line SL and the storage capacitor Cst are connected to each other by the switching element. In contrast, in the present exemplary embodiment, the storage electrode line SL and the storage capacitor Cst are directly connected to each other.

Hereinafter, a voltage relationship when the still image is displayed on the display panel of the display device according to another exemplary embodiment will be described below.

Figure 34:
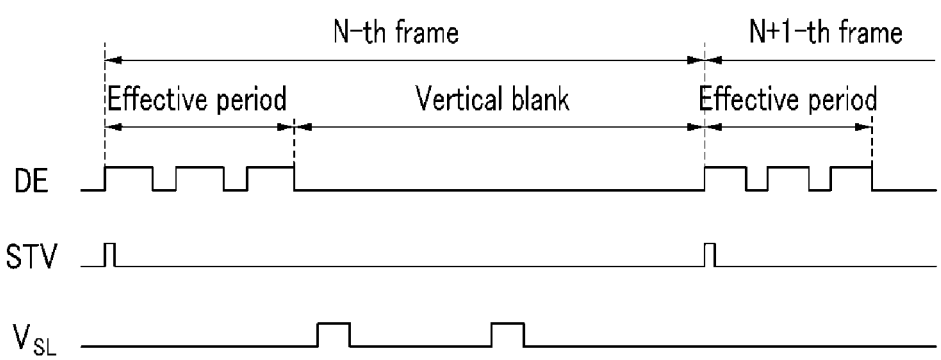
FIG. 34 is a diagram illustrating each of control signals when a still image is displayed on a display panel of a display device according to the sixth exemplary embodiment.

FIG. 34 is a diagram illustrating each of control signals when a still image is displayed on a display panel of a display device according to the sixth exemplary embodiment.

In the display device according to the sixth exemplary embodiment, when the motion picture is displayed, the display panel is driven at a first frequency, and when the still image is displayed, the display panel is driven at a second frequency that is lower than the first frequency. In this case, in order to implement the second frequency, the length of a vertical blank period may be increased as compared with the case where the display panel is driven at the first frequency.

When the still image is displayed by driving the display panel at the second frequency, first, if the gate-on voltage is applied to the gate line G in the n-th frame, the first switching element Q1 is turned on. Next, if data voltage is applied to the data line D, the liquid crystal capacitor Clc and the storage capacitor Cst are charged through the first switching element Q1.

In this case, one terminal of the storage capacitor Cst is connected with the first switching element Q1 to represent the data voltage, and the other terminal thereof is connected with the storage electrode line SL to represent common voltage VSL applied to the storage electrode line SL. For the n-th frame in which the data enable signal is applied, the common voltage VSL has a constant value.

After the data voltage is applied to each pixel, the gate-off voltage is applied to the gate line G and the first switching element Q1 is turned off. Subsequently, the vertical blank period starts and the common voltage $V_{SL}$ is changed. The common voltage $V_{SL}$ of the vertical blank period swings into the voltage that is higher than the common voltage $V_{SL}$ of the effective period and the same voltage as the common voltage $V_{SL}$ in the effective period.

When the common voltage VSL in the effective period is the first voltage and the vertical blank period starts, the common voltage VSL may be changed to the second voltage that is higher than the first voltage and then may drop to the first voltage again. Thereafter, after a predetermined time elapses in the vertical blank period, the common voltage VSL may be again changed to the second voltage again and may then drop to the first voltage again. In the vertical blank period, a time when the common voltage VSL has the second voltage may be set to be shorter than a time when the common voltage VSL has the first voltage.

A time when the common voltage VSL is changed from the first voltage to the second voltage may be set so as to coincide with a time when the voltage of one terminal of the storage capacitor Cst is discharged so as to be different from the originally applied data voltage by a predetermined voltage or more.

In FIG. 34, the number of times the common voltage VSL is changed from the first voltage to the second voltage in the vertical blank period between two adjacent frames and then returns to the first voltage again is two. However, the present disclosure is not limited thereto, and the number of times may be variously set. For example, the number of times where the common voltage VSL is changed from the first voltage to the second voltage in the vertical blank period between two adjacent frames and then returns to the first voltage again may be set to be only one time or set to be three times, four times, or the like.

When the vertical blank period is relatively short, although the number of voltage changes is set to be small, the flicker is not readily perceptible. On the contrary, when the vertical blank period is relatively long, the flicker is more readily perceptible, such that the number of the voltage changes may be set to be larger.

Subsequently, the vertical blank period ends and the common voltage VSL applied to the storage electrode line SL is constantly maintained at the first voltage.

Simultaneously, the (n+1)-th frame starts and the gate-on voltage is applied to the gate line G. Accordingly, the first switching element Q1 is turned on. Subsequently, the data voltage is applied to the data line D, and the liquid crystal capacitor Clc and the storage capacitor Cst are charged. In this case, because the still image is displayed, the data voltages of the n-th frame and the (n+1)-th frame are the same.

As described above, the common voltage VSL applied to the storage electrode line SL has a value that is changed when the display panel is driven at the second frequency. That is, the common voltage VSL has the first voltage between effective periods of the n-th frame and the (n+1)-th frame and swings at the first voltage and the second voltage that is higher than the first voltage in the vertical blank period between the effective periods of the n-th frame and the (n+1)-th frame. For example, the first voltage may be set to 7.5 V and the second voltage may be set to 7.6 V.

The voltage of the other terminal of the storage capacitor Cst connected with the storage electrode line SL is changed according to the change of the common voltage VSL. Further, the voltage of one terminal of the storage capacitor Cst connected with the first switching element Q1 is also changed.

For example, when the voltage of one terminal of the storage capacitor Cst connected with the first switching element Q1 is 10.5 V in the n-th frame by applying the data voltage, the first switching element Q1 is turned off and the predetermined time elapses such that the voltage drops to 10.4 V.

When the common voltage VSL input to the storage electrode line SL increases from 7.5 V to 7.6 V, the voltage of the other terminal of the storage capacitor Cst increases to 7.6 V. In this case, the voltage of one terminal of the storage capacitor Cst also increases by the increase in the voltage of the other terminal of the storage capacitor Cst and becomes 10.5 V again. Subsequently, the common voltage VSL drops to 7.5 V again.

When the predetermined time elapses and the voltage of one terminal of the storage capacitor Cst drops to about 10.4 V, the common voltage VSL applied to the other terminal of the storage capacitor Cst may increase from 7.5 V to 7.6 V. In this case, the voltage of one terminal of the storage capacitor Cst also increases by the increase in the voltage of the other terminal of the storage capacitor Cst and becomes 10.5 V again.

Thereafter, when the (n+1)-th frame starts, the same data voltage as the data voltage in the n-th frame is applied to one terminal of the storage capacitor Cst.

As described above, the voltage of one terminal of the storage capacitor Cst may be changed through the change in the common voltage VSL in the vertical blank period, and accordingly, a cycle of the luminance change is shortened such that the flicker may not be perceptible.

As described above, the common voltage VSL instantaneously increases from the first voltage to the second voltage and then instantaneously decreases from the second voltage to the first voltage again after the predetermined time elapses. However, the present disclosure is not limited thereto, and change forms of the common voltage VSL may be implemented by various methods.

Figure 35:
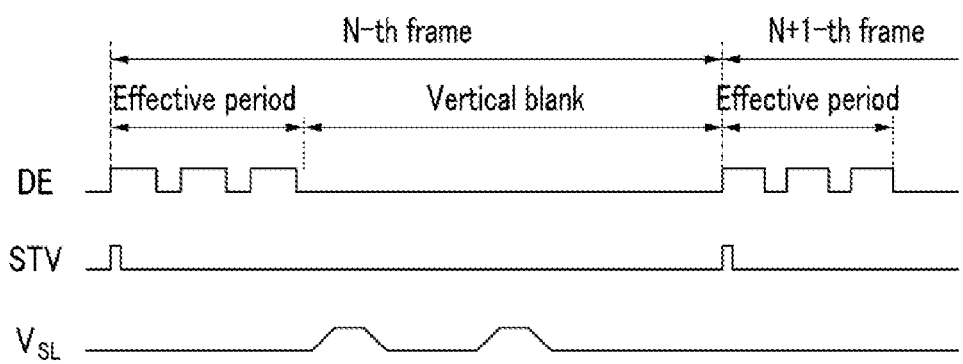
FIG. 35 is a diagram illustrating each of control signals when a still image is displayed on a display panel of a display device according to the sixth exemplary embodiment.

For example, as shown in FIG. 35, the common voltage VSL may be changed.

FIG. 35 is a diagram illustrating each of control signals when a still image is displayed on a display panel of a display device according to the sixth exemplary embodiment.

When the display panel is driven at the second frequency, the common voltage VSL may have the first voltage in the effective period of the n-th frame and the effective period of the (n+1)-th frame and swing at the first voltage and the second voltage that is higher than the first voltage in the vertical blank period between the effective periods of the n-th frame and the (n+1)-th frame. In this case, when the common voltage VSL is changed from the first voltage to the second voltage, the common voltage VSL may be gradually changed while having a value between the first voltage and the second voltage. Further, even when the common voltage VSL is changed from the second voltage to the first voltage, the common voltage VSL may be gradually changed while having a value between the first voltage and the second voltage.

Unlike what is shown in FIG. 35, when the common voltage VSL is changed from the first voltage to the second voltage, the common voltage VSL may be gradually changed while having a value between the first voltage and the second voltage, and when the common voltage VSL is changed from the second voltage to the first voltage, the common voltage VSL may instantaneously drop. Further, when the common voltage VSL is changed from the first voltage to the second voltage, the common voltage VSL may instantaneously increase, and when the common voltage VSL is changed from the second voltage to the first voltage, the common voltage VSL may gradually change while having a value between the first voltage and the second voltage.

Hereinafter, reduction of power consumption in the display device according to the fifth and sixth exemplary embodiments will be described.

Figure 36:
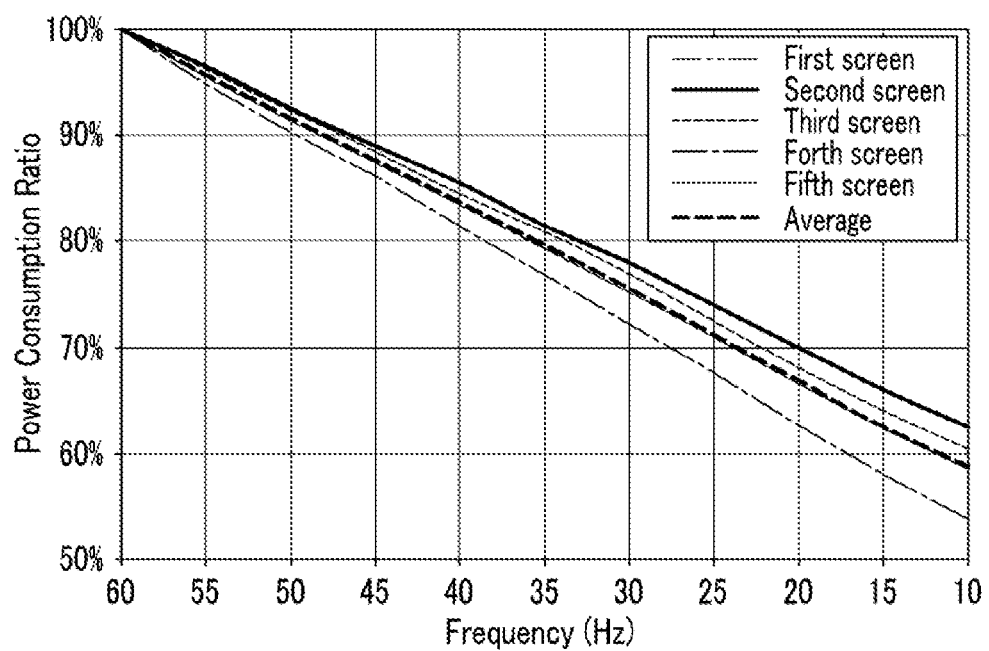
FIG. 36 is a graph illustrating power consumption according to driving frequency.

FIG. 36 is a graph illustrating power consumption according to driving frequency. In detail, for when the power consumption in the driving of 60 Hz is 100% and five different screens are driven at 60 Hz to 10 Hz, a ratio of relative power consumption to the power consumption in the driving of 60 Hz is shown. Further, an average for the ratios of the power consumption of five different screens is also shown. In the five different screens, the first screen is a white screen, the second screen is a black screen, the third screen and the fourth screen are screens displaying different colors by dividing the entire area into a plurality of regions, and the fifth screen is Windows® wallpaper.

Since the power consumption when the display panel is driven at 10 Hz is about 60%, the power consumption is reduced by about 40% as compared with the case where the display panel is driven at 60 Hz. Accordingly, the driving frequency when the still image is displayed is set to a predetermined ratio or less as compared with the driving frequency when the motion picture is displayed, thereby reducing the power consumption to the increased power consumption or more according to the addition of the frame memory.

When the motion picture is displayed, if the driving frequency is reduced, there is a problem in that the motion looks unnatural. When the still image is displayed, however, because frames having the same image data are repeatedly reproduced, although the driving frequency is reduced, the problem does not occur.

When the display panel is driven at a low driving frequency, however, the flicker is easily perceived. Hereinafter, the appearance of flicker according to the fifth exemplary embodiment will be compared with the related art.

Figure 37:
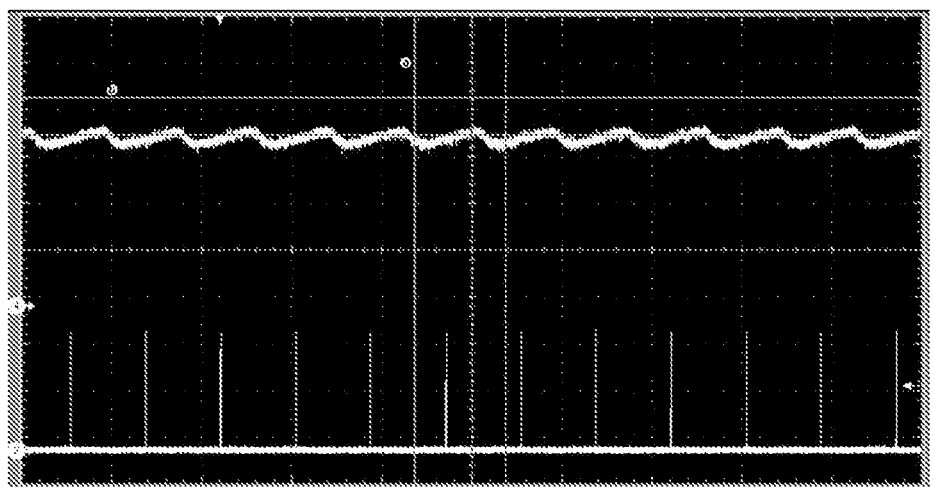
FIG. 37 is a graph illustrating voltage of one terminal of a storage capacitor when a display panel is driven at 60 Hz.

FIG. 37 is a graph illustrating voltage of one terminal of a storage capacitor when a conventional display panel is driven at 60 Hz. And FIG. 38 is a graph illustrating voltage of one terminal of a storage capacitor when a known display panel is driven at 10 Hz, and FIG. 39 is a graph illustrating voltage of one terminal of a storage capacitor when a display panel according to the fifth exemplary embodiment is driven at 10 Hz.

Figure 38:
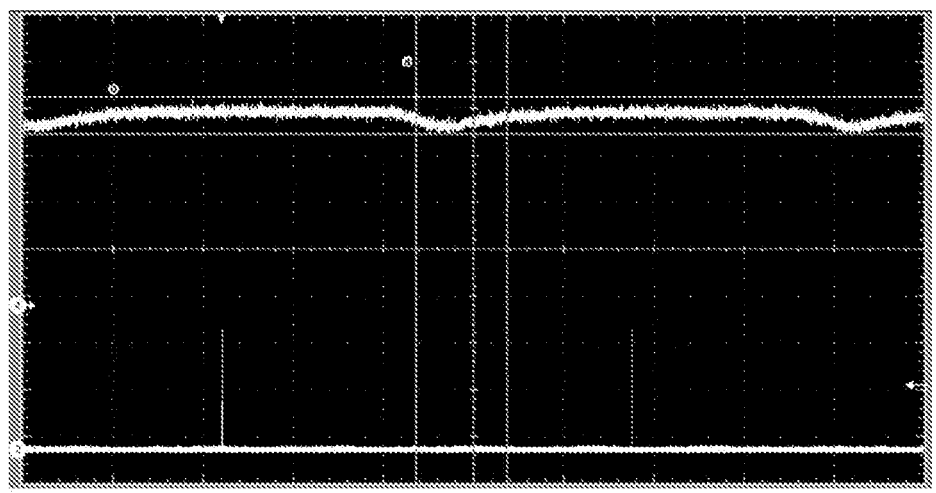
FIG. 38 is a graph illustrating voltage of one terminal of a storage capacitor when a known display panel is driven at 10 Hz.
Figure 39:
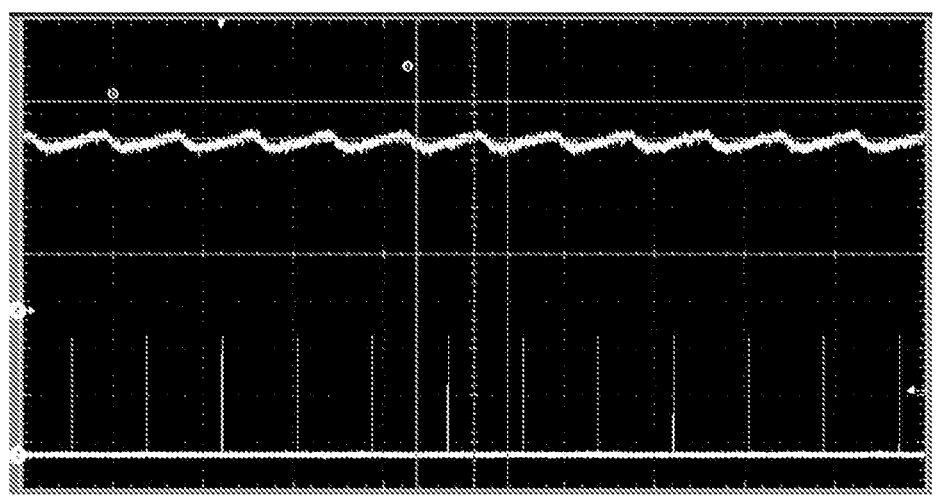
FIG. 39 is a graph illustrating voltage of one terminal of a storage capacitor when a display panel according to the fifth exemplary embodiment is driven at 10 Hz.

By comparing FIG. 37 and FIG. 38, when the display panel is driven at 10 Hz, a cycle of the voltage change in one terminal of the storage capacitor is lengthened as compared with the case where the display panel is driven at 60 Hz, such that a cycle of the luminance change is lengthened. Accordingly, as the driving frequency becomes lower, the flicker is more easily perceived. Referring to FIG. 39, in the exemplary embodiment, when the still image is displayed at the low driving frequency, the common voltage is changed and the cycle of the voltage change in one terminal of the storage capacitor may be decreased to the level when the display panel is driven at 60 Hz. Accordingly, the cycle of the luminance change is shortened, such that the flicker is not perceptible.

Next, a display device according to the seventh exemplary embodiment will be described with reference to FIG. 40 as well as FIG. 1.

Figure 40:
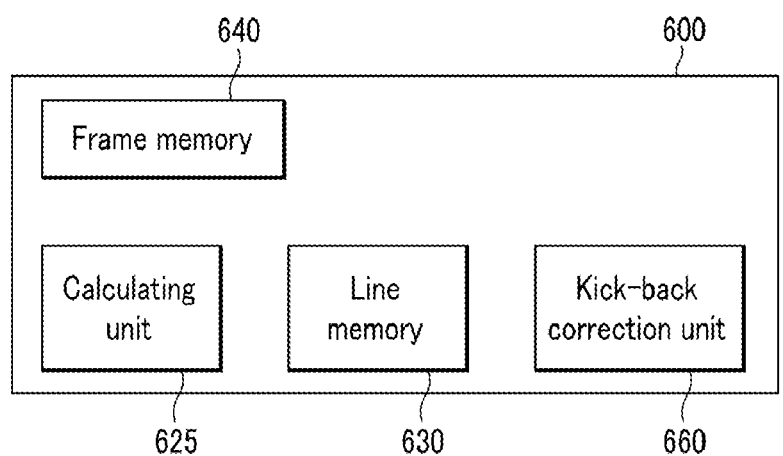
FIG. 40 is a block diagram of a signal controller of the display device according to the seventh exemplary embodiment.

FIG. 40 is a block diagram of a signal controller of a display device according to the seventh exemplary embodiment.

The display device according to the seventh exemplary embodiment includes the display panel 300, the signal controller 600, and the graphics processing unit 700, as shown in FIG. 1.

The display panel 300 and the graphics processing unit 700 of the display device according to the seventh exemplary embodiment are the same as in the first exemplary embodiment such that the detailed description thereof is omitted.

The signal controller 600 of the display device according to the seventh exemplary embodiment may include a frame memory 640 storing the input image data, a calculator 625 calculating a representative value of the storage image data stored in the frame memory, a line memory 630 storing the representative value, and a kick-back corrector 660 generating auxiliary image data by correcting the representative value, as shown in FIG. 40.

The frame memory 640 stores the input image data transmitted from the graphics processing unit 700. The frame memory 640 is not used when the display panel displays the motion picture, but is used when the display panel displays the still image. When the still image start signal is applied, the input image data is stored in the frame memory 640 and the display panel 300 is driven by using the storage image data stored in the frame memory 640.

The calculator 625 receives the storage image data from the frame memory 640 to calculate the representative value representing the storage image data. In this case, the representative value is calculated for each of the data lines D1 to Dm.

The storage image data capable of displaying one frame is stored in the frame memory 640, and the storage image data is divided for each of the data lines D1 to Dm. For example, the storage image data are divided into storage image data corresponding to data voltage to be applied to a first data line D1, storage image data corresponding to data voltage to be applied to a second data line D2, storage image data corresponding to data voltage to be applied to a third data line D3, and storage image data corresponding to data voltage to be applied to an m-th data line Dm.

The calculator 625 receives the storage image data for each of the data lines D1 to Dm to calculate the representative value representing the stored image d. For example, the calculator 625 calculates a first representative value representing the storage image data corresponding to the data voltage to be applied to the first data line D1, and calculates a second representative value representing the storage image data corresponding to the data voltage to be applied to the second data line D2. By this method, a third representative value, an m-th representative value, and the like are calculated.

The representative value representing the storage image data may be calculated in various methods.

Hereinafter, a method of calculating the representative value will be described below with reference to Table 2.

Table 2 shows a gray value of the storage image data corresponding to the data voltage to be applied to the first data line D1. The number of storage image data corresponding to data voltage applied to one of the data lines D1 to Dm is the same as the number of the gate lines G1 to Gn.

TABLE 2

| Storage image data | Gray value |
| --- | --- |
| d11 | 00100110 |
| d12 | 00101010 |
| d13 | 00111101 |
| d14 | 00111011 |
| d15 | 00111011 |
| d16 | 00101101 |
| d17 | 00110001 |

By a first method, an average gray value of the storage image data may be set as the representative value and calculated according to Equation 1.

$$Gr = \sum_{p=1}^{n} \frac{dlp}{n} \qquad \text{(Equation 1)}$$

(Gr: representative value, n: the number of storage image data)

In Table 2, when the average gray value is calculated on the assumption that n is 7, the average gray value is 00110010.

By a second method, an average gray value of upper t bits of the storage image data may be set as the representative value. In this case, a value for t may be variously set, and as t is smaller, the calculation is further simplified. For example, the value for t may be set to 3 or 4 when the storage image data is 8 bits.

Upper 4 bits of the storage image data are extracted below on the assumption that t is 4. d11, d12, d13, d14, d15, d16, and d17 have upper 4-bit gray values such as 0010, 0010, 0011, 0011, 0011, 0010, and 0011. The average value thereof is 0011 and the representative value is 00110000.

By a third method, a middle value of a maximum gray value and a minimum gray value of the storage image data may be set as the representative value. In Table 2, the maximum gray value of the storage image data is 00111101 and the minimum gray value is 00100110. The calculated middle value thereof is 00110010.

The representative values calculated by the three methods are 00110010, 00110000, and 00110010, respectively, and when the representative values are expressed by decimals, the decimals are 50, 48, and 50, respectively. Therefore, the representative values are not largely different from each other in spite of following any method. The most appropriate representative value may be calculated according to the first method, but the calculation is complicated. Further, the calculation is simplified according to the second and third methods, while the representative values in the second and third methods may have relatively lower appropriateness than the first method.

The line memory 630 receives and stores the representative value from the calculator 625. In this case, since the representative value is provided for each data line, the representative value is stored for each data line. Each of the first representative value, the second representative value, the third representative value, the m-th representative value, and the like is stored.

The kick-back corrector 660 corrects the representative value stored in the line memory 630 according to a kick-back voltage to generate the auxiliary image data.

The data voltage applied from the data lines D1 to Dm is charged in each pixel connected to the gate lines G1 to Gn and the data lines D1 to Dm, and the charged voltage is referred to as pixel voltage. The pixel voltage is reduced by parasitic capacitance and the like while the switching element Q is turned off, and in this case, the reduced voltage is referred to as a kick-back voltage.

The kick-back corrector 660 generates auxiliary image data having a value most approximate to a gray value corresponding to pixel voltage charged in a pixel array connected to one of the data lines D1 to Dm when the switching element Q is turned off. That is, the auxiliary image data has a value approximate to a gray value corresponding to pixel voltage which is reduced by the kick-back voltage.

The kick-back voltage depends on the magnitude of the data voltage applied to a corresponding pixel. That is, the kick-back voltage depends on the gray value of the image data corresponding to the data voltage, and may be verified through FIG. 41.

Figure 41:
FIG. 41 is a graph illustrating kick-back voltage depending on a gray value of image data.

FIG. 41 is a graph illustrating kick-back voltage depending on a gray value of image data.

Referring to FIG. 41, as the gray value of the image data becomes larger, the kick-back voltage is higher. For example, the kick-back voltage got a gray of 0 is approximately 1.0 V, and the kick-back voltage for a gray of 256 is approximately 1.2 V. The kick-back voltage depending on the gray value of the image data shown in FIG. 41 is just exemplified, and is a value which depends on the specification of the display device.

The kick-back voltage is differentiated according to the gray value of the image data, but the difference is not large. Therefore, the voltage for correction depending on the kick-back voltage may be set as the same voltage. For example, it may be assumed that the kick-back voltage is 1 V regardless of the size of the image data.

However, although it is assumed that the kick-back voltage is 1 V regardless of the size of the image data, the gray value corresponding to 1 V depends on the gray value of each image data. The reason therefor is that voltage and transmittance have a non-linear relationship. Accordingly, the gray value corresponding to the kick-back voltage, that is, a kick-back correction gray value according to the gray value of the image data, may be acquired from a voltage-transmittance curve (V-T curve) of each display device.

Hereinafter, a method of acquiring the kick-back correction gray value will be described with reference to FIG. 42.

Figure 42:
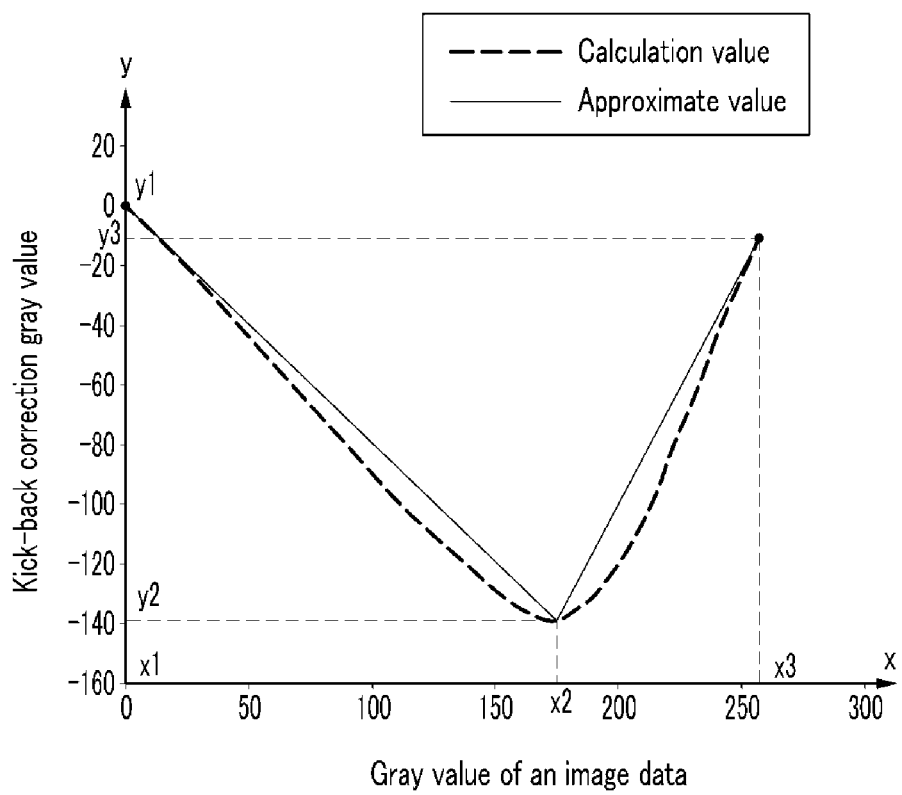
FIG. 42 is a graph illustrating a kick-back correction gray value depending on the gray value of the image data.

FIG. 42 is a graph illustrating a kick-back correction gray value depending on the gray value of the image data. The dotted line represents a calculation value acquired by calculation, and the solid line represents an approximate value generated by using a calculation value.

First, a method of acquiring the kick-back correction gray value by the calculation will be described below.

Second image data corresponding to second data voltage acquired by subtracting the kick-back voltage from the first data voltage corresponding to predetermined first image data is acquired. A value acquired by subtracting a gray value of the second image data from a gray value of the first image data is the kick-back correction gray value. By such a method, the kick-back correction gray values for all the first image data may be acquired and may be expressed in a look-up table. Further, when the kick-back correction gray values acquired by the calculation are expressed in the graph, the kick-back correction gray values are marked with dotted lines of FIG. 42.

The kick-back correction gray values depending on the representative value of the storage image data may be acquired by using the look-up table prepared by the calculation.

Subsequently, a method of acquiring the kick-back correction gray value through approximation by using a calculation value will be described below.

Referring to FIG. 42, when the image data is approximately a gray of 175, the kick-back correction gray value is the largest. Further, when the image data is in a range smaller than approximately a gray of 175, as the gray value becomes smaller, the magnitude of the kick-back correction gray value becomes smaller, and when the image data is in a range larger than approximately a gray of 175, as the gray value becomes larger, the magnitude of the kick-back correction gray value becomes smaller. In this case, variation in the kick-back correction gray value depending on the gray value of the image data shows non-linearity, but the variation has a pattern close to linearity.

Therefore, a function of the kick-back correction gray value depending on the gray value of the image data may be generated by using linear interpolation. In this case, a function of Equation 2 may be generated by using a kick-back correction gray value y1 at a minimum gray x1, a kick-back correction gray value x3 at a maximum gray x2, and a gray value y2 when the magnitude of the kick-back correction gray value is a maximum of y2.

$$y = \begin{matrix} \frac{y1-y2}{x1-x2}x + \frac{y2x1-y1x2}{x1-x2}(x \le x2) \\ \frac{y2-y3}{x2-x3}x + \frac{y3x2-y2x3}{x2-x3}(x > x2) \end{matrix} \qquad \text{(Equation 2)}$$

In the function of Equation 2, a y value when the representative value of the storage image data is inputted into x becomes the kick-back correction gray value.

Hereinafter, a method of generating the auxiliary image data by using the kick-back correction gray value will be described.

As shown in Equation 3, a value acquired by subtracting the kick-back correction gray value depending on the representative value from the representative value of the storage image data is a gray value of the auxiliary image data.

$Ga=Gr-dG$ ($Ga$: gray value of auxiliary image data, $Gr$: representative value, $dG$: kick-back correction gray value depending on representative value) (Equation 3)

The kick-back corrector 660 transmits the auxiliary image data generated by using Equation 3 to the data driver 500, and the data driver 500 applies an auxiliary voltage corresponding to the auxiliary image data to the data lines D1 to Dm in the vertical blank range at the time of displaying the still image.

The image data which the signal controller 600 transmits to the data driver 500 is summarized for each case as follows.

The signal controller 600 transmits the input image data transmitted from the graphics processing unit 700 to the data driver 500 to drive the display panel 300 at the first frequency at the time of displaying the motion picture. The signal controller 600 transmits the storage image data stored in the frame memory 640 to the data driver 500 to drive the display panel 300 at the second frequency at the time of displaying the still image. Further, the signal controller 600 transmits the auxiliary image data correcting the representative value of the storage image data to the data driver 500 to apply the auxiliary voltage to the data line in the vertical blank range at the time of displaying the still image.

Next, referring to FIGS. 43 and 44, a principle of reducing leakage current by inputting the auxiliary image data in the vertical blank range at the time of displaying the still image in the display device according to the exemplary embodiment will be described.

Figure 43:
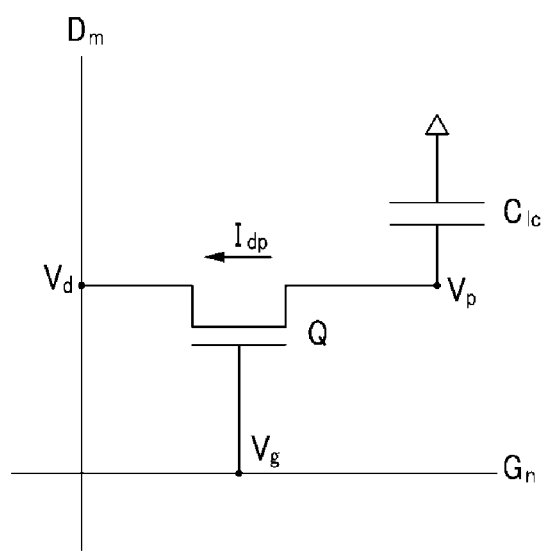
FIG. 43 is an equivalent circuit diagram for one pixel of the display device according to the seventh exemplary embodiment.
Figure 44:
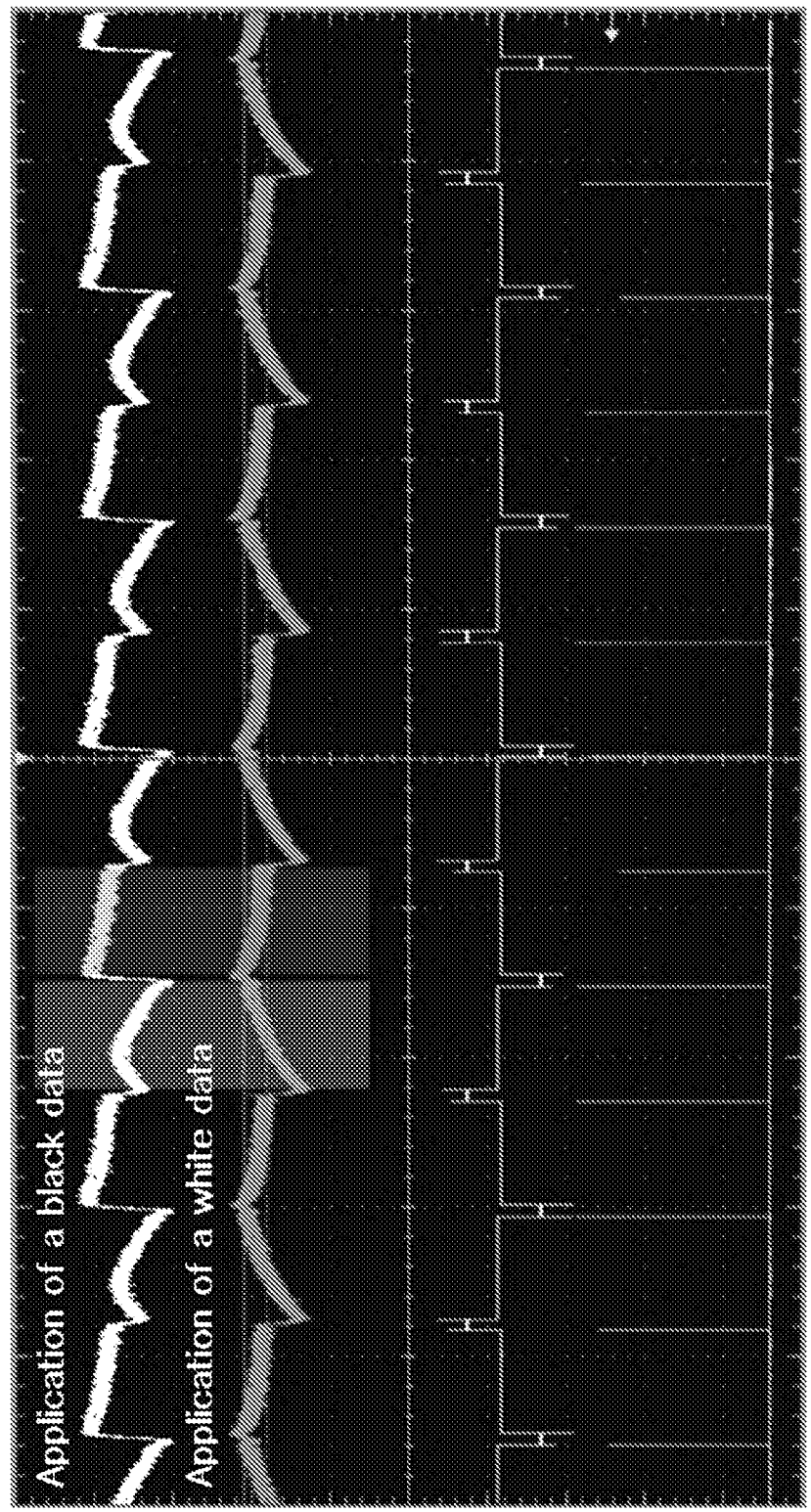
FIG. 44 is a diagram illustrating leakage current when a predetermined voltage is applied during a vertical blank range in the display device according to the exemplary embodiment.

FIG. 43 is an equivalent circuit diagram for one pixel of the display device according to the exemplary embodiment, and FIG. 44 is a diagram illustrating leakage current when a predetermined voltage is applied during a vertical blank range in the display device according to the exemplary embodiment.

As shown in FIG. 43, the switching element Q is formed so that one pixel of the display device according to the exemplary embodiment is connected to the gate line Gn and the data line Dm. In the switching element Q as a 3-terminal element such as a thin-film transistor, a control terminal is connected with the gate line Gn, an input terminal is connected with the data line Dm, and an output terminal is connected with a liquid crystal capacitor Clc.

When the gate-on voltage is applied to the gate line Gn and the data voltage is applied to the data line Dn, the liquid crystal capacitor Clc is charged. Subsequently, when the gate-off voltage is applied to the gate line Gn to turn off the switching element Q, no current should flow between the input terminal and the output terminal of the switching element Q. However, leakage current Idp that leaks onto the input terminal from the output terminal of the switching element Q is generated due to a characteristic of the switching element Q such as the thin-film transistor. The leakage current Idp is proportionate to a difference between the voltage Vd of the input terminal and the voltage Vp of the output terminal of the switching element Q.

In general, because the data voltage is not input in the vertical blank range between two neighboring frames, a voltage difference between the input terminal and the output terminal of the switching element Q is large. The leakage current is increased due to the voltage difference between the input terminal and the output terminal of the switching element Q when the display panel is driven at a low frequency by increasing the length of the vertical blank range between two frames.

In the exemplary embodiments, the display panel is driven at the low frequency at the time of displaying the still image, and the predetermined voltage is applied to the data line in the vertical blank range to reduce the leakage current.

As shown in FIG. 44, the leakage current is changed when data voltage corresponding to a black gray is applied to the data line and data voltage corresponding to a white gray is applied to the data line in the vertical blank range.

In this case, the predetermined voltage applied to the data line is preferably set as a value which is most approximate to the pixel voltage charged in the liquid crystal capacitor Clc of each pixel, that is, the voltage of the output terminal of the switching element Q.

According to the exemplary embodiments, the value representing the storage image data is calculated for each data line and the calculated value is corrected according to the kick-back voltage to generate the auxiliary image data, and thereafter, the auxiliary voltage corresponding thereto is applied to the data line. Accordingly, the voltage between the input terminal and the output terminal of the switching element Q can be minimized, and as a result, the leakage current can also be minimized.

Next, a display device according to the eighth exemplary embodiment will be described.

The display device according to the eighth exemplary embodiment is the same as the display device of the first exemplary embodiment such that the detailed description is omitted.

A gate voltage applied to a gate line of the display device according to the eighth exemplary embodiment will be described with reference to FIG. 45 and FIG. 46.

Figure 45:
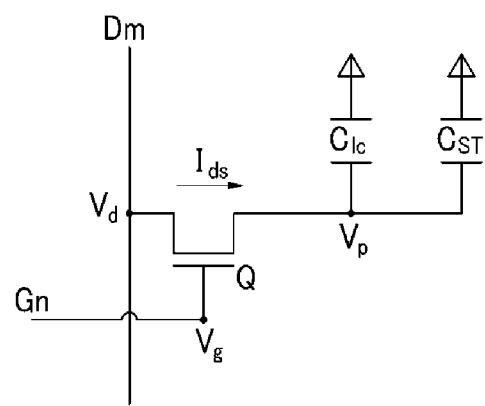
FIG. 45 is a view of one pixel of a display device according to the eighth exemplary embodiment.
Figure 46:
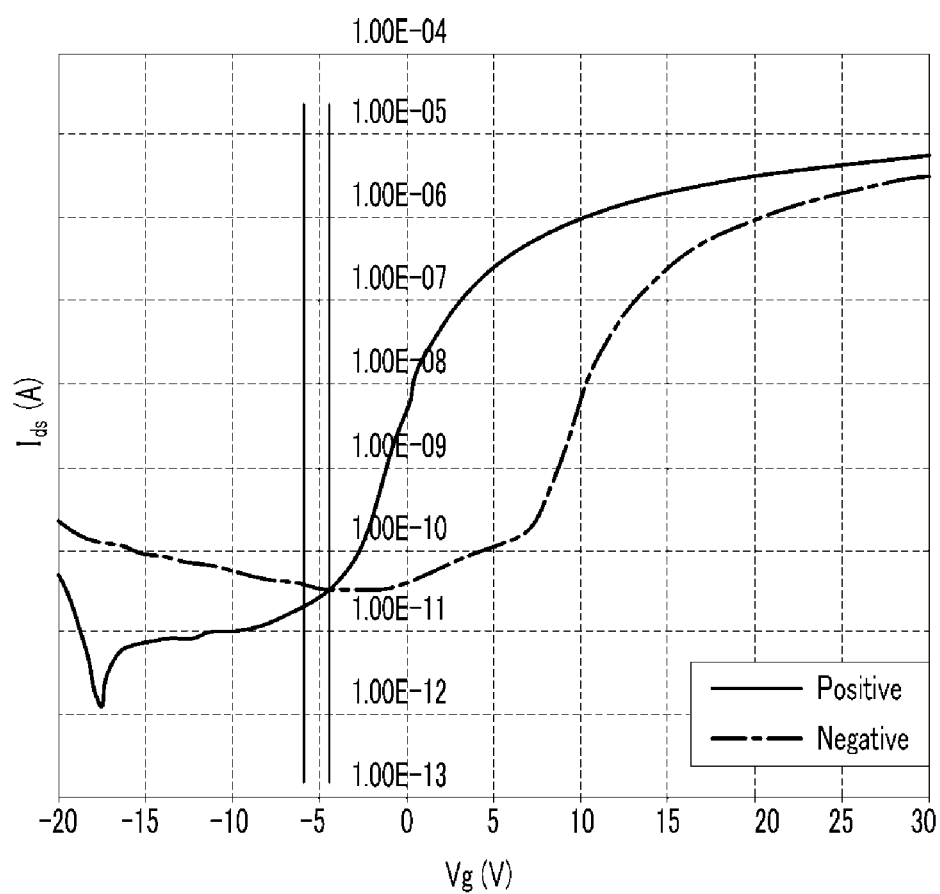
FIG. 46 is a graph illustrating current between an input terminal and an output terminal according to gate voltage in a switching element of the display device according to the eighth exemplary embodiment.

FIG. 45 is a diagram illustrating one pixel of the display device according to the eighth exemplary embodiment, and FIG. 46 is a graph illustrating current between an input terminal and an output terminal according to gate voltage in a switching element of the display device according to the eighth exemplary embodiment.

One pixel of the display device according to the eighth exemplary embodiment includes a switching element Q connected to a gate line Gn and a data line Dm, and a liquid crystal capacitor Clc and a storage capacitor Cst connected to the switching element Q. At this time, the control terminal of the switching element Q is connected to the gate line Gn, the input terminal is connected to the data line Dm, and the output terminal is connected to the liquid crystal capacitor Clc and the storage capacitor Cst.

The gate-on voltage and the gate-off voltage are alternately applied to the gate line Gn to control an on/off state of the switching element Q.

When the gate-on voltage is applied to the gate line Gn, the switching element Q enters an on state and current Ids flows between the input terminal and the output terminal. Accordingly, the pixel electrode is charged to the pixel voltage Vp by the data voltage Vd supplied through the data line Dn.

When the gate-off voltage is applied to the gate line Gn, the switching element Q enters an off state and the current Ids does not flow between the input terminal and the output terminal. However, the voltage difference is formed between the data voltage Vd and the pixel voltage Vp, and as a result, the leakage current is generated between the input terminal and the output terminal. Accordingly, it is preferred that the gate-off voltage is selected as a voltage value that is capable of minimizing the leakage current.

As shown in FIG. 46, it is verified that a difference in the leakage current when the pixel voltage Vp charged in the pixel electrode is positive and negative occurs.

FIG. 46 shows the current Ids between the input terminal and the output terminal according to gate voltage Vg input to the control terminal of the switching element Q when the pixel voltage Vp is positive and negative. FIG. 46 shows the result of the case where the pixel voltage Vp is 0 V and the data voltage Vd is 10 V when the pixel voltage Vp is negative and the pixel voltage Vp is 20 V and the data voltage Vd is 10 V when the pixel voltage Vp is positive.

If a voltage that is capable of minimizing the current Ids between the input terminal and the output terminal of the switching element Q when the pixel voltage Vp is negative is selected as the gate-off voltage, a difference in the leakage currents between a positive pixel and a negative pixel occurs. As a result, luminance characteristics of the positive pixel and the negative pixel are different from each other. Further, If a voltage that is capable of minimizing the current Ids between the input terminal and the output terminal of the switching element Q when the pixel voltage Vp is positive is selected as the gate-off voltage, a difference in the leakage currents between a positive pixel and a negative pixel occurs. As a result, luminance characteristics of the positive pixel and the negative pixel are different from each other.

Accordingly, in the display device according to the exemplary embodiment, when the leakage currents are the same when the pixel voltage Vp charged in the pixel electrode is positive and negative, the voltage of the control terminal of the switching element Q may be selected as the gate-off voltage. For example, the gate-off voltage may be set to −4 V according to the experimental result shown in FIG. 46. Of course, the values may be variously changed as experimental conditions are changed.

Hereinafter, a characteristic in which flicker is improved (i.e., flicker becomes less perceptible) in the display device according to the exemplary embodiment will be described with reference to FIGS. 47 and 48.

Figure 47:
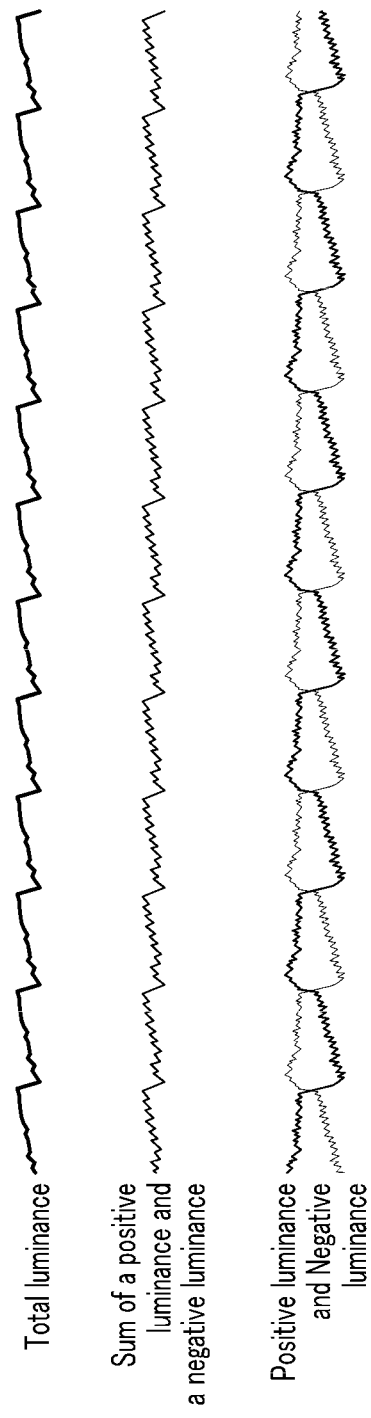
FIG. 47 is a diagram illustrating a luminance characteristic when a still image is displayed in a display device according to the related art.
Figure 48:
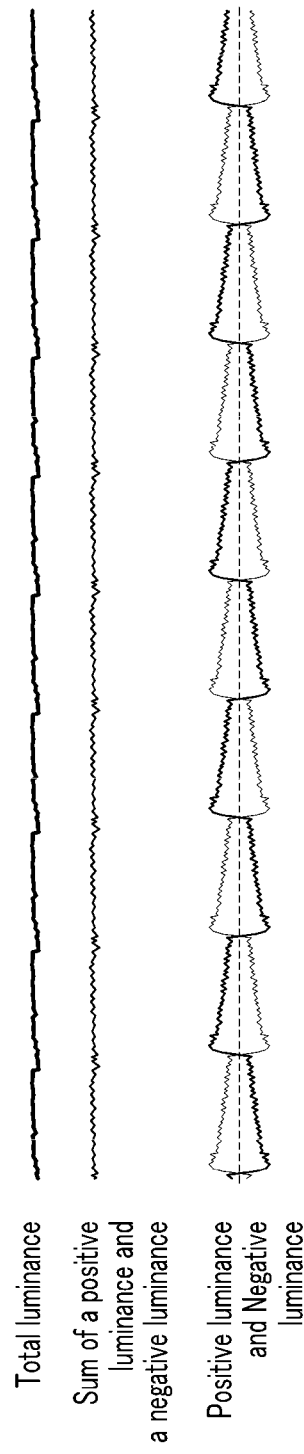
FIG. 48 is a diagram illustrating a luminance characteristic when a still image is displayed in the display device according to the eighth exemplary embodiment.

FIG. 47 is a diagram illustrating a luminance characteristic when a still image is displayed in a display device according to the related art, and FIG. 48 is a diagram illustrating a luminance characteristic when a still image is displayed in the display device according to the eighth exemplary embodiment. In detail, FIG. 47 is a diagram illustrating a luminance characteristic in the case where a voltage that is capable of minimizing the current Ids between the input terminal and the output terminal of the switching element Q when the pixel voltage Vp is negative is selected as the gate-off voltage. FIG. 48 is a diagram illustrating a luminance characteristic in the case where a voltage of the control terminal of the switching element Q is selected as the gate-off voltage in the case where the leakage current is the same when the pixel voltage Vp is positive and negative.

Because the same image is shown for every frame when the still image is displayed, in theory, luminance of each pixel is not changed.

As shown in FIG. 47, in the display device according to the related art in which the voltage that is capable of minimizing the current Ids between the input terminal and the output terminal of the switching element Q when the pixel voltage Vp is negative is selected as the gate-off voltage, when the still image is displayed, the luminance of the entire screen is repeatedly increased and decreased for each successive frame. As a result, flicker will be noticable.

As described above, the cause for the flicker is because the luminance of the pixel when the positive pixel voltage is applied differs from the luminance of the pixel when the negative pixel voltage is applied. The luminance of the pixel to which the positive pixel voltage is applied and luminance of the pixel to which the negative pixel voltage is applied are changed for every frame, and thus the luminance of the entire screen is also changed for every frame.

As shown in FIG. 48, when the leakage current is the same when the pixel voltage Vp is positive and negative, in the display device according to the exemplary embodiment in which the voltage of the control terminal of the switching element Q is selected as the gate-off voltage, the luminance of the entire screen is uniformly maintained when the still image is displayed.

In the display device according to the eighth exemplary embodiment, while the still image is displayed, the amplitude of the leakage current generated in the pixel to which the positive pixel voltage is applied and the amplitude of the leakage current generated in the pixel to which the negative pixel voltage is applied are the same, and as a result, the sum value of the luminance of the pixel to which the positive pixel voltage is applied and the luminance of the pixel to which the negative pixel voltage is applied may be uniformly maintained. Accordingly, the luminance of the entire screen may be uniformly maintained and the flicker may not be perceptible.

The feature in which the flicker can be reduced by setting the gate-off voltage as the voltage of the control terminal of the switching element when the leakage currents are the same in the positive pixel and the negative pixel was described above.

Furthermore, by setting the gate-off voltage so as to be in a predetermined range based on the voltage of the control terminal of the switching element when the leakage currents are the same in the positive pixel and the negative pixel, the exemplary embodiment may have the same or a similar effect, and hereinafter the range will be described with reference to Table 3 and FIG. 49.

Figure 49:
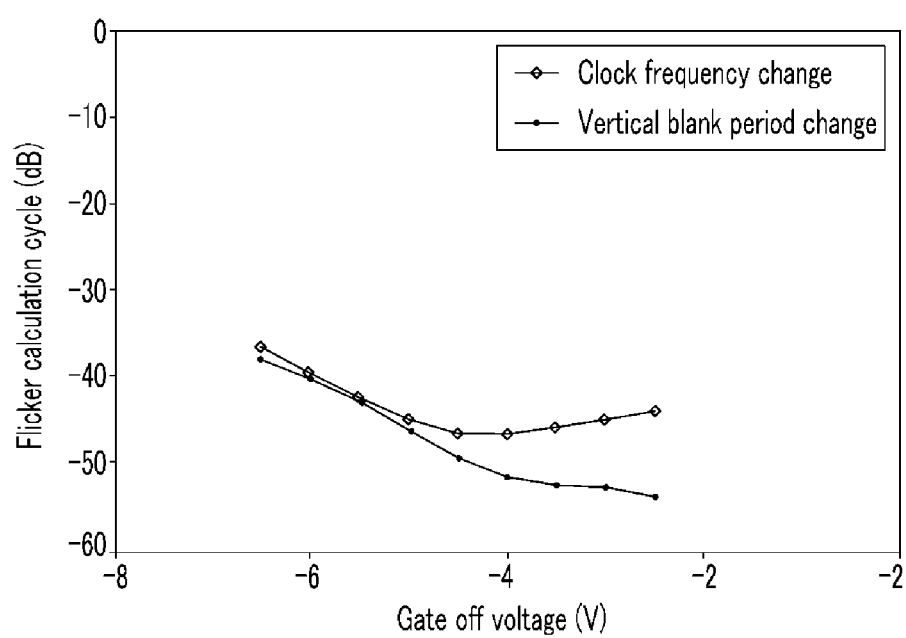
FIG. 49 is a graph illustrating a flicker value according to a gate-off voltage value when a still image is displayed in the display device according to the eighth exemplary embodiment.

Table 3 is a table illustrating a flicker value according to a gate-off voltage value when the still image is displayed in the display device according to the exemplary embodiment, and FIG. 49 is a diagram illustrating Table 3 by a graph. That is, FIG. 49 is a graph illustrating a flicker value according to a gate-off voltage value when a still image is displayed in the display device according to the exemplary embodiment.

As shown in Table 3 and FIG. 49, in the display device according to the exemplary embodiment, the frequency is decreased by changing the length of the vertical blank period and a magnitude of a clock frequency, and the flicker value is changed according to the gate-off voltage when the still image is displayed at a low frequency.

In the experimental example described in FIG. 46, when the leakage currents are the same in the positive pixel and the negative pixel, the voltage of the control terminal of the switching element Q is −4 V. Accordingly, the flicker is measured by setting a lower voltage and a higher voltage than −4 V as the gate-off voltage, and the result is shown in Table 3 and FIG. 49.

TABLE 3

| Gate-off voltage (V) | Flicker value (dB) | |
| --- | --- | --- |
| | Vertical blank period change | Clock frequency change |
| −6.5 | −37.9 | −36.7 |
| −6 | −40 | −39.5 |
| −5.5 | −42.7 | −42.4 |
| −5 | −46.2 | −45 |
| −4.5 | −49.4 | −46.3 |
| −4 | −51.4 | −46.4 |
| −3.5 | −52.4 | −45.6 |
| −3 | −52.5 | −44.7 |
| −2.5 | −53.5 | −43.7 |

Referring to Table 3 and FIG. 49, it is verified that a flicker value when the gate-off voltage is −4 V has a similar value to the flicker value when the gate-off voltage is changed by about −20% or +20% based on −4 V. Even in the case where the gate-off voltage has a value of about +20% or more based on −4 V, the flicker value may also have a similar value or a lower value than the flicker value when the gate-off voltage is −4 V. However, in the case where the gate-off voltage may be set to a very high value, the leakage current is increased, and as a result, a problem such as decolorization and the like may also occur.

Accordingly, it is preferred that the gate-off voltage is set so as to be in the range of about −20% to +20% based on the voltage of the control terminal of the switching element when the leakage currents are the same in the positive pixel and the negative pixel. Further, it is more preferred that the gate-off voltage is set so as to be in the range of about −10% to +10% based on the voltage of the control terminal of the switching element when the leakage currents are the same in the positive pixel and the negative pixel.

On the basis of this, the range of the gate-off voltage is represented by equations as follows.

In the display device according to the eighth exemplary embodiment, the gate-off voltage applied to the gate line Gn when the display panel is driven at the second frequency may be set so as to be in the range of Equation 4.

$$Va - 0.2|Va| \le Voff2 \le Va + 0.2|Va| \quad \text{(Equation 4)}$$

(Voff2: the gate-off voltage when the display panel is driven at the second frequency, Va: voltage of the control terminal of the switching element when leakage current flowing between the input terminal and the output terminal of the switching element when the positive pixel voltage is applied to the pixel electrode and leakage current flowing between the input terminal and the output terminal of the switching element when the negative pixel voltage is applied to the pixel electrode are the same)

In the display device according to the eighth exemplary embodiment, the gate-off voltage applied to the gate line Gn when the display panel is driven at the second frequency may alternatively be set so as to be in the range of Equation 5.

$$Va - 0.1|Va| \le Voff2 \le Va + 0.1|Va| \quad \text{(Equation 5)}$$

(Voff2: the gate-off voltage when the display panel is driven at the second frequency, Va: voltage of the control terminal of the switching element when leakage current flowing between the input terminal and the output terminal of the switching element when the positive pixel voltage is applied to the pixel electrode and leakage current flowing between the input terminal and the output terminal of the switching element when the negative pixel voltage is applied to the pixel electrode are the same)

Because the display device according to the eighth exemplary embodiment is driven at a low frequency when the still image is displayed, to prevent flicker from occurring, the gate-off voltage is set according to Equation 4 and Equation 5.

Because the display device according to the eighth exemplary embodiment is driven at a high frequency when the still image is displayed, the flicker is not as evident. As a result, the gate-off voltage may be set to a lower value. That is, the gate-off voltage when the display panel is driven at the first frequency may be set to be lower than the gate-off voltage when the display panel is driven at the second frequency.

Unlike this, the gate-off voltage when the display panel is driven at the first frequency may also be set to be the same as the gate-off voltage when the display panel is driven at the second frequency. In this case, the range of the gate-off voltage is represented by equations as follows.

$$Va - 0.2|Va| \le Voff1 \le Va + 0.2|Va| \quad \text{(Equation 6)}$$

(Voff1: the gate-off voltage when the display panel is driven at the first frequency, Va: voltage of the control terminal of the switching element when leakage current flowing between the input terminal and the output terminal of the switching element when the positive pixel voltage is applied to the pixel electrode and leakage current flowing between the input terminal and the output terminal of the switching element when the negative pixel voltage is applied to the pixel electrode are the same)

In the display device according to the exemplary embodiment, the gate-off voltage applied to the gate line Gn when the display panel is driven at the first frequency may alternatively be set so as to be in the range of Equation 7.

$$Va - 0.1|Va| \le Voff1 \le Va + 0.1|Va| \quad \text{(Equation 7)}$$

(Voff1: the gate-off voltage when the display panel is driven at the first frequency, Va: voltage of the control terminal of the switching element when leakage current flowing between the input terminal and the output terminal of the switching element when the positive pixel voltage is applied to the pixel electrode and leakage current flowing between the input terminal and the output terminal of the switching element when the negative pixel voltage is applied to the pixel electrode are the same)

Hereinafter, a method of calculating a flicker value will further be described below with reference to FIGS. 50 and 51.

Figure 50:
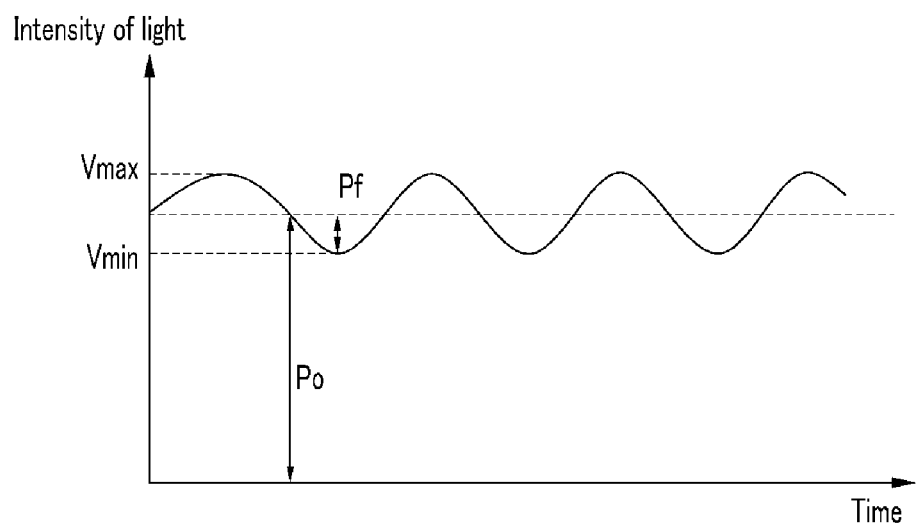
FIG. 50 is a graph illustrating intensity of light emitted from a display panel over time.
Figure 51:
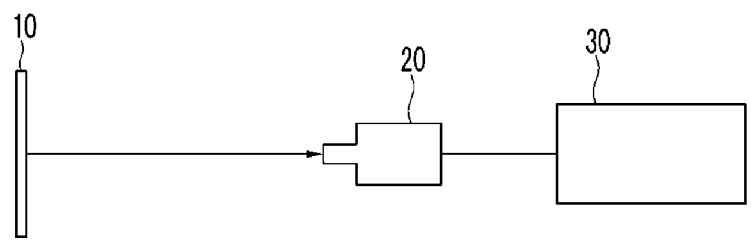
FIG. 51 is a diagram illustrating equipment used for flicker measurement.

FIG. 50 is a graph illustrating intensity of light emitted from a display panel according to time, and FIG. 51 is a diagram illustrating equipment used for flicker measurement.

The flicker means a phenomenon in which flicker of light is perceived as intensity of light emitted from a screen is not uniform and is periodically changed over time. When the display device is driven at 60 Hz, flickers of 60 times per second occur.

Referring to FIG. 50, the intensity of light is changed according to time. The intensity of light has a value between Vmax and Vmin and is periodically changed.

A first method of calculating a flicker value is a method of calculating a ratio of an AC component to a DC component. After measuring the Vmax and Vmin values, the flicker value may be calculated by using Equation 8.

$$P = \frac{AC_{component}}{DC_{component}} * 100 = \frac{v_{max} - v_{min}}{(v_{max} * v_{min})/2} * 100 \quad (F: \text{Flicker value}) \quad \text{(Equation 8)}$$

Because the sensitivity of eyes is changed according to the intensity of light, and the change amount is nonlinear, the sensitivity of eyes needs to be considered when the flicker value is calculated. In the case of the first method, because the sensitivity of eyes is not considered, a correct flicker value is not easily derived, but the calculating method thereof is simple.

Hereinafter, considering a change in the sensitivity of eyes according to the intensity of light, a second method used in order to derive a more correct flicker value will be described below.

As shown in FIG. 51, a luminance meter 20 capable of measuring luminance is disposed at the surface to which light is emitted from a display device 10. The luminance meter 20 may be, for example, BM-7 and the like. Further, a dynamic signal analyzer (DSA) 30 which receives and processes a signal from the luminance meter 20 is connected to the luminance meter 20.

First, the display device 10 is controlled to a state where light can be emitted from the display device 10, and luminance of the light emitted from the display device 10 is measured by using the luminance meter 20. The luminance of light measured by the luminance meter 20 has an analogue value, and the analogue value is transmitted to the dynamic signal analyzer 30. The dynamic signal analyzer 30 reads a root mean square value (rms value) of a 0 Hz component and a 30 Hz component from the analogue value by a decibel (dB) unit.

After reading the rms value of the 0 Hz component and the 30 Hz component from the dynamic signal analyzer 30, the flicker value may be calculated by using the following Equation 9. Equation 9 was made in consideration of a size change of pupils in response to the intensity of light, intensity of light transmitting through the pupils to the size change of the pupils, reactivity of eyes to the intensity of light transmitting through the pupils, and the like.

(Equation 9)

$$F = 1000 * (A - B)$$

$$A = \frac{\left[\pi\left(\frac{10^{0.8558-0.000401\{\log(L(0\text{ Hz}+30\text{ Hz}))\}+0.86^3}}{2}\right)^2 L(0\text{ Hz}+30\text{ Hz})\right]^{0.74}}{\left[\pi\left(\frac{10^{0.8558-0.000401\{\log(L(0\text{ Hz}+30\text{ Hz}))\}+0.86^3}}{2}\right)^2 L(0\text{ Hz}+30\text{ Hz})\right]^{0.74} + 1584.9^{0.74}},$$

$$B = \frac{\left[\pi\left(\frac{10^{0.8558-0.000401\{\log(L(0\text{ Hz}-30\text{ Hz}))\}+0.86^3}}{2}\right)^2 L(0\text{ Hz}+30\text{ Hz})\right]^{0.74}}{\left[\pi\left(\frac{10^{0.8558-0.000401\{\log(L(0\text{ Hz}-30\text{ Hz}))\}+0.86^3}}{2}\right)^2 L(0\text{ Hz}-30\text{ Hz})\right]^{0.74} + 1584.9^{0.74}},$$

$$L(0\text{ Hz}+30\text{ Hz}) = \left[10^{\frac{0\text{ Hz(dB)}+b}{20}} + 10^{\frac{30\text{ Hz(dB)}+b}{20}}\right]/a,$$

$$L(0\text{ Hz}-30\text{ Hz}) = \left[10^{\frac{0\text{ Hz(dB)}+b}{20}} - 10^{\frac{30\text{ Hz(dB)}+b}{20}}\right]/a,$$

0 Hz: rms value of 0 Hz component of luminance of light
30 Hz: rms value of 30 Hz component of luminance of light
a: proportional constant to luminance of light inputted to the luminance meter 20 and outputted voltage
b: reference voltage for calculating voltage inputted to the dynamic signal analyzer 30 by decibel (dB)

In the case of the second method, the calculating method is more complicated, but because the flicker value is calculated by considering various parameters affecting the change in the flicker value, a more correct value may be calculated.

The flicker value shown in Table 3 and FIG. 49 is a value calculated by using the second method.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure, including the appended claims.

| <Description of Symbols> | |
| --- | --- |
| 10: display device | 20: luminance meter |
| 30: dynamic signal analyzer | 300: display panel |
| 400: gate driver | 500: data driver |
| 600: signal controller | 610: signal receiving unit |
| 620: frame counting unit | 630: line memory |
| 640: frame memory | 650: driving frequency selecting unit |
| 660: kick-back corrector | 700: graphics processing unit |
| 800: gray voltage generator | 900: light source unit |
| 910: light source driver | 912: driving frequency receiving unit |
| 914: light source unit driving ratio selecting unit | |
| 916: light source driving signal generator | |

What is claimed is:

1. A display device, comprising:
a display panel configured to display a still image and a motion picture;
a signal controller configured to control signals for driving the display panel;
a graphics processing unit configured to transmit input image data to the signal controller;
a light source unit configured to irradiate light to the display panel; and
a light source driver configured to control signals to drive the light source unit,
wherein the signal controller comprises a frame memory configured to store the input image data, and
the display panel is driven at a first frequency when the motion picture is displayed and is driven at a second frequency that is lower than the first frequency when the still image is displayed,
wherein the light source driver constantly maintains a driving ratio of the light source unit when the display panel is driven with the first frequency, and periodically changes the driving ratio of the light source unit when the display panel is driven with the second frequency.

2. The display device of claim 1, wherein
the graphics processing unit transmits a still image start signal and a still image end signal to the signal controller.

3. The display device of claim 2, wherein
the signal controller further comprises a frame counting unit configured to count the number of still image sequential frames inputted before the still image end signal is applied after the still image start signal is applied, and configured to count the number of motion picture sequential frames inputted until the still image start signal is applied after the still image end signal is applied.

4. The display device of claim 3, wherein
the signal controller stores the input image data in the frame memory and inactivates a transmission of the input image data from the graphic processing unit when the number of the still image sequential frames is equal to or more than x, and activates the transmission of the input image data from the graphic processing unit when the number of the motion picture sequential frames is equal to or more than y.

5. The display device of claim 4, wherein
the signal controller outputs the storage image data stored in the frame memory to the display panel at the second frequency when the number of the still image sequential frames is equal to or more than x, and outputs the input image data to the display panel at the first frequency when the number of the motion picture sequential frames is equal to or more than y.

6. The display device of claim 2, wherein the light source driver drives the light source unit at a first ratio when the display panel is driven at the first frequency, and drives the light source unit at a second ratio when the display panel is driven at the second frequency.

7. The display device of claim 6, wherein the second ratio is lower than the first ratio when the display panel is a normally black mode, and the second ratio is higher than the first ratio when the display panel is a normally white mode.

8. The display device of claim 7, wherein the signal controller further comprises a signal receiving unit configured to transmit the input image data from the graphics processing unit, and a driving frequency selecting unit configured to select the first frequency when the still image is displayed and configured to select the second frequency when the motion picture is displayed.

9. The display device of claim 7, wherein the light source driver comprises a driving frequency receiving unit configured to receive a driving frequency of the display panel from the signal controller, a light source unit driving ratio selecting unit configured to determine the driving ratio of the light source unit according to the driving frequency, and a light source driving signal generator configured to generate a signal for driving the light source according to the driving ratio of the light source unit.

10. The display device of claim 2, wherein the display panel is a normally black mode, and the light source driver drives the light source unit with the first ratio when the display panel is driven with the first frequency, and drives the light source unit with the first ratio and a ratio that is sequentially decreased from the first ratio when the display panel is driven with the second frequency.

11. The display device of claim 10, wherein the display panel comprises:
a gate line and a data line;
a gate driver configured to drive a gate line; and
a data driver configured to drive a data line, and
the signal controller transmits an STV signal to the gate driver at a start position of every frame.

12. The display device of claim 11, wherein the light source driver drives the light source unit with the first ratio as a position where the STV signal is transmitted when the display panel is driven with the second frequency, and drives the light source unit with a ratio that is sequentially decreased from the first ratio before a next STV signal is transmitted.

13. The display device of claim 12, wherein a transmission cycle of the STV signal when the display panel is driven with the first frequency is the same as a change cycle of the driving ratio of the light source unit when the display panel is driven with the second frequency.

14. The display device of claim 2, wherein the display panel is a normally white mode, and the light source driver drives the light source unit with the first ratio when the display panel is driven with the first frequency and drives the light source unit with the first ratio and a ratio that is sequentially increased from the first ratio when the display panel is driven with the second frequency.

15. A method for driving a display device comprising a display panel displaying a moving picture and a still image, and a signal controller controlling signals to drive the display panel, comprising:
transmitting input image data and driving a display panel with a first frequency;
applying a still image start signal;
changing a driving frequency of the display panel into a second frequency that is lower than the first frequency;
applying a still image end signal; and
changing a driving frequency of the display panel into the first frequency,
wherein a light source driver constantly maintains a driving ratio of a light source unit when the display panel is driven with the first frequency and periodically changes the driving ratio of the light source unit when the display panel is driven with the second frequency.

16. The method of claim 15, further comprising:
counting the number of still image sequential frames inputted before the still image end signal is applied after the still image start signal is applied; and
counting the number of motion picture sequential frames inputted until the still image start signal is applied after the still image end signal is applied.

17. The method of claim 16, wherein the signal controller stores the input image data in the frame memory and inactivates a transmission of the input image data from the graphic processing unit when the number of the still image sequential frames is equal to or more than x, and activates the transmission of the input image data from the graphic processing unit when the number of the motion picture sequential frames is equal to or more than y.

18. The method of claim 17, wherein the signal controller outputs the storage image data stored in the frame memory to the display panel at the second frequency when the number of the still image sequential frames is equal to or more than x, and outputs the input image data to the display panel at the first frequency when the number of the motion picture sequential frames is equal to or more than y.

19. The method of claim 15, wherein when the display panel is driven at a first frequency, the light source unit is driven at the first ratio, and when the display panel is driven at a second frequency, the light source unit is driven at the second ratio.

20. The method of claim 19, wherein when the display panel is a normally black mode, the second ratio has a lower value than the first ratio, and when the display panel is a normally white mode, the second ratio has a higher value than the first ratio.

21. The method of claim 19, wherein the driving ratio of the light source unit according to the driving frequency of the display panel is selected by using a look-up table or a function.

22. The method of claim 19, wherein the conversion of the driving frequency of the display panel and the driving ratio of the light source unit is performed in a vertical blank period.

23. The method of claim 15, wherein the display panel is a normally black mode, when the display panel is driven with the first frequency, the light source unit is driven with the first ratio, and when the display panel is driven with the second frequency, the light source unit is driven with the first ratio and a ratio that is sequentially decreased from the first ratio.

24. The method of claim 23, wherein the display panel comprises a gate line and a data line, the display device further comprises
a gate driver configured to drive the gate line and
a data driver configured to drive the data line, and
the signal controller transmits an STV signal to the gate driver at the start position every frame.

25. The method of claim 24, wherein
when the display panel is driven with the second frequency,
the light source unit is driven with the first ratio at a position transmitting the STV signal, and
the light source unit is driven with a ratio that is sequentially decreased from the first ratio before transmission of a next STV signal.

26. The method of claim 25, wherein
a transmission cycle of the STV signal when the display panel is driven with the first frequency is the same as a change cycle of the driving ratio of the light source unit when the display panel is driven with the second frequency.

27. The method of claim 15, wherein the display panel is a normally white mode, when the display panel is driven with the first frequency, the light source unit is driven with the first ratio, and when the display panel is driven with the second frequency, the light source unit is driven with the first ratio and a ratio that is sequentially increased from the first ratio.

* * * * *